United States Patent
Haick et al.

(10) Patent No.: US 12,545,763 B2
(45) Date of Patent: Feb. 10, 2026

(54) HYDROLYTICALLY STABLE SELF-HEALING ELASTOMER

(71) Applicant: TECHNION RESEARCH AND DEVELOPMENT FOUNDATION LIMITED, Haifa (IL)

(72) Inventors: Hossam Haick, Haifa (IL); Muhammad Khatib, Haifa (IL)

(73) Assignee: Technion Research and Development Foundation Limited, Haifa (IL)

( * ) Notice: Subject to any disclaimer, the term of this patent is extended or adjusted under 35 U.S.C. 154(b) by 890 days.

(21) Appl. No.: 17/613,826

(22) PCT Filed: Jun. 4, 2020

(86) PCT No.: PCT/IL2020/050623
§ 371 (c)(1),
(2) Date: Nov. 23, 2021

(87) PCT Pub. No.: WO2020/245826
PCT Pub. Date: Dec. 10, 2020

(65) Prior Publication Data
US 2022/0243014 A1 Aug. 4, 2022

Related U.S. Application Data

(60) Provisional application No. 62/857,824, filed on Jun. 6, 2019.

(51) Int. Cl.
*C08G 75/14* (2006.01)
*G01L 1/22* (2006.01)
*G01N 27/414* (2006.01)

(52) U.S. Cl.
CPC .............. *C08G 75/14* (2013.01); *G01L 1/22* (2013.01); *G01N 27/4146* (2013.01)

(58) Field of Classification Search
CPC .. C08G 75/14; C08G 18/246; C08G 18/3868; C08G 18/3243; C08G 18/755;
(Continued)

(56) References Cited

U.S. PATENT DOCUMENTS 3,905,944 A 9/1975 Finelli
4,021,414 A 5/1977 Saracsan
(Continued)

FOREIGN PATENT DOCUMENTS

CN 109485824 A 3/2019
EP 2597110 A1 5/2013
(Continued)

OTHER PUBLICATIONS

Malkappa, K. "Hydrophobic, Water-Dispersible Polyurethane: Role of Polybutadiene Diol Structure" Ind. Eng. Chem. Res. 2015, 54, 30, 7423-7435 (Year: 2015).*
(Continued)

*Primary Examiner* — Mark Eashoo
*Assistant Examiner* — Cullen L G Davidson
(74) *Attorney, Agent, or Firm* — Roach Brown Mccarthy & Gruber, P.C.; Kevin D. McCarthy

(57) ABSTRACT

The present invention provides a solution-processable self-healing hydrolytically stable elastomer, a method for the preparation thereof, and articles of manufacture comprising the elastomer. The elastomer comprises polymeric chains comprising units of formula (A1), wherein R is a polybutadiene-containing polyurethane; $R_1$ and $R_{1'}$ are independently selected from the group consisting of: —H, $(C_1$-$C_{20})$alkyl, $(C_5$-$C_{14})$aryl, —$OR_4$, —$(CO)R_5$, —$O(CO)R_6$, —$(SO)R_7$, CO—$R_8$, —$COOR_9$, —$NO_2$, and halogen; $R_2$, $R_{2'}$, $R_3$ and $R_{3'}$ are independently selected from the group consisting of: —H, $(C_1$-$C_{20})$alkyl, and $(C_5$-$C_{14})$aryl; $R_4$ to $R_9$ are the same
(Continued)

or different, and are independently selected from the group consisting of: —H, $(C_1\text{-}C_{20})$alkyl, and $(C_5\text{-}C_{14})$aryl; m is 4; wherein the elastomer is dynamically crosslinked by aromatic disulfide metathesis, and wherein the elastomer has a water contact angle of above 100 #.

(A1)

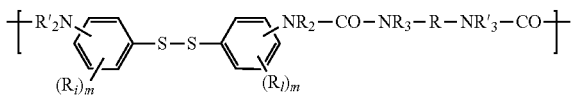

18 Claims, 27 Drawing Sheets

(58) Field of Classification Search
CPC .......... C08G 18/10; C08G 18/69; G01L 1/22; G01N 27/4146; G01N 27/127; C08J 2375/02; C08J 2375/04; C08J 2375/14; C08J 5/18; B82Y 30/00; C08K 2003/0806; C08K 2201/001; C08K 2201/011; C08K 3/041; C08K 7/06; C09D 175/14
See application file for complete search history.

(56) References Cited

U.S. PATENT DOCUMENTS

| | | | |
|---|---|---|---|
| 4,579,928 A * | 4/1986 | Kay | C08G 18/10 528/65 |
| 8,309,950 B2 | 11/2012 | Iwayama et al. | |
| 8,383,713 B2 | 2/2013 | Lubnin et al. | |
| 2011/0143101 A1 | 6/2011 | Sandhu | |
| 2016/0123947 A1 | 5/2016 | Briman et al. | |
| 2017/0008999 A1* | 1/2017 | Odriozola | C08G 18/3243 |
| 2018/0231486 A1* | 8/2018 | Haick | G01N 27/127 |
| 2020/0002501 A1 | 1/2020 | Yun et al. | |

FOREIGN PATENT DOCUMENTS

| | | |
|---|---|---|
| KR | 101126048 B1 | 3/2012 |
| WO | 2010128007 A1 | 11/2010 |
| WO | 2013079469 A1 | 6/2013 |
| WO | 2014116335 A2 | 7/2014 |
| WO | 2016046135 A1 | 3/2016 |
| WO | 2016118536 A2 | 7/2016 |
| WO | 2017029660 A1 | 2/2017 |
| WO | 2020039431 A1 | 2/2020 |

OTHER PUBLICATIONS

Anonymous: "Surface Properties", Feb. 2, 2023 (Feb. 2, 2023), pp. 1-3, XP093020453. Retrieved from the Internet: URL: https://polymerdatabase.com/polymer%20physics/SurfaceTension.html [retrieved on Feb. 2, 2023]; and according to https://web.archive.org/web/20230000000000*/https://polymerdatabase.com/polymer%20physics/SurfaceTension.html, was "Saved 39 times between Oct. 20, 2016 and Dec. 28, 2019."
Ahn et al., (2014) Surface-initiated self-healing of polymers in aqueous media. Nat Mater 13(9): 867-872 (6 pages).
Alvares et al., (2011) Nanoparticle films as biomimetic tactile sensors. Procedia Engineering 25: 1349-1352 (5 pages).
Amamoto et al., (2012) Self-healing of covalently cross-linked polymers by reshuffling thiuram disulfide moieties in air under visible light. Advanced Materials 24(29): 3975-3980 (6 pages).
Back and Shim (2006) pH-dependent electron-transport properties of carbon nanotubes. J Phys Chem B 110(47): 23736-23741 (6 pages).
Balazs (2007) Modeling self-healing materials. Materials Today 10(9): 18-23 (6 pages).
Benight et al., (2013) Stretchable and self-healing polymers and devices for electronic skin. Progress in Polymer Science 38(12): 1961-1977 (17 pages).
Bergman and Wudl (2008) Mendable polymers. Journal of Materials Chemistry 18(1): 41-62 (22 pages).
Blaiszik et al., (2010) Self-healing polymers and composites. Annual Review of Materials Research 40: 179-211 (35 pages).
Boland (2010) Flexible electronics: Within touch of artificial skin. Nat Mater 9(10): 790-792 (2 pages).
Canadell et al., (2011) Self-healing materials based on disulfide links. Macromolecules 44(8): 2536-2541 (6 pages).
Cao et al., (2018) A Highly Stretchy, Transparent Elastomer with the Capability to Automatically Self-Heal Underwater. Adv Mater 30(49): e1804602 (7 pages).
Chen et al., (2002) A thermally re-mendable cross-linked polymeric material. Science 295(5560): 1698-1702 (6 pages).
Chortos et al., (2016) Pursuing prosthetic electronic skin. Nat Mater 15(9): 937-950 (18 pages).
Cui et al., (2018) An Autolytic High Strength Instant Adhesive Hydrogel for Emergency Self-Rescue. Advanced Functional Materials 28(42): 1804925 (12 pages).
Dickey (2017) Stretchable and Soft Electronics using Liquid Metals. Adv Mater 29(27): 1606425 (19 pages).
Diesendruck et al., (2015) Biomimetic Self-Healing. Angew Chem Int Ed Engl 54(36): 10428-10447 (20 pages).
Gong and Cheng (2017) One-Dimensional Nanomaterials for Soft Electronics. Advanced Electronic Materials 3(3): 1600314; (30 pages).
Gou et al., (2014) Carbon nanotube chemiresistor for wireless pH sensing. Sci Rep 4: 4468; (6 pages).
Huynh and Haick (2016) Self-Healing, Fully Functional, and Multiparametric Flexible Sensing Platform. Adv Mater 28 (1): 138-143 (6 pages).
Huynh et al., (2016) Composites of Polymer and Carbon Nanostructures for Self-Healing Chemical Sensors. Advanced Materials Technologies 1(9): 1600187 (8 pages).
Huynh et al., (2017) Advanced Materials for Use in Soft Self-Healing Devices. Adv Mater 29(19): 1604973; (15 pages).
Idage et al., (1983) Azo initiators for the preparation of hydroxyl-terminated polybutadienes. Journal of Polymer Science: Polymer Chemistry Edition 21(2): 385-395 (11 pages).
Im et al., (2013) Characteristics of thermoplastic polyurethane composites containing surface treated multiwalled carbon nanotubes for the underwater applications. Macromol Res 21: 614-623 (10 pages).
Jacobs et al., (2010) Review: Carbon nanotube based electrochemical sensors for biomolecules. Anal Chim Acta 662 (2): 105-127 (23 pages).
Jeong et al., (2016) PDMS-Based Elastomer Tuned Soft, Stretchable, and Sticky for Epidermal Electronics. Adv Mater 28(28): 5830-5836 (7 pages).
Kang et al., (2018) Tough and Water-Insensitive Self-Healing Elastomer for Robust Electronic Skin. Adv Mater 30(13): 1706846 (8 pages).
Khatib et al., (2019) A Freestanding Stretchable and Multifunctional Transistor with Intrinsic Self-Healing Properties of all Device Components. Small 15(2): e1803939; (8 pages).
Khatib et al., (2021) Self-Healing Soft Sensors: From Material Design to Implementation. Adv Mater 33(11): e2004190; (33 pages).
Kim et al., (2017) Non-swellable self-healing polymer with long-term stability under seawater. RSC Adv 7: 19288-19295 (8 pages).
Kim et al., (2017) The quest for miniaturized soft bioelectronic devices. Nature Biomedical Engineering 1: Article No. 0049; (5 pages).
Kim et al., (2018) Superior Toughness and Fast Self-Healing at Room Temperature Engineered by Transparent Elastomers. Adv Mater 30(1): 1705145; (8 pages).

(56) References Cited

OTHER PUBLICATIONS

Krogsgaard et al., (2013) Self-healing mussel-inspired multi-pH-responsive hydrogels. Biomacromolecules 14(2): 297-301 (5 pages).
Lacour et al., (2011) Elastic components for prosthetic skin. Conf Proc IEEE Eng Med Biol Soc 2011: 8373-8376 (4 pages).
Lee and Nicholls (1999) Review Article Tactile sensing for mechatronics—a state of the art survey. Mechatronics 9(1): 1-31 (31 pages).
Li and Zuo (2020) Self-Healing Polymers Based on Coordination Bonds. Adv Mater 32(27): e1903762 (34 pages).
Li et al., (2017) Self-healable Gels for Use in Wearable Devices. Chem Mater 29(21): 8932-8952 (21 pages).
Li et al., (2020) Bioinspired Double-Dynamic-Bond Crosslinked Bioadhesive Enables Post-Wound Closure Care. Advanced Functional Materials 30(17): 2000130 (13 pages).
Li et al., (2020) Two-Pronged Strategy of Biomechanically Active and Biochemically Multifunctional Hydrogel Wound Dressing To Accelerate Wound Closure and Wound Healing. Chem Mater 32(23): 9937-9953 (17 pages).
Liang et al., (2021) Dual-Dynamic-Bond Cross-Linked Antibacterial Adhesive Hydrogel Sealants with On-Demand Removability for Post-Wound-Closure and Infected Wound Healing. ACS Nano 15(4): 7078-7093 (16 pages).
Liu et al., (2017) Lab-on-Skin: A Review of Flexible and Stretchable Electronics for Wearable Health Monitoring. ACS Nano 11(10): 9614-9635 (22 pages).
Maheshwari et al., (2006) High-Resolution Thin-Film Device to Sense Texture by Touch. Science 312(5779): 1501-1504 (5 pages).
Mannsfeld et al., (2010) Highly sensitive flexible pressure sensors with microstructured rubber dielectric layers. Nature Mater 9: 859-864 (7 pages).
Martin et al., (2014) The processability of a poly (urea-urethane) elastomer reversibly crosslinked with aromatic disulfide bridges. Journal of Materials Chemistry A 2(16): 5710-5715 (6 pages).
Matsuzaki et al., (2008) Rubber-based strain sensor fabricated using photolithography for intelligent tires. Sensors and Actuators A: Physical 148(1): 1-9 (9 pages).
Musto P., Galizia M., Scherillo G., Mensitieri G. (2014) Water Sorption Thermodynamics in Polymer Matrices. In: Davies P., Rajapakse Y. (eds) Durability of Composites in a Marine Environment. Solid Mechanics and Its Applications, vol. 208. Springer, Dordrecht; pp. 15-45 (32 pages).
Nagle et al., (2007) Infrared microspectroscopic study of the thermo-oxidative degradation of hydroxy-terminated bolybutadiene/isophorone diisocyanate polyurethane rubber. Polymer Degradation and Stability 92(8): 1446-1454 (9 pages).
Nicolay et al., (2010) Responsive gels based on a dynamic covalent trithiocarbonate cross-linker. Macromolecules 43 (9): 4355-4361 (7 pages).
Oh et al., (2016) Intrinsically stretchable and healable semiconducting polymer for organic transistors. Nature 539: 411-415 (11 pages).
Olichwer et al., (2012) Cross-Linked Gold Nanoparticles on Polyethylene: Resistive Responses to Tensile Strain and Vapors. ACS Appl Mater Interfaces 4(11): 6151-6161 (11 pages).
Rao et al., (2016) Stretchable Self-Healing Polymeric Dielectrics Cross-Linked Through Metal-Ligand Coordination. J Am Chem Soc 138(18): 6020-6027 (8 pages).
Rehman et al., (2011) Synthesis and Surface Properties of Hydroxy Terminated Polybutadiene-Based Polyurethane Elastomers by Varying Aliphatic Alkane Diols. Asian Journal of Chemistry 23(2): 880-884 (5 pages).
Rekondo et al., (2014) Catalyst-free room-temperature self-healing elastomers based on aromatic disulfide metathesis. Materials Horizons 1(2): 237-240 (5 pages).
Rogers et al., (2009) A curvy, stretchy future for electronics. Proc Natl Acad Sci U S A 106(27): 10875-10876 (3 pages).
Rossman MB (1981) Synthesis and characterization of polybutadiene-containing polyurethanes. Masters Theses 1911—Feb. 2014. 1923, University of Massachusetts Amherst. (77 pages).
Roy et al., (2015) DYNAMERS: dynamic polymers as self-healing materials. Chem Soc Rev 44(11): 3786-3807 (22 pages).
Schirrer et al., (1992) Water absorption, swelling, rupture and salt release in salt-silicone rubber compounds. Journal of Materials Science 27: 3424-3434 (11 pages).
Sedo et al., (2013) Catechol-based biomimetic functional materials. Adv Mater 25(5): 653-701 (50 pages).
Sekiguchi et al., (2015) Robust and Soft Elastomeric Electronics Tolerant to Our Daily Lives. Nano Lett 15(9): 5716-5723 (8 pages).
Sekitani et al., (2008) A Rubberlike Stretchable Active Matrix Using Elastic Conductors. Science 321(5895): 1468-1472 (6 pages).
Shafiq et al., (2012) Bioinspired underwater bonding and debonding on demand. Angew Chem Int Ed Engl 124(18): 4408-4411 (5 pages).
Sikder and Jana (2018) Effect of Solvent and Functionality on the Physical Properties of Hydroxyl-Terminated Polybutadiene (HTPB)-Based Polyurethane. ACS Omega 3(3): 3004-3013 (11 pages).
Someya et al., (2016) The rise of plastic bioelectronics. Nature 540(7633): 379-385 (7 pages).
Son and Bao (2018) Nanomaterials in Skin-Inspired Electronics: Toward Soft and Robust Skin-like Electronic Nanosystems. ACS Nano 12(12): 11731-11739. With Erratum (10 pages).
Spontak and Patel (2000) Thermoplastic elastomers: fundamentals and applications. Current Opinion in Colloid & Interface Science 5(5-6): 333-340 (8 pages).
Tang et al., (2021) Multifunctional Dressing for Wound Diagnosis and Rehabilitation. Adv Healthc Mater 10(22): e2101292 (12 pages).
Tee et al., (2012) An electrically and mechanically self-healing composite with pressure-and flexion-sensitive properties for electronic skin applications. Nature Nanotechnology 7(12): 825-832 (8 pages).
Wang et al., (2013) Self-healing chemistry enables the stable operation of silicon microparticle anodes for high-energy lithium-ion batteries. Nature Chemistry 5(12): 1042 (7 pages).
Wang et al., (2018) Materials and Structures toward Soft Electronics. Adv Mater 30(50): e1801368; (49 pages).
Wang et al., (2018) Skin-Inspired Electronics: An Emerging Paradigm. Acc Chem Res 51(5): 1033-1045 (13 pages).
Watanabe et al., (2017) Autonomic healing of thermoplastic elastomer composed of triblock copolymer. J Mater Sci 52: 1214-1220 (7 pages).
White et al., (2001) Autonomic healing of polymer composites. Nature 409(6822): 794-797 (5 pages).
Wu et al., (2008) Self-healing polymeric materials: a review of recent developments. Progress in Polymer Science 33 (5): 479-522 (44 pages).
Wu et al., (2017) Tough Self-Healing Elastomers by Molecular Enforced Integration of Covalent and Reversible Networks. Adv Mater 29(38): 1702616; (8 pages).
Wuelfing and Murray (2002) Electron hopping through films of arenethiolate monolayer-protected gold clusters. The Journal of Physical Chemistry B 106(12): 3139-3145 (7 pages).
Xia et al., (2016) Stabilization of catechol-boronic ester bonds for underwater self-healing and recycling of lipophilic bulk polymer in wider pH range. J Mater Chem A 4: 14122-14131 (10 pages).
Xing et al., (2016) Self-Healable Polymer Nanocomposites Capable of Simultaneously Recovering Multiple Functionalities. Advanced Functional Materials 26(20): 3524-3531 (8 pages).
Yin et al., (2011) Molecularly mediated thin film assembly of nanoparticles on flexible devices: electrical conductivity versus device strains in different gas/vapor environment. ACS Nano 5(8): 6516-6526 (11 pages).
Ying et al., (2011) Design and experiment of flexible multifunctional tactile sensors for robot skin. CAAI Transactions on Intelligence Technology 3(1): 30-41. with English translation (29 pages).
Zhang et al., (2019) A Highly Efficient Self-Healing Elastomer with Unprecedented Mechanical Properties. Adv Mater 31(23): e1901402; (8 pages).
Zhang et al., (2020) Research status of self-healing hydrogel for wound management: A review. Int J Biol Macromol 164: 2108-2123 (16 pages).

\* cited by examiner

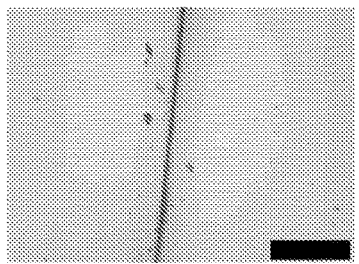 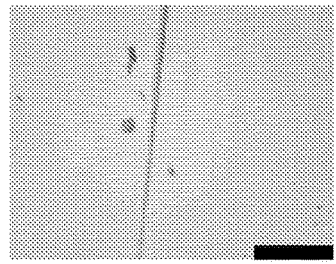 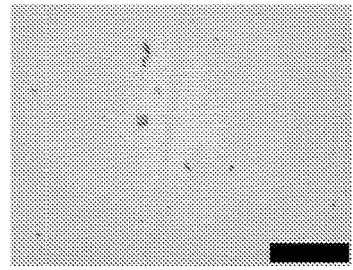
FIGURE 8A  FIGURE 8B  FIGURE 8C
  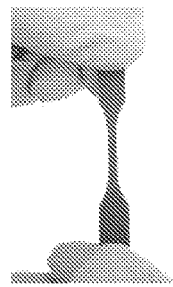 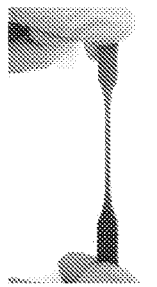
FIGURE 9A  FIGURE 9B  FIGURE 9C  FIGURE 9D
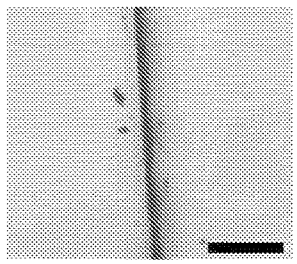 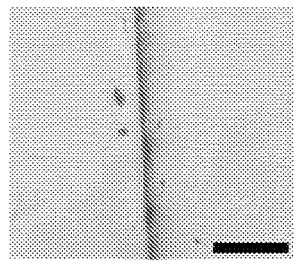 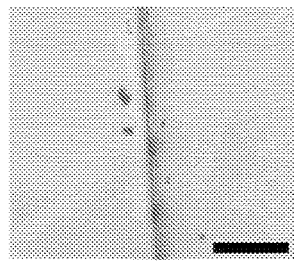 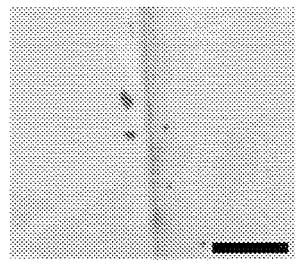
FIGURE 10A  FIGURE 10B  FIGURE 10C  FIGURE 10D
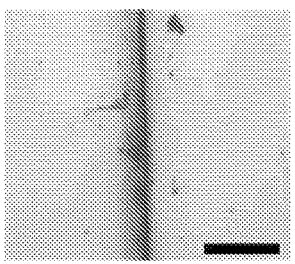 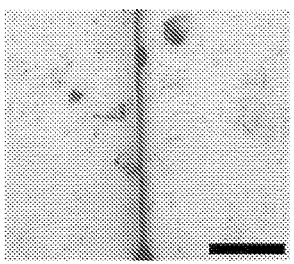 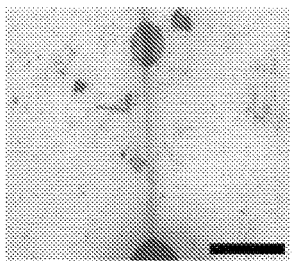 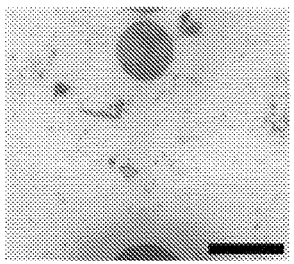
FIGURE 11A  FIGURE 11B  FIGURE 11C  FIGURE 11D

FIGURE 17A
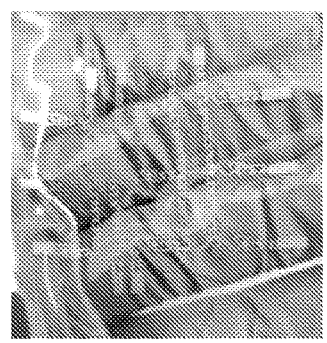 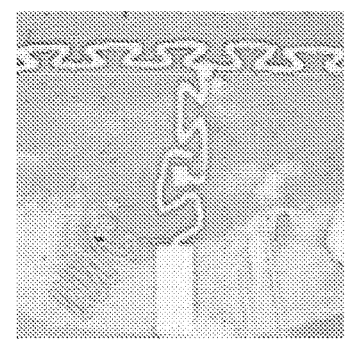
FIGURE 17B  FIGURE 17C
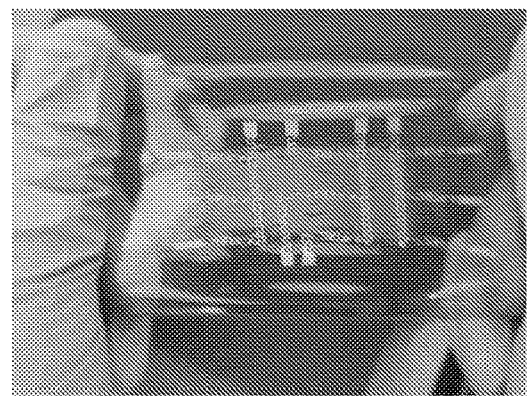
FIGURE 18

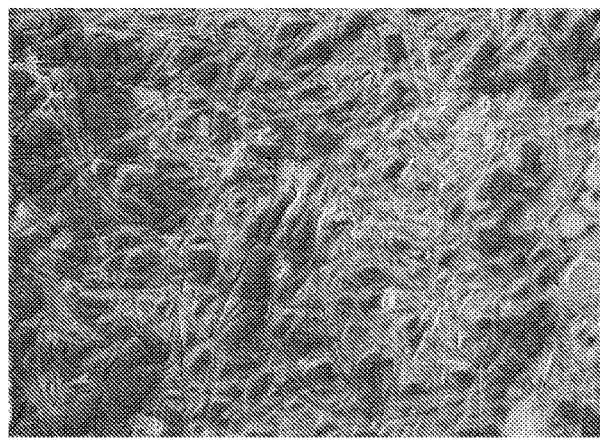
FIGURE 19A
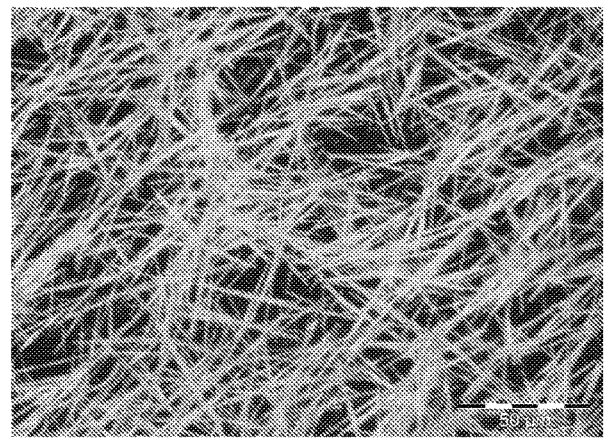
FIGURE 19B
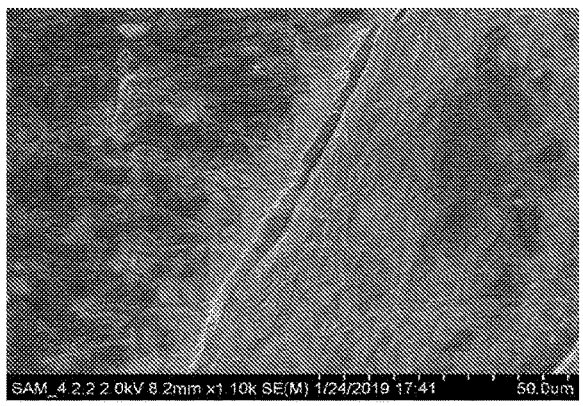 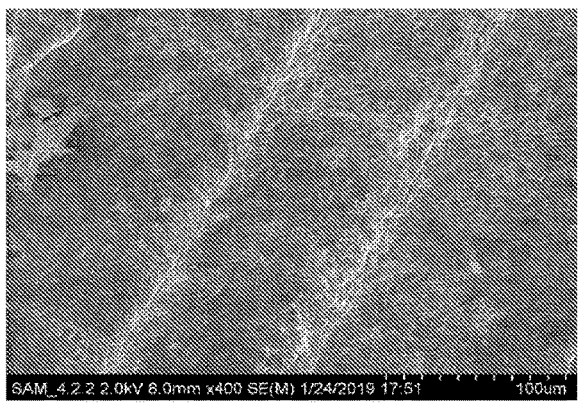
FIGURE 20A  FIGURE 20B

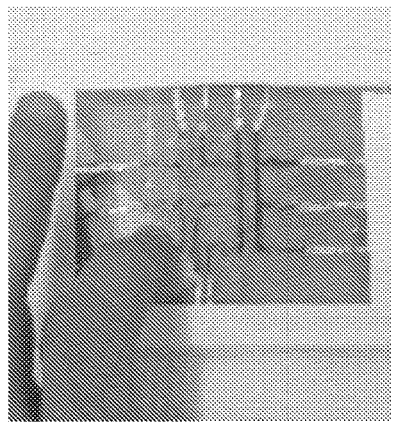
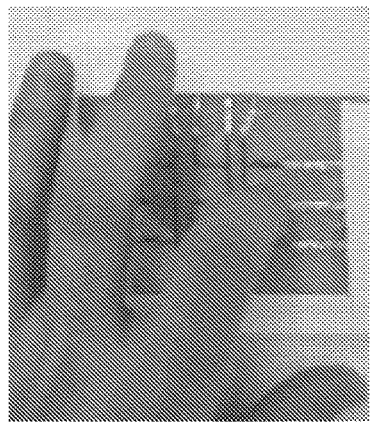
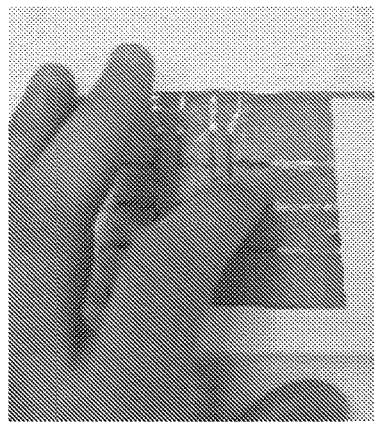
FIGURE 23A     FIGURE 23B     FIGURE 23C
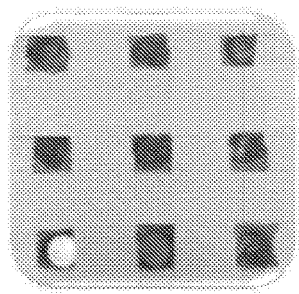
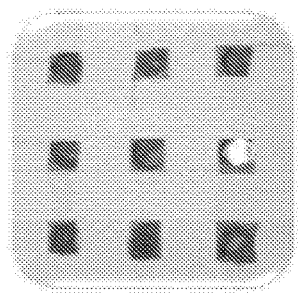
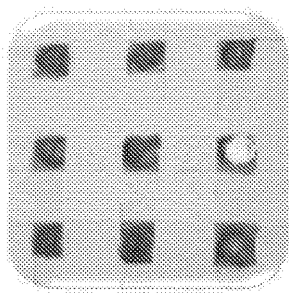
FIGURE 23D     FIGURE 23E     FIGURE 23F

HYDROLYTICALLY STABLE SELF-HEALING ELASTOMER

FIELD OF THE INVENTION

The present invention is directed to a hydrolytically-stable self-healing elastomer based on a polyurethane containing a polybutadiene backbone and aromatic disulfide moieties, and a method of preparation thereof.

BACKGROUND OF THE INVENTION

Soft electronics is the most promising next-generation technology for flexible and stretchable electronics through the implementation of soft nanomaterials. A special attention in the field of soft electronics has been directed towards biomimicking plants and animals to enable multi-functional physical and chemical sensitivities, thereby providing detection of temperature, pressure, humidity and (bio)chemical compounds, with long-term durability and survival features. For the latter, the integration of the self-healing ability is of high importance for recovering structural and functional damages and, as a result, increasing the life-time, reliability and sustainability of the devices.

US Patent Application Publication No. 2017/0008999 is directed to a self-healing permanently cross-linked polymer based on a covalently cured elastomeric network; the polymer having H-bonding interactions and being able to undergo catalyst free aromatic disulfide metathesis at room-temperature, and having a tensile strength value from 0.5 to 1.5 MPa and an elongation at break value higher than 200% at room-temperature.

US Patent Application Publication No. 2018/0231486 to some of the inventors of the present invention discloses a self-healing platform unit for pressure and analyte sensing, and a method for fabrication thereof, the platform unit comprising a self-healing substrate comprising a dynamically crosslinked polymer comprising polymeric chains and crosslinking bridges; at least one self-healing electrode comprising a non-crosslinked polymer and metal microparticles dispersed therein.

Additional desirable feature of the soft electronics devices is insensitivity to water or stability in underwater conditions, as such devices are often exposed to varying environmental humidity levels, sweat (in case of skin sensors) and water from external sources such as rain. Soft electronics based on water-sensitive materials, such as, for example, water-absorbing polymers, are prone to inferior functional properties and structural deterioration in high humidity conditions.

Previously reported self-healing materials for underwater applications can be categorized according to the type of dynamic bonds: i) boronic acid derivatives that contain boronic-ester or boroxine bonds (C. Kim, H. Ejima, N. Yoshie, Non-swellable self-healing polymer with long-term stability under seawater. *RSC Adv.* 7, 19288-19295 (2017); N. N. Xia, M. Z. Rong, M. Q. Zhang, Stabilization of catechol-boronic ester bonds for underwater self-healing and recycling of lipophilic bulk polymer in wider pH range. *J. Mater. Chem. A.* 4, 14122-14131 (2016)) and ii) nature-inspired and hydrogen-forming catechol groups (Z. Shafiq, J. Cui, L. Pastor-Perez, V. San Miguel, R. A. Gropeanu, C. Serrano, A. del Campo, Bioinspired underwater bonding and debonding on demand. *Angew. Chem.* 124, 4408-4411 (2012); B. K. Ahn, D. W. Lee, J. N. Israelachvili, J. H. Waite, Surface-initiated self-healing of polymers in aqueous media. *Nat. mater.* 13, 867 (2014); M. Krogsgaard, M. A. Behrens, J. S. Pedersen, H. Birkedal, Self-healing mussel-inspired multi-pH-responsive hydrogels. *Biomacromolecules.* 14, 297-301 (2013)). However, both types of materials have certain limitations: the boronic acid derivatives suffer from severe hydrolysis and have limited stability in the underwater conditions, while the catechol groups are pH-sensitive (D. G. Hall, *Boronic Acids: Preparation, Applications in Organic Synthesis and Medicine* (John Wiley & Sons, 2006); J. Sedó, J. Saiz-Poseu, F. Busqué, D. Ruiz-Molina, Catechol-based biomimetic functional materials. *Adv. Mater.* 25, 653-701 (2013)). For example, a transparent elastomer that reportedly can self-heal via hydrophobic C—F bonds under water at different acidity levels had a relatively low self-healing efficiency (e.g., only 20% efficiency after 3 hours of healing). Reaching higher self-healing efficiencies required heating the elastomer to 60° C., which provided 33% self-healing efficiency in 3 hours and 82% in 24 hours (Y. Cao, H. Wu, S. I. Allec, B. M. Wong, D. S. Nguyen, C. Wang, A highly stretchy, transparent elastomer with the capability to automatically self-Heal underwater. *Adv. Mater.* 30, 1804602 (2018)). In a recent report, specially designed self-healing polymers for underwater applications, in which the self-healing property stems from hydrogen bonding, was disclosed (J. Kang, D. Son, G. J. N. Wang, Y. Liu, J. Lopez, Y. Kim, J. Y. Oh, T. Katsumata, J. Mun, Y. Lee, Tough and water-insensitive self-Healing elastomer for robust electronic skin. *Adv. Mater.* 30, 1706846 (2018)). However, due to the existence of oxygen atoms in the main repeating unit of the polymeric structure and its high water permeability, swelling and mechanical deterioration under a long-term exposure to water are highly probable, especially for the non-cross-linked polymer (Gubbels, F., Dow Corning, and Europe Sa. "11. Silicones in the Electronics Industries" (2007)).

Polyurethanes are frequently used in waterproof and underwater applications. However, carbamate linkages of polyurethanes are prone to hydrolysis and the chemical changes involved result in a deterioration in properties of the material. Additionally, widely-used polyester-based polyurethanes have less than desirable water-resistance properties due to hydrolysis of the ester group. In order to increase water resistivity of commercially available polyurethanes, composite polymers comprising various inorganic materials, such as, for example, coronate salts or carbon nanotubes, can be prepared (U.S. Pat. No. 8,383,713; Im, H., Roh, S. C. & Kim, C. K. Macromol. Res. (2013) 21: 614).

Hydroxyl-terminated polybutadiene (HTPB) possesses peculiar inherent properties such as excellent hydrolytic stability, low-temperature flexibility, and high solid loading capacity. However, most of the commercially available large-scale hydroxyl-terminated polybutadienes are manufactured by a free radical polymerization technology, yielding polyols with functionality exceeding the value 2.0. This excess functionality leads to the production of thermosetting polyurethanes which contain urethane crosslinks and are essentially insoluble (Rossman, Mark B., "Synthesis and characterization of polybutadiene-containing polyurethanes." (1981). Masters Theses 1911-February 2014. 1923, University of Massachusetts Amherst). Furthermore, polyurethanes derived from polybutadiene polyols often fail to provide the same level of mechanical performance that is observed with polyether and polyester polyols, which is essentially important in the development of a self-healing polymeric material. In particular, such polybutadiene-based elastomers suffer from poor tear strengths and low elongation at break. The modest mechanical properties of the polybutadiene containing polyurethane elastomers are also attributed, at least partially, to the high functionality of the commercially available polybutadiene polyols. Additional disadvantage of HTPB-based polyurethanes, associated with long-term use applications, is their tendency to be easily oxidized due to the existence of carbon double bonds (Dylan J. Nagle, Mathew Celina, Llewellyn Rintoul, Peter M. Fredericks, Infrared microspectroscopic study of the thermo-oxidative degradation of hydroxy-terminated polybutadiene/isophorone diisocyanate polyurethane rubber, Polymer Degradation and Stability, Volume 92, Issue 8, 2007, Pages 1446-1454).

There remains, therefore, an unmet need for hydrolytically and mechanically stable self-healing elastomers for use in soft electronics applications. Preferably, such elastomers should be solution-processable to make their use more appealing.

SUMMARY OF THE INVENTION

The present invention provides a self-healing thermoplastic elastomer having exceptional hydrolytic stability and a method of preparation of said elastomer. The elastomer contains soft and hard segments, the hard segments containing polyurethane and aromatic disulfide moieties and soft segments containing polybutadiene polymer backbone, wherein the hard segments are responsible for the dynamic cross-linking of the elastomer and the soft segments afford for the thermoplastic properties thereof. It has been shown by the inventors of the present invention that said specific composition of the elastomer essentially prevents water diffusion into soft segments, thereby increasing its hydrolytic stability.

The present invention is based in part on the unexpected finding that a self-healing efficiency of surface scratches of the elastomer in wet and underwater conditions is comparable to its self-healing efficiency in air. In particular, the elastomer exhibited above 80% self-healing efficiency in harsh humidity and/or (under)water conditions without the assistance of any external physical and/or chemical triggers. Without wishing to being bound by theory or mechanism of action, it is contemplated that the interaction of water molecules only with the hard segments of the elastomer leads to an increased softness on the damaged area, which allows faster rearrangement of the surface and more efficient recovery. The polybutadiene-containing self-healing elastomer is solution-processable and can beneficially be used in various soft electronics applications, and in particular, those requiring increased sustainability and durability in high humidity or underwater conditions.

The elastomer can be prepared by reacting an isocyanate-functionalized polybutadiene polymer with an aromatic disulfide, wherein the isocyanate can be conveniently prepared by modifying a commercially-available hydroxyl-terminated polybutadiene with a diisocyanate compound. It has further been surprisingly found that even when using an HTBP with functionality of higher than 2.0, the resultant polymer showed excellent mechanical properties, such as high stretchability and ultimate strength that can reach 1100% and about 6.5 MPa, respectively. Preferably, the elastomer is formed by using aliphatic isocyanate moieties.

According to one aspect, the present invention provides an elastomer comprising polymeric chains comprising units of formula (A1)

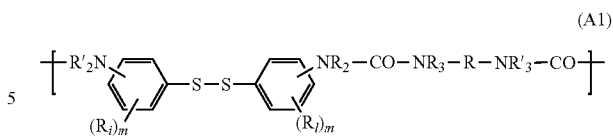

(A1)

wherein
R is a polybutadiene-containing polyurethane;
$R_1$ and $R_{1'}$ are independently selected from the group consisting of: —H, $(C_1-C_{20})$alkyl, $(C_5-C_{14})$aryl, —$OR_4$, —$(CO)R_5$, —$O(CO)R_6$, —$(SO)R_7$, $CO$—$R_8$, —$COOR_9$, —$NO_2$, and halogen;
$R_2$, $R_{2'}$, $R_3$ and $R_{3'}$ are independently selected from the group consisting of: —H, $(C_1-C_{20})$alkyl and $(C_5-C_{14})$aryl;
$R_4$ to $R_9$ are the same or different, and are independently selected from the group consisting of: —H, $(C_1-C_{20})$alkyl, and $(C_5-C_{14})$aryl;
m is 4;
wherein the elastomer is dynamically crosslinked by aromatic disulfide metathesis, and
wherein the elastomer has a water contact angle of above 100°.

According to some embodiments, R is a polybutadiene-containing aliphatic polyurethane.

According to some embodiments, the polymeric chains comprise from about 5 to about 100 units of formula (A1) per chain. According to further embodiments, the elastomer has a molecular weight ranging from about 10 kg/mole to about 200 kg/mole.

According to some embodiments, $R_1$, $R_{1'}$, $R_2$, $R_{2'}$, $R_3$ and $R_{3'}$ are —H.

In certain embodiments, the unit of formula (A1) is

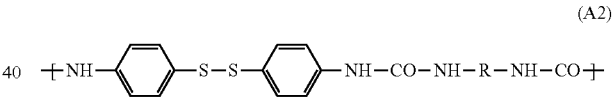

(A2)

According to some related embodiments, the elastomer is further dynamically crosslinked by hydrogen bonds between urea groups.

According to some embodiments, the polybutadiene-containing polyurethane (R) comprises 1,3-butadiene derived-monomer units of formula (B1), formula (B2), and formula (B3),

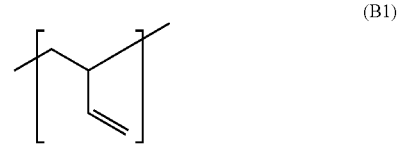

(B1)

(B2)

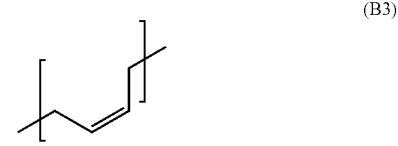

(B3)

wherein the proportion of the monomer unit of formula (B1) is 10 to 60 mole percent, the proportion of the monomer unit of formula (B2) is 20 to 70 mole percent, and the proportion of the monomer unit of formula (B3) is 10 to 50 mole percent in the entirety of the 1,3-butadiene-derived monomer units present in one unit of formula (A). According to further embodiments, the polybutadiene-containing polyurethane comprises about 20 mole percent monomer units of formula (B1), 60 mole percent monomer units of formula (B2), and 20 mole percent monomer units of formula (B3) out of the entirety of the 1,3-butadiene-derived monomer units present in one unit of formula (A1).

In certain embodiments, the polybutadiene-containing polyurethane (R) comprises from about 0 to about 80 mole percent of 1,3-butadiene derived-monomer units in which the C=C double bond is hydrogenated.

According to some currently preferred embodiments, the polybutadiene-containing polyurethane (R) comprises an aliphatic urethane unit, —O—CO—NH—$R_{10}$—, wherein $R_{10}$ is a linear or cyclic ($C_4$-$C_{10}$)alkyl. According to further embodiments, $R_{10}$ is selected from the group consisting of 1,1,3,3-tetramethyl cyclohexyl, butyl, hexyl, and decyl. According to certain embodiments, $R_{10}$ is 1,1,3,3-tetramethyl cyclohexyl.

In some exemplary embodiments, the unit of formula (A1) is

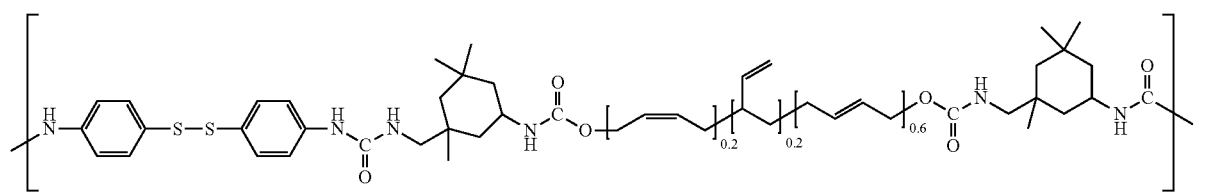

(A3)

According to some embodiments, the elastomer has a tensile strength value above 1.5 MPa and an elongation at break value higher than 500% at room-temperature According to further embodiments, the elastomer has a self-healing efficiency of at least about 80% in 100% relative humidity and/or underwater conditions.

In another aspect there is provided a method for preparing an elastomer, the method comprising reacting an isocyanate-functionalized polybutadiene polymer with an aromatic disulfide of formula (C1):

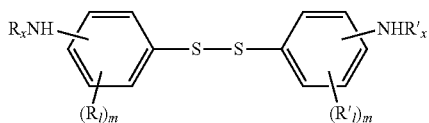

(C1)

wherein
$R_1$ and $R_{1'}$ are independently selected from the group consisting of: —H, ($C_1$-$C_{20}$)alkyl, ($C_5$-$C_{14}$)aryl, —$OR_4$, —(CO)$R_5$, —O(CO)$R_6$, —(SO)$R_7$, CO—$R_8$, —COO$R_8$, —NO$_2$ and halogen;
$R_4$ to $R_9$ are the same or different, and are independently selected from the group consisting of: —H, ($C_1$-$C_2$)alkyl, and ($C_5$-$C_{14}$)aryl;
m is 4;

$R_x$ and $R_{x'}$ are the same or different, and are independently selected from the group consisting of H, ($C_1$-$C_{20}$)alkyl, -and ($C_5$-$C_{14}$)aryl,
wherein the reaction is performed at a temperature ranging from −30 to 200° C., and
wherein the molar ratio between amine and isocyanate groups ranges from 0.7 to 1.3.

According to some embodiments, the isocyanate-functionalized polybutadiene polymer has functionality of above 2.1. According to further embodiments, the reaction is performed for up to about 96 hours. In some exemplary embodiments, the method comprises adding methanol to the mixture of the isocyanate-functionalized polybutadiene polymer and the aromatic disulfide of formula (C1) following 24 hours from the start of the reaction, wherein methanol is in molar excess relatively to amine and isocyanate groups.

According to some embodiments, the molar ratio between amine and isocyanate groups is 1.

According to some embodiments, $R_1$, $R_{1'}$, $R_x$, and $R_{x'}$ are H.

According to some embodiments, the isocyanate-functionalized polybutadiene polymer is an aliphatic polymer. According to further embodiments, the isocyanate-functionalized polybutadiene polymer comprises 1,3-butadiene derived-monomer units of formula (B1), formula (B2), and formula (B3), wherein the proportion of the monomer unit of formula (B1) is 10 to 60 mole percent, the proportion of the monomer unit of formula (B2) is 20 to 70 mole percent, and the proportion of the monomer unit of formula (B3) is 10 to 50 mole percent in the entirety of the 1,3-butadiene-derived monomer units present in the isocyanate-functionalized polybutadiene polymer. In certain embodiments, the isocyanate-functionalized polybutadiene polymer comprises about 20 mole percent monomer units of formula (B1), 60 mole percent monomer units of formula (B2), and 20 mole percent monomer units of formula (B3).

According to additional embodiments, the isocyanate-functionalized polybutadiene polymer comprises from about 0 to about 80 mole percent of 1,3-butadiene derived-monomer units in which the C=C double bond is hydrogenated.

The isocyanate-functionalized polybutadiene polymer can be formed by reacting a hydroxyl-terminated polybutadiene (HTPB) with a diisocyanate compound. In some currently preferred embodiments, said diisocyanate compound is an aliphatic diisocyanate compound. In further embodiments, said aliphatic diisocyanate compound is selected from the group consisting of isophorone diisocyanate (IPDI), 1,4-tetramethylene diisocyanate, 1,6-hexamethylene diisocyanate (HDI), and 1,1-O-decamethylene diisocyanate. Each possibility represents a separate embodiment of the invention. According to certain embodiments, said aliphatic diisocyanate compound is IPDI.

According to some embodiments, the hydroxyl-terminated polybutadiene (HTPB) is linear.

According to some embodiments, the hydroxyl-terminated polybutadiene comprises 1,3-butadiene derived-monomer units of formula (B1), formula (B2), and formula (B3), wherein the proportion of the monomer unit of formula (B1) is 10 to 60 mole percent, the proportion of the monomer unit of formula (B2) is 20 to 70 mole percent, and the proportion of the monomer unit of formula (B3) is 10 to 50 mole percent in the entirety of the 1,3-butadiene-derived monomer units present in the HTPB. In certain embodiments, the hydroxyl-terminated polybutadiene comprises about 20 mole percent monomer units of formula (B1), 60 mole percent monomer units of formula (B2), and 20 mole percent monomer units of formula (B3).

According to some additional embodiments, the hydroxyl-terminated polybutadiene comprises from about 0 to about 80 mole percent of 1,3-butadiene derived-monomer units in which the C=C double bond is hydrogenated.

According to some embodiments, the hydroxyl-terminated polybutadiene has a molecular weight ranging from about 1000 g/mole to about 6000 g/mole. In certain embodiments, the hydroxyl-terminated polybutadiene has a hydroxyl functionality of above 2.1.

In another aspect, there is provided an elastomer obtained by the method according to the various embodiments listed hereinabove.

In another aspect, there is provided a sensor comprising a substrate and at least two electrodes, wherein the substrate is made of the elastomer according to the various embodiments hereinabove, and the electrodes comprise a micro-sized or nanosized conductive material embedded within or deposited onto the substrate.

The conductive material can be selected from the group consisting of metal, metal alloy, metal carbide, metal nitride, metal oxide, metal silicide, carbon, polymer, ceramics, and combinations thereof. According to certain embodiments, the conductive material is a nanosized material having a form selected from the group consisting of nanoparticles, nanowires, nanotubes, nanoflakes, nanofibers, nanoribbons, nano-whiskers, nanostrips, nanorods, and combinations thereof. Each possibility represents a separate embodiment of the invention.

According to some exemplary embodiments, the sensor is in a form of a field effect transistor, comprising a substrate, at least one source electrode, at least one drain electrode, at least one gate electrode, and at least one channel, wherein the channel comprises semi-conducting nanosized material deposited onto the substrate and/or the at least one source electrode and at least one drain electrode.

According to further embodiments, the conductive material is selected from the group consisting of metal, metal alloy, metal carbide, metal nitride, metal oxide, metal silicide, carbon, polymer, ceramics, any combinations thereof. In yet further embodiments, the conductive material is a nanosized material having a form selected from the group consisting of nanoparticles, nanowires, nanotubes, nanoflakes, nanofibers, nanoribbons, nano-whiskers, nanostrips, nanorods, and combinations thereof. In still further embodiments, the semi-conducting material is selected from the group consisting of carbon, silicon, and combinations thereof. In yet further embodiments, the semi-conducting material has a form selected from the group consisting of nanowires, nanotubes, nanofibers, nanoribbons, nano-whiskers, nanostrips, nanorods, and combinations thereof. Each possibility represents a separate embodiment of the invention.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 8A-8C: Optical images showing the self-healing process progress for a surface scratch at 25° C., at 0 hours following scratch (FIG. 8A), at 2 hours following scratch (FIG. 8B), and at 24 hours following scratch (FIG. 8C). Scale bar: 100 μm.

FIGS. 9A-9D: Photographs of the polymer showing the self-healing ability and the recovery of stretchability after a complete cut, FIG. 9A showing a pristine polymer, FIG. 9B showing a cut polymer, FIG. 9C showing a healed polymer, and FIG. 9D showing a stretched polymer.

FIGS. 10A-10D: Optical images showing the self-healing process progress for a surface cut (~10 μm in width) at 25° C. in air, at 0 hours following cut (FIG. 10A), at 2 hours following cut (FIG. 10B), at 8 hours following cut (FIG. 10C), and at 16 hours following cut (FIG. 10D). Scale bar: 100 μm.

FIGS. 11A-11D: Optical images showing the self-healing process progress for a surface cut (~10 μm in width) at 25° C. in tap water, at 0 hours following cut (FIG. 11A), at 2 hours following cut (FIG. 11B), at 8 hours following cut (FIG. 11C), and at 16 hours following cut (FIG. 11D). Scale bar: 100 μm.

FIGS. 13A-13C: Graphs showing stress-strain healing efficiencies of the PBPUU polymer under different aqueous conditions including tap water, sea water, acidic solution (pH=3) and basic solution (pH=11), wherein FIG. 13A shows stress-strain curve of the PBPUU polymer after healing, wherein the healing duration was 16 hr and the stretching rate was 100 mm min$^{-1}$, FIG. 13B shows columns representing the healing efficiencies of the polymer after 16 hr and under different conditions, and FIG. 13C shows stress-strain curves obtained after conditioning for 1 month under different environments.

FIGS. 17A-17C: Photographs showing self-healing AgNW-based tactile sensor array (FIGS. 17A and 17B showing different sections of the sensor array and FIG. 17C showing an enlargement of one of the sectors of FIG. 17B).

FIG. 18: Photograph showing the stretchability of the self-healing AgNW-based tactile sensor array.

FIG. 19A: Scanning electron microscopy (SEM) image of the AgNWs embedded into the surface of PBPUU used for electrodes. Scale bar: 30 μm.

FIG. 19B: Optical microscope image of the AgNWs used for the preparation of the electrodes.

FIG. 20A: SEM image showing a surface cut made on the AgNW-PBPUU-based electrode.

FIG. 20B: SEM image of two healed cuts showing the recovery of the conductive pathway.

FIGS. 21A-21C: Photographs shot during the fabrication process, wherein FIG. 21A shows paper shadow mask prepared by a laser cutter machine, FIG. 21B shows spray-printed AgNWs on top of a modified silicon wafer and FIG. 21C shows peeled-of self-healing and stretchable tactile sensor array.

FIGS. 23A-23F: Photographs showing LEDs (FIGS. 23A-23C) and their corresponding response to touch (FIGS. 23D-23F). FIGS. 23B and 23C are associated with the same sensor before (FIG. 23B) and after (FIG. 23C) self-healing of the electrodes.

DETAILED DESCRIPTION OF THE INVENTION

Figure 1:
FIG. 1: Photograph of the polybutadiene poly(urea-urethane) (PBPUU) dissolved in tetrahydrofuran (THF).

The present invention provides a self-healing thermoplastic elastomer with exceptional water insensitivity. The elastomer is based on the combination of polyurethane, aromatic disulfide, and polybutadiene, which form hard and soft segments, which afford for its hydrolytic stability, as well as excellent mechanical and self-healing properties, in particular in aqueous conditions.

According to one aspect, the present invention provides an elastomer comprising polymeric chains comprising units of formula (A1)

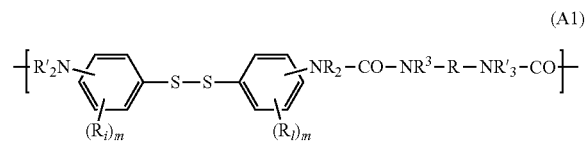

wherein the elastomer is dynamically crosslinked by aromatic disulfide metathesis, and wherein the elastomer has a water contact angle of above 100°.

Advantageously, the elastomer according to the principles of the present invention, is solution-processable (i.e., soluble, in common solvents), thereby being suitable for various technological applications. In some embodiments, the term "solution-processable" refers to a solubility of at least about 50 mg of the elastomer in 100 g of a solvent.

The term "thermoplastic elastomer", as used herein, refers to a polymeric material that has elastomer-like properties and has thermoplastic processability and recyclability. The term "elastomer", as used herein, refers to a polymeric material which exhibits a combination of high elongation or extensibility, high retractability to its original shape or dimensions after removal of the stress or load, with little or no plastic deformation and possesses low modulus and requires a low load to stretch the material. The terms "polymeric material" and "polymer" refer to a macromolecule composed of many repeated subunits, known as monomers. Polymers, both natural and synthetic, are created via polymerization of many monomers. The polymer is composed of polymer chains, said chains being linear or branched.

The term "self-healing", as used herein, refers in some embodiments to the ability of the elastomer to spontaneously physically recombine following mechanical damage. The term "mechanical damage", as used herein, refers to a partial or full disassociation between two parts of the elastomer. Mechanical damage applied to the elastomer may include, inter alia, a scratch, a partial cut or a full cut. The term "scratch", as used herein refers to a disassociation depth of up to about 10% of the elastomer thickness. The term "partial cut", as used herein refers to a disassociation depth of above about 10% but less than 100% of the elastomer thickness. The term "full cut", as used herein refers to a disassociation depth of 100% of the elastomer thickness. Mechanical damage can include multiple cycles of mechanical damage.

The terms "spontaneous" or "spontaneously", as used herein, refer to the type of process, which does not require application of energy such as, for example, heating, or a promoter, such as, for example, a catalyst, to occur.

The terms "crosslinked" and "crosslinking", as used herein, refer to covalent bonds and/or hydrogen bonds formed between the polymeric chains of the elastomer. The terms "dynamically crosslinked" and "dynamic crosslinking", as used herein, refer to covalent bonds and/or hydrogen bonds formed between the polymeric chains of the elastomer, which can be cleaved and spontaneously reformed.

The term "aromatic disulfide metathesis", as used herein, refers to a chemical process involving the exchange of bonds between two aromatic disulfide groups, which results in the creation of products with similar or identical bonding affiliations.

The term "hydrolytically stable", as used herein, means that when the elastomer is in contact with water, e.g., being placed in water or in environment with relative humidity of above about 70%, the elastomer will not change in chemical composition through hydrolysis.

According to some embodiments, the polymeric chains comprise from about 5 to about 100 units of formula (A1) per chain. Said chains are dynamically crosslinked by aromatic disulfide metathesis. Said chains can further be dynamically crosslinked by hydrogen bonds between urea groups. According to further embodiments, the polymeric chains comprise from about 10 to about 90 units of formula (A1) per chain. In yet further embodiments, the polymeric chains comprise from about 20 to about 80 units of formula (A1) per chain. In still further embodiments, the polymeric chains comprise from about 30 to about 70 units of formula (A1) per chain.

According to some embodiments, the elastomer has a molecular weight ranging from about 10 kg/mole to about 200 kg/mole. In further embodiments, the elastomer has a molecular weight ranging from about 20 kg/mole to about 100 kg/mole. In some exemplary embodiments, the elastomer has a molecular weight of about 45 kg/mole.

According to some embodiments, the elastomer has a tensile strength value above 1.5 MPa at room temperature. The terms "tensile strength" and "ultimate tensile stress", as used herein interchangeably, refer to the maximum stress that a material can withstand while being stretched or pulled before failing or breaking.

According to further embodiments, the tensile stress of the elastomer is above 3 MPa at room temperature. According to yet further embodiments, the tensile stress of the elastomer is above 5 MPa at room temperature. Tensile strength parameter can be determined following ISO 527-1 standard.

According to some embodiments, the elastomer has an elongation at break value higher than 500% at room-temperature. The term "elongation at break", as used herein, refers to the maximum elongation that a material can withstand while being stretched or pulled before failing or breaking. According to further embodiments, the elastomer has an elongation at break value higher than 600% at room-temperature. According to yet further embodiments, the elastomer has an elongation at break value higher than 800% at room-temperature. Elongation at break parameter can be determined following ISO 527-1 standard.

The term "room-temperature" denotes a temperature ranging from 15 to 30° C.

According to some embodiments, the elastomer has a self-healing efficiency of at least about 80% in ambient conditions. The term "ambient conditions" as used herein, refers to a room temperature and 65%-75% relative humidity.

The term "self-healing efficiency", as used herein, refers in some embodiments to the ability of the elastomer to retain its original tensile stress and/or elongation at break parameters following mechanical damage to a certain extent. For example, in the context of the present invention, a self-healing efficiency of about 80% can refer to the ability of the elastomer to retain 80% of its original tensile stress and/or elongation at break parameters. The term "original", as used in connection to the mechanical parameters refers to these parameters before the infliction of the mechanical damage.

According to some embodiments, the elastomer has a self-healing efficiency of at least about 85% in ambient conditions. According to some embodiments, the elastomer has a self-healing efficiency of at least about 90% in ambient conditions.

In some embodiments, the elastomer retains at least about 80% of its original tensile strength in ambient conditions following mechanical damage. In further embodiments, the elastomer retains at least about 85% of its original tensile strength.

In some embodiments, the elastomer retains at least about 85% of its original elongation at break in ambient conditions following mechanical damage. In further embodiments, the elastomer retains at least about 90% of its original elongation at break.

According to some embodiments, the elastomer has a self-healing efficiency of at least about 70% in 100% relative humidity. According to some embodiments, the elastomer has a self-healing efficiency of at least about 70% in underwater conditions. The term "underwater conditions" refers to a case wherein at least 80% of the elastomer surface is covered by water on an aqueous solution, wherein said aqueous solution can be either acidic (eg. having pH of about 2-6) or alkaline (e.g., having a pH of about 8~12).

According to some embodiments, the elastomer has a self-healing efficiency of at least about 75% in 100% relative humidity According to some embodiments, the elastomer has a self-healing efficiency of at least about 75% in underwater conditions.

According to some embodiments, the elastomer has a self-healing efficiency of at least about 80% in 100% relative humidity. According to some embodiments, the elastomer has a self-healing efficiency of at least about 80% in underwater conditions.

According to some embodiments, the elastomer has a self-healing efficiency of at least about 85% in 100% relative humidity. According to some embodiments, the elastomer has a self-healing efficiency of at least about 85% in underwater conditions.

In some embodiments, the elastomer retains at least about 70% of its original tensile strength in 100% humidity or underwater conditions following mechanical damage. In further embodiments, the elastomer retains at least about 75% of its original tensile strength.

In some embodiments, the elastomer retains at least about 75% of its original elongation at break in 100% humidity or underwater conditions following mechanical damage. In further embodiments, the elastomer retains at least about 80% of its original elongation at break.

According to some embodiments, the elastomer has a glass transition temperature (Tg) below 0° C. According to further embodiments, the elastomer has a glass transition temperature (Tg) below 10° C. According to still further embodiments, the elastomer has a glass transition temperature (Tg) below 20° C. According to yet further embodiments, the elastomer has a glass transition temperature (Tg) below 30° C. According to still further embodiments, the elastomer has a glass transition temperature (Tg) below 40°. According to yet further embodiments, the elastomer has a glass transition temperature (Tg) below 50° C.

According to some embodiments, the elastomer is thermally stable up to about 150° C. In further embodiments, the elastomer is thermally stable up to about 200° C.

According to an aspect and various embodiments of the present invention, R in the unit of formula (A1) is a polybutadiene-containing polyurethane.

The polybutadiene-containing polyurethane (R) can be either aliphatic or aromatic. In some currently preferred embodiments, R is a polybutadiene-containing aliphatic polyurethane.

It has further been found that the self-healing elastomer, comprising polybutadiene backbone is more hydrophobic than other polymers, which are typically used in underwater applications, such, for example, PDMS. According to some embodiments, the elastomer has a water contact angle of about 103°. Without wishing to being bound by theory or mechanism of action, the high water contact angle reflects the high hydrolytic stability of the elastomer.

According to some embodiments, the polybutadiene-containing polyurethane comprises 1,3-butadiene derived-monomer units of formula (B1), formula (B2), and formula (B3),

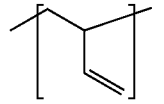
(B1)

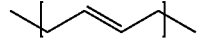
(B2)

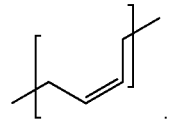
(B3)

In some embodiments, the proportion of the monomer unit of formula (B1) in the entirety of the 1,3-butadiene-derived monomer units present in one unit of formula (A1) is 10 to 60 mole percent. In further embodiments, the proportion of the monomer unit of formula (B1) in the entirety of the 1,3-butadiene-derived monomer units present in one unit of formula (A1) is 10 to 30 mole percent.

In some embodiments, the proportion of the monomer unit of formula (B2) in the entirety of the 1,3-butadiene-derived monomer units present in one unit of formula 10 (A1) is 20 to 70 mole percent. In further embodiments, the proportion of the monomer unit of formula (B2) in the entirety of the 1,3-butadiene-derived monomer units present in one unit of formula (A1) is 50 to 70 mole percent.

In some embodiments, the proportion of the monomer unit of formula (B3) in the entirety of the 1,3-butadiene-derived monomer units present in one unit of formula 15 (A) is 10 to 50 mole percent. In further embodiments, the proportion of the monomer unit of formula (B3) in the entirety of the 1,3-butadiene-derived monomer units present in one unit of formula (A1) is 10 to 30 mole percent.

According to some exemplary embodiments, the polybutadiene-containing polyurethane comprises about 20 mole percent monomer units of formula (B1), 60 mole percent monomer units of formula (B2), and 20 mole percent monomer units of formula (B3) out of the entirety of the 1,3-butadiene-derived monomer units present in one unit of formula (A1).

Some of the 1,3-butadiene derived-monomer units in the polybutadiene-containing polyurethane can be saturated. Accordingly, in certain embodiments, the polybutadiene-containing polyurethane comprises from about 0 to about 80 mole percent of 1,3-butadiene derived-monomer units in which the C=C double bond is hydrogenated. In further embodiments, the polybutadiene-containing polyurethane comprises from about 10 to about 70 mole percent of 1,3-butadiene derived-monomer units in which the C=C double bond is hydrogenated. In still further embodiments, the polybutadiene-containing polyurethane comprises from about 20 to about 60 mole percent of 1,3-butadiene derived-monomer units in which the C=C double bond is hydrogenated. In yet further embodiments, the poly butadiene-containing polyurethane comprises from about 30 to about 50 mole percent of 1,3-butadiene derived-monomer units in which the C=C double bond is hydrogenated.

According to some currently preferred embodiments, the polybutadiene-containing polyurethane (R) comprises an aliphatic urethane unit, —O—CO—NH—$R_{10}$—. According to further embodiments, the polybutadiene-containing polyurethane (R) comprises two aliphatic urethane units, —O—CO—NH—$R_{10}$—. According to further embodiments, $R_{10}$ is $(C_4-C_{10})$alkyl.

The term "alkyl" refers to a saturated aliphatic hydrocarbon, including straight-chain, branched-chain and cyclic alkyl groups.

According to some embodiments, $R_{10}$ is a cyclic alkyl.

According to some embodiments, $R_{10}$ is selected from the group consisting of 1,1,3,3-tetramethyl cyclohexyl, butyl, hexyl, and decyl. According to certain embodiments, $R_{10}$ is 1,1,3,3-tetramethyl cyclohexyl.

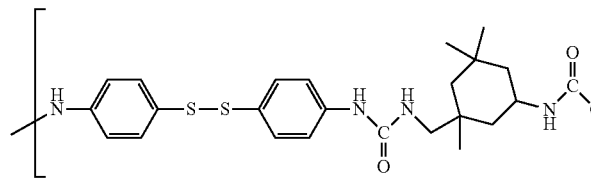

According to an aspect and various embodiments of the present invention, the further components of the unit of formula (A) are selected as follows:

$R_1$ and $R_{1'}$ are independently selected from the group consisting of —H, $(C_1-C_{20})$alkyl, $(C_5-C_{14})$aryl, —$OR_4$, —(CO)$R_5$, —O(CO)$R_6$, —(SO)$R_7$, CO—$R_8$, —COO$R_9$, —$NO_2$, and halogen;

$R_2$, $R_{2'}$, $R_3$ and $R_{3'}$ are independently selected from the group consisting of: —H, $(C_1-C_{20})$alkyl and $(C_5-C_{14})$aryl;

$R_4$ to $R_9$ are the same or different, and are independently selected from the group consisting of: —H, $(C_1-C_{20})$alkyl, and $(C_5-C_{14})$aryl; and m is 4.

The term "aryl" refers to a radical of one ring system with 1-3 rings which contains the number of carbon atoms specified in the description or claims, the rings being saturated, partially unsaturated, or aromatic; and being fused, bridged, or can contain different types of fusion; being at least one of the rings an aromatic ring; and the ring system being optionally substituted by one or more radicals independently selected from the group consisting of $(C_1-C_6)$alkyl, $(C_1-C_6)$haloalkyl, $(C_1-C_6)$alkoxy, nitro, cyano, and halogen.

Throughout the description and claims, the term $(C_x-C_y)$alkyl shall be construed as straight or branched, wherein x and y denote an integer between 1 and 20.

In some embodiments, $R_2$, $R_{2'}$, $R_3$ and $R_{3'}$ are —H. In further embodiments, the —NH—CO—NH is in para-position with respect to the disulfide. In yet further embodiments, $R_1$ and $R_{1'}$ are H.

In certain embodiments, the unit of formula (A1) is

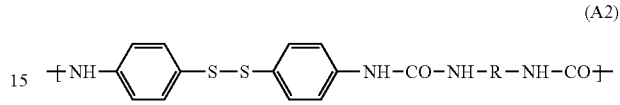

(A2)

In certain such embodiments, the elastomer is further dynamically crosslinked by hydrogen bonds between urea groups.

In some embodiments, the unit of formula (A1) is

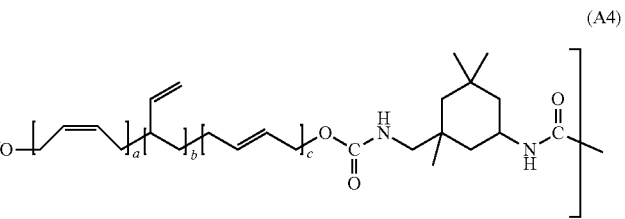

(A4)

wherein a ranges from about 0.1 to about 0.5, b ranges from about 0.1 to about 0.6, and c ranges from about 0.2 to about 0.7. In further embodiments, the unit of formula (A1) has a structure of formula (A4), wherein a ranges from about 0.1 to about 0.3, b ranges from about 0.1 to about 0.36, and c ranges from about 0.5 to 0.7.

In some exemplary embodiments, the unit of formula (A1) is

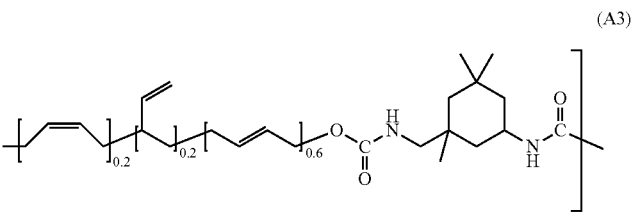

(A3)

As mentioned hereinabove, the exceptional hydrolytic stability of the elastomer according to the principles of the present invention can be attributed to the presence of soft segments containing the polybutadiene polymer backbone and the hard segments containing polyurethane and aromatic disulfide moieties, wherein said specific composition enhances hydrogen bonding within the polymeric chains and essentially prevents water diffusion into soft segments.

Further provided is a method for preparing the elastomer according to the various embodiments of the invention presented hereinabove.

Poly(urea-urethane)s can be formulated as monocomponent or bicomponent systems, wherein firstly an isocyanate-functionalized polymer is prepared by reacting a polyol polymer with a diisocyanate which is then crosslinked with polyamines (bicomponent systems) or by ambient humidity (monocomponent systems). The elastomer according to the principles of the present invention can be conveniently prepared by extending an isocyanate functionalized polybutadiene polymer, which can be obtained from a hydroxyl-terminated polybutadiene, with an aromatic disulfide.

Thus, the method for preparing the elastomer comprises reacting an isocyanate-functionalized polybutadiene polymer with an aromatic disulfide of formula (C1):

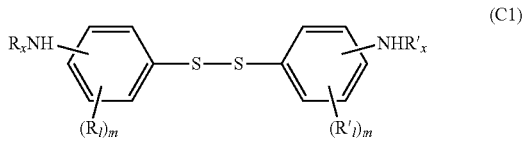

(C1)

wherein
$R_1$ and $R_{1'}$ are independently selected from the group consisting of: —H, $(C_1$-$C_{20})$alkyl, $(C_5$-$C_{14})$aryl, —$OR_4$, —$(CO)R_5$, —$O(CO)R_6$, —$(SO)R_7$, $CO$—$R_8$, —$COOR_9$, —$NO_2$, and halogen;
$R_4$ to $R_9$ are the same or different, and are independently selected from the group consisting of: —H, $(C_1$-$C_{20})$alkyl, and $(C_5$-$C_{14})$aryl;
m is 4; and
$R_x$ and $R_{x'}$ are the same or different, and are independently selected from the group consisting of H, $(C_1$-$C_{20})$alkyl, -and $(C_5$-$C_{14})$aryl.

In yet another aspect there is provided an elastomer prepared by reacting an isocyanate-functionalized polybutadiene polymer with an aromatic disulfide of formula (C1), as presented hereinabove, wherein
$R_1$ and $R_{1'}$ are independently selected from the group consisting of: —H, $(C_1$-$C_{20})$alkyl, $(C_5$-$C_{14})$aryl, —$OR_4$, —$O(CO)R_6$, —$(SO)R_7$, $CO$—$R_8$, —$COOR_9$, —$NO_2$, and halogen;
$R_4$ to $R_9$ are the same or different, and are independently selected from the group consisting of: —H, $(C_1$-$C_{20})$alkyl, and $(C_5$-$C_{14})$aryl;
m is 4; and
$R_x$ and $R_{x'}$ are the same or different, and are independently selected from the group consisting of H, $(C_1$-$C_{20})$alkyl, -and $(C_5$-$C_{14})$aryl.

According to some embodiments, the isocyanate-functionalized polybutadiene polymer is an aliphatic polymer. Said aliphatic polymer can be either linear or branched. It is to be understood that the term "aliphatic" refers in the context of the isocyanate-functionalized polybutadiene polymer to the isocyanate groups of the polymer, which are aliphatic. According to certain embodiments, the isocyanate-functionalized polybutadiene polymer is linear.

According to some embodiments, the isocyanate-functionalized polybutadiene polymer comprises 1,3-butadiene derived-monomer units of formula (B1), formula (B2), and formula (B3), as presented hereinabove.

In some embodiments, the proportion of the monomer unit of formula (B1) in the entirety of the 1,3-butadiene-derived monomer units present in the isocyanate-functionalized polybutadiene polymer is 10 to 60 mole percent. In further embodiments, the proportion of the monomer unit of formula (B1) in the entirety of the 1,3-butadiene-derived monomer units present in the isocyanate-functionalized polybutadiene polymer is 10 to 30 mole percent.

In some embodiments, the proportion of the monomer unit of formula (B2) in the entirety of the 1,3-butadiene-derived monomer units present in the isocyanate-functionalized polybutadiene polymer is 20 to 70 mole percent. In further embodiments, the proportion of the monomer unit of formula (B2) in the entirety of the 1,3-butadiene-derived monomer units present in the isocyanate-functionalized polybutadiene polymer is 50 to 70 mole percent.

In some embodiments, the proportion of the monomer unit of formula (B3) in the entirety of the 1,3-butadiene-derived monomer units present in the isocyanate-functionalized polybutadiene polymer is 10 to 50 mole percent. In further embodiments, the proportion of the monomer unit of formula (B3) in the entirety of the 1,3-butadiene-derived monomer units present in the isocyanate-functionalized polybutadiene polymer is 10 to 50 mole percent.

In certain embodiments, the isocyanate-functionalized polybutadiene polymer comprises about 20 mole percent monomer units of formula (B1), 60 mole percent monomer units of formula (B2), and 20 mole percent monomer units of formula (B3). According to additional embodiments, the isocyanate-functionalized polybutadiene polymer comprises from about 0 to about 80 mole percent of 1,3-butadiene derived-monomer units in which the C=C double bond is hydrogenated. In further embodiments, the isocyanate-functionalized polybutadiene polymer comprises from about 10 to about 70 mole percent of 1,3-butadiene derived-monomer units in which the C=C double bond is hydrogenated. In still further embodiments, the isocyanate-functionalized polybutadiene polymer comprises from about 20 to about 60 mole percent of 1,3-butadiene derived-monomer units in which the C=C double bond is hydrogenated. In yet further embodiments, the isocyanate-functionalized polybutadiene polymer comprises from about 30 to about 50 mole percent of 1,3-butadiene derived-monomer units in which the C=C double bond is hydrogenated.

According to some currently preferred embodiments, the isocyanate-functionalized polybutadiene polymer comprises an aliphatic urethane unit, —O—CO—NH—$R_{10}$—. According to further embodiments, the isocyanate-functionalized polybutadiene polymer comprises two aliphatic urethane units, —O—CO—NH—$R_{10}$—. According to further embodiments, $R_{10}$ is $(C_4$-$C_{10})$alkyl. According to some embodiments, $R_{10}$ is a cyclic alkyl. According to some embodiments, $R_{10}$ is selected from the group consisting of 1,1,3,3-tetramethyl cyclohexyl, butyl, hexyl, and decyl. According to certain embodiments, $R_{10}$ is 1,1,3,3-tetramethyl cyclohexyl.

According to some embodiments, the isocyanate-functionalized polybutadiene polymer has a molecular weight ranging from about 1000 g/mole to about 6000 g/mole. According to further embodiments, the isocyanate-functionalized polybutadiene polymer has a molecular weight ranging from about 2000 g/mole to about 5000 g/mole.

The isocyanate-functionalized polybutadiene polymer can be formed by reacting a hydroxyl-terminated polybutadiene with a diisocyanate compound. Various hydroxyl-terminated polybutadienes are commercially available and can be used to prepare the elastomer according to the principles of the present invention, making the entire preparation process essentially straightforward. HTPB suitable for use in the method of the present invention, can be obtained, for example, from Shanghai ZZ New Material Tech. Co. or Cray Valley. Alternatively, HTPB can be synthesized as known in the art, for example in *J. Polym. Sci.* 21, 385-95, (1983).

In some currently preferred embodiments, said diisocyanate compound is an aliphatic diisocyanate compound. In further embodiments, said aliphatic diisocyanate compound is selected from the group consisting of isophorone diisocyanate (IPDI), 1,4-tetramethylene diisocyanate, 1,6-hexamethylene diisocyanate (HDI), and 1,1-O-decamethylene diisocyanate. According to certain embodiments, said aliphatic diisocyanate compound is IPDI. Thus, according to some related embodiments, the isocyanate-functionalized polybutadiene polymer is terminated by the aliphatic diisocyanate compound selected from the group consisting of isophorone diisocyanate (IPDI), 1,4-tetramethylene diisocyanate, 1,6-hexamethylene diisocyanate (HDI), and 1,1-O-decamethylene diisocyanate, wherein said diisocyanate compound has reacted with the hydroxyl group and lost one of its cyanate groups.

The hydroxyl-terminated polybutadiene can be either linear or branched. According to certain embodiments, the hydroxyl-terminated polybutadiene is linear.

According to some embodiments, the hydroxyl-terminated polybutadiene comprises 1,3-butadiene derived-monomer units of formula (B1), formula (B2), and formula (B3).

According to some embodiments, the proportion of the monomer unit of formula (B1) in the entirety of the 1,3-butadiene-derived monomer units present in the HTPB is 10 to 60 mole percent. According to further embodiments, the proportion of the monomer unit of formula (B1) in the entirety of the 1,3-butadiene-derived monomer units present in the HTPB is 10 to 30 mole percent.

According to some embodiments, the proportion of the monomer unit of formula (B2) in the entirety of the 1,3-butadiene-derived monomer units present in the HTPB is 20 to 70 mole percent. According to further embodiments, the proportion of the monomer unit of formula (B2) in the entirety of the 1,3-butadiene-derived monomer units present in the HTPB is 50 to 70 mole percent.

According to some embodiments, the proportion of the monomer unit of formula (B3) in the entirety of the 1,3-butadiene-derived monomer units present in the HTPB is 10 to 50 mole percent. According to further embodiments, the proportion of the monomer unit of formula (B3) in the entirety of the 1,3-butadiene-derived monomer units present in the HTPB is 10 to 30 mole percent.

In certain embodiments, the hydroxyl-terminated polybutadiene comprises about 20 mole percent monomer units of formula (B1), 60 mole percent monomer units of formula (B2), and 20 mole percent monomer units of formula (B3). According to some additional embodiments, the hydroxyl-terminated polybutadiene comprises from about 0 to about 80 mole percent of 1,3-butadiene derived-monomer units in which the C=C double bond is hydrogenated. In further embodiments, the hydroxyl-terminated polybutadiene polymer comprises from about 10 to about 70 mole percent of 1,3-butadiene derived-monomer units in which the C=C double bond is hydrogenated. In still further embodiments, the hydroxyl-terminated polybutadiene polymer comprises from about 20 to about 60 mole percent of 1,3-butadiene derived-monomer units in which the C=C double bond is hydrogenated. In yet further embodiments, the hydroxyl-terminated polybutadiene polymer comprises from about 30 to about 50 mole percent of 1,3-butadiene derived-monomer units in which the C=C double bond is hydrogenated.

According to some embodiments, the hydroxyl-terminated polybutadiene has a molecular weight ranging from about 1000 g/mole to about 6000 g/mole. According to further embodiments, the hydroxyl-terminated polybutadiene has a molecular weight ranging from about 2000 g/mole to about 5000 g/mole.

In some embodiments, the hydroxyl-terminated polybutadiene polymer has a formula:

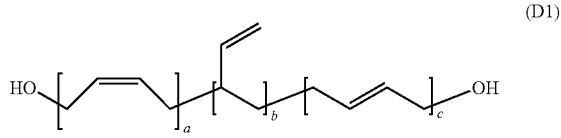

(D1)

wherein a ranges from about 0.1 to about 0.5, b ranges from about 0.1 to about 0.6, and c ranges from about 0.2 to about 0.7. In further embodiments, the hydroxyl-terminated polybutadiene polymer has a formula (D1), wherein a ranges from about 0.1 to about 0.3, b ranges from about 0.1 to about 0.36, and c ranges from about 0.5 to 0.7.

In some exemplary embodiments, the hydroxyl-terminated polybutadiene polymer has a formula:

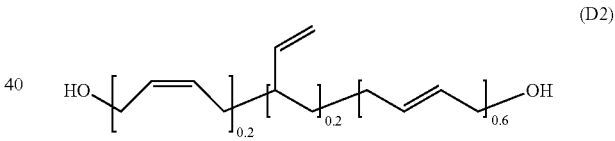

(D2)

In some embodiments, the isocyanate-functionalized polybutadiene polymer has a formula:

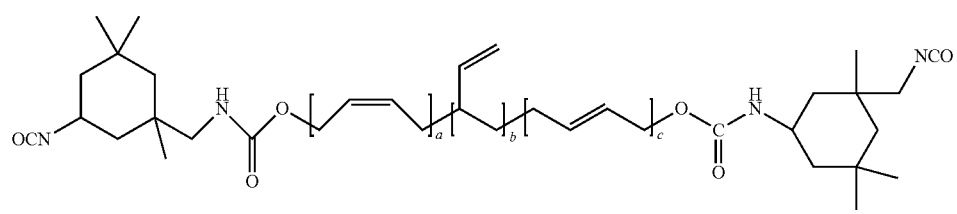

(D3)

wherein a ranges from about 0.1 to about 0.5, b ranges from about 0.1 to about 0.6, and c ranges from about 0.2 to about 0.7. In further embodiments, isocyanate-functionalized polybutadiene polymer has a formula (D3), wherein a ranges from about 0.1 to about 0.3, b ranges from about 0.1 to about 0.36, and c ranges from about 0.5 to 0.7.

In some exemplary embodiments, the isocyanate-functionalized polybutadiene polymer has a formula:

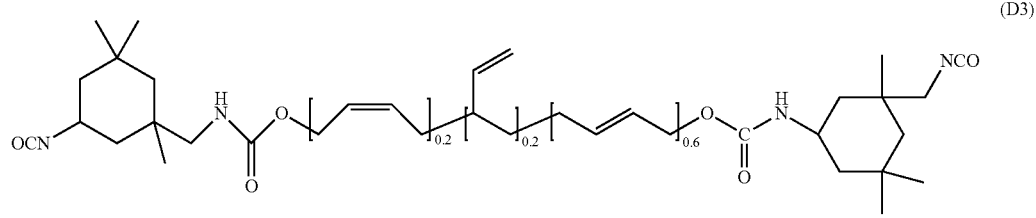

(D3)

According to some embodiments, $R_x$, and $R_{x'}$ of the aromatic disulfide of formula (C1) are —H. According to further embodiments, the $R_x$ and $R_{x'}$ are in para-position relative to the disulfide moiety.

According to some embodiments, $R_1$ and $R_{1'}$ of the aromatic disulfide of formula (C1) are —H.

In some exemplary embodiments, the aromatic disulfide of formula (C1) is 4-aminophenyl disulfide (APDS).

According to some embodiments, the molar ratio between amine and isocyanate groups of the isocyanate-functionalized polybutadiene polymer and the aromatic disulfide of formula (C1), respectively, ranges from 0.7 to 1.3. The term "molar ratio" refers to the relation of moles of amine: isocyanate reactive groups. In some embodiments, the molar ratio between amine and isocyanate groups ranges from 0.8 to 1.2. In some exemplary embodiments, the molar ratio is 1.0.

According to some embodiments, the reaction between the isocyanate-functionalized polybutadiene polymer and the aromatic disulfide of formula (C1) is performed at a temperature ranging from −30 to 200° C. In further embodiments, the reaction is performed at a temperature ranging from 0 to 175° C. In yet further embodiments, the reaction is performed at a temperature ranging from 20 to 150° C. In yet further embodiments, the reaction is performed at a temperature ranging from 40 to 120° C. In still further embodiments, the reaction is performed at a temperature ranging from 60 to 100° C. In some exemplary embodiments, the reaction is performed at a temperature of about 80° C. In some related embodiments, the aromatic disulfide of formula (C1) is APDS.

According to some embodiments, the isocyanate-functionalized polybutadiene polymer has functionality of above 2.1. According to some embodiments, the hydroxyl-terminated polybutadiene polymer has functionality of above 2.1.

The term "functionality of above 2.1" when referred to the isocyanate-functionalized polybutadiene polymer or the hydroxyl-terminated polybutadiene polymer, means that the polymer comprises an average of at least 2.1 isocyanate or hydroxyl groups, respectively, per polybutadiene polymer chain, counting the entirety of the polybutadiene polymer molecules used. In some embodiments, the isocyanate-functionalized polybutadiene polymer comprises from 2.1 to 2.3 isocyanate groups. In some embodiments, the hydroxyl-terminated polybutadiene polymer comprises from 2.1 to 2.3 hydroxyl groups.

It is to be understood that the higher than about 2.1 functionality of the isocyanate-functionalized polybutadiene polymer and/or the hydroxyl-terminated polybutadiene polymer can lead to excessive permanent crosslinking of the elastomer through urethane bonds between the polymeric chains. Without wishing to being bound by theory or mechanism of action, it is assumed that such permanent crosslinking leads to the formation of a thermoset polymer and reduces its self-healing ability. Without further wishing to being bound by theory or mechanism of action, it is postulated the reaction conditions between the isocyanate-functionalized polybutadiene polymer and the aromatic disulfide of formula (C1) can be controlled in order to reduce the undesired permanent crosslinking. For example, the reaction time can affect the extent of the permanent crosslinking of the elastomer.

According to some embodiments, the reaction is performed for up to about 96 hours. According to further embodiments, the reaction is performed for up to about 72 hours. In yet further embodiments, the reaction is performed for up to about 48 hours. In still further embodiments, the reaction is performed for up to about 24 hours. In yet further embodiments, the reaction is performed for up to about 16 hours. In still further embodiments, the reaction is performed for up to about 12 hours. In yet further embodiments, the reaction is performed for up to about 9 hours. In still further embodiments, the reaction is performed for up to about 6 hours.

According to some embodiments, the reaction is performed at a temperature of about 100° C. for up to about 12 hours. According to some embodiments, the reaction is performed at a temperature of about 60° C. for up to about 72 hours. According to further embodiments, the reaction is performed at a temperature of about 60° C. for up to about 48 hours. In some embodiments, the reaction is performed at a temperature of about 80° C. for up to about 48 hours. In some exemplary embodiments, the reaction is performed at a temperature of about 80° C. for up to about 24 hours. In some related embodiments, the aromatic disulfide of formula (C1) is APDS.

According to some embodiments, the reaction is performed for at least about 6 hours. According to further embodiments, the reaction is performed for at least about 8 hours. According to still further embodiments, the reaction is performed for at least about 10 hours. According to still further embodiments, the reaction is performed for at least about 12 hours.

The molar ratio between the isocyanate-functionalized polybutadiene polymer and the aromatic disulfide of formula (C1), such as, for example, APDS, can be selected based on the desired molar ratio between amine and isocyanate groups, as listed hereinabove. According to some embodiments, the amine:isocyanate molar ratio is about 0.7 and the reaction is performed for up to about 48 hours. According to some embodiments, the amine:isocyanate molar ratio is about 1.3 and the reaction is performed for up to about 48 hours. According to some embodiments, the amine:isocyanate molar ratio is about 1 and the reaction is performed for up to about 48 hours. According to some exemplary embodiments, the amine:isocyanate molar ratio is about 1 and the reaction is performed for up to about 24 hours. In some related embodiments, the aromatic disulfide of formula (C1) is APDS.

As mentioned hereinabove, the isocyanate-functionalized polybutadiene polymer can be prepared by modifying HTPB with a diisocyanate compound. Typically, said reaction is performed using urethane catalysts. Non-limiting examples of suitable catalysts include dibutylin dilaurate (DBTDL), dibutyl tin diacetate and stannous dioctoate. In certain embodiments, said catalyst is DBTDL. In some related embodiments, the diisocyanate compound is IPDI. According to some embodiments, the catalyst concentration in the mixture comprising HTPB and the diisocyanate compound ranges from about 100 ppm to about 5000 ppm.

The reaction between HTPB and the diisocyanate compound and/or between the isocyanate-functionalized polybutadiene polymer and the aromatic disulfide of formula (C1) can be carried out under an inert atmosphere. Such inert atmospheres can be provided with nitrogen ($N_2$) or argon (Ar).

According to some embodiments, the catalyst concentration is about 100 ppm and the reaction between the isocyanate-functionalized polybutadiene polymer and the aromatic disulfide of formula (C1) is performed for up to about 96 hours. According to some embodiments, the catalyst concentration is about 1000 ppm and the reaction between the isocyanate-functionalized polybutadiene polymer and the aromatic disulfide of formula (C1) is performed for up to about 36 hours. According to some embodiments, the catalyst concentration is about 10000 ppm and the reaction between the isocyanate-functionalized polybutadiene polymer and the aromatic disulfide of formula (C1) is performed for up to about 6 hours. According to some embodiments, the catalyst concentration is about 2000 ppm and the reaction between the isocyanate-functionalized polybutadiene polymer and the aromatic disulfide of formula (C1) is performed for up to about 48 hours. According to some exemplary embodiments, the catalyst concentration is about 2000 ppm and the reaction between the isocyanate-functionalized polybutadiene polymer and the aromatic disulfide of formula (C1) is performed for up to about 24 hours. In some related embodiments, the catalyst is DBTDL and the aromatic disulfide of formula (C1) is APDS.

The reaction between the HTPB and the diisocyanate compound and/or between the isocyanate-functionalized polybutadiene polymer and the aromatic disulfide of formula (C1) can be performed in a solvent selected from tetrahydrofuran (THF), chloroform and diethyl ether. The reaction between the isocyanate-functionalized polybutadiene polymer and the aromatic disulfide of formula (C1) can be terminated by the addition of a second solvent, in which the reaction product (i.e., the elastomer) is insoluble. Non-limiting examples of such solvents include methanol, ethanol and isopropanol. In certain embodiments, said second solvent is methanol. Preferably, said second solvent should be in molar excess relatively to amine groups of the aromatic disulfide and isocyanate groups of the polybutadiene polymer. In some embodiments, the molar ratio between the second solvent and the isocyanate-functionalized polybutadiene polymer ranges from about 10 to about 1000. In additional embodiments, the molar ratio between the second solvent and the aromatic disulfide of formula (C1) ranges from about 50 to about 5000.

In some embodiments, the method comprises adding methanol to the mixture of the isocyanate-functionalized polybutadiene polymer and the aromatic disulfide of formula (C1) following up to about 24 hours from the start of the reaction. In some exemplary embodiments, the method comprises adding methanol to the mixture of the isocyanate-functionalized polybutadiene polymer and the aromatic disulfide of formula (C1) following 24 hours from the start of the reaction. In some related embodiments, methanol is in molar excess relatively to amine and isocyanate groups. In further related embodiments, the reaction between the isocyanate-functionalized polybutadiene polymer and the aromatic disulfide of formula (C1) is performed at about 80° C. In yet further related embodiments, the amine:isocyanate molar ratio is about 1. In still further related embodiments, the aromatic disulfide of formula (C1) is APDS.

Following the reaction termination, the isocyanate-terminated polybutadiene polymer and the aromatic disulfide of formula (C1) can be stirred for additional 12 hours or more.

According to some embodiments, the isocyanate-terminated polybutadiene polymer is present in the reaction mixture in a weight percent ranging from about 5 to about 20 of the total weight of the mixture. According to some embodiments, the aromatic disulfide of formula (C1) is present in the reaction mixture in a weight percent ranging from about 0.5 to about 2.5 of the total weight of the mixture. In some embodiments, the reaction mixture further comprises a solvent. The solvent can be present in the reaction mixture in a weight percent ranging from about 80 to about 95 of the total weight of the mixture. According to further embodiments, the reaction between the isocyanate-terminated polybutadiene polymer and the aromatic disulfide of formula (C1) is terminated by the addition of from about 50 to about 90 weight percent of the second solvent to the mixture.

According to some embodiments, the reaction mixture comprises in addition to the isocyanate-functionalized polybutadiene polymer and the aromatic disulfide of formula (C1), and, optionally, a first solvent, at least one component selected from the group consisting of plasticizers, pigments, organic or inorganic fillers, adhesion promoter, UV-stabilizers, rheology modifiers, and flame-retardant additives. Solvents, plasticizers, pigments, organic or inorganic fillers, adhesion promoter, UV-stabilizers, rheology modifiers, flame-retardant additives, are those used in the polymer manufacturing and are well-known for those skilled in the art. Reference is made, for instance, to Harper C. A., "Modern Plastics Handbook", Chapter 4, 1999, pages 4.1-5.0; G. Wypych, "Handbook of Plasticizers", Ed.: ChemTec Publishing, Chapter 11, 2004, pages 273-379; and Bolgar M. et al. "Handbook for the chemical analysis of plastics and polymer additives", Ed.: CRC Press, Chapters 3 to 9, 2008, pages 27-303.

In some exemplary embodiments, the method comprises reacting IPDI-functionalized polybutadiene polymer being present in a weight percent of about 15% with APDS being present in a weight percent of about 1.4%, out of the total weight of the mixture, wherein the reaction mixture further comprises about 83 wt. % solvent. In further embodiments, the reaction is performed at a temperature ranging from about 40 to about 80° C., wherein the molar ratio between the amine and isocyanate reactive groups is about 1. In certain embodiments, the IPDI-functionalized polybutadiene polymer is of formula (D4).

In a further aspect, there is provided an article of manufacture comprising the elastomer according to the various aspects and embodiments listed hereinabove. Without wishing to being bound by theory or mechanism of action, it is contemplated that the elastomer material can increase sustainability and durability of electronic devices under exposure to water. Moreover, being solution processable it saves the need for complicated instruments and fabrication processes. The unique water-repelling properties are beneficial to extending the range of applications of soft electronics to underwater conditions for example, for the mimicry of marine animals. Said article of manufacture comprising the elastomer can be a part of soft electronics device, wearable device, (e.g., for disease detection via body fluids), and swimming or submarine robotics device.

The above-listed devices can comprise or be in a form of a sensor. The sensor can be configured as any one of the various types of electronic devices, including, but not limited to capacitive sensors, resistive sensors, chemiresistive sensors, impedance sensors, field effect transistor sensors, strain gauge sensors and the like, or combinations thereof. According to some embodiments, the elastomer constitutes a substrate of the sensor, thereby supporting other electronic components of the device, while imparting self-healing ability thereto, even in high humidity and underwater conditions.

In yet another aspect, there is provided a sensor comprising the elastomer according to the various aspects and embodiments listed hereinabove.

The sensor can be selected from the group consisting of a chemical sensor, electrochemical sensor, biological sensor, and physical sensor. The term "chemical sensor", as used herein, refers to a device comprising a chemical entity, which detects the presence of an analyte. The chemical sensor can comprise a sensor element whose properties, such as but not limited to, physical, optical or morphological properties are modified in the presence of an analyte. The term "electrochemical sensor", as used herein, refers to a device which is adapted for performing at least one electrochemical measurement to detect the presence of an analyte. The electrochemical sensor can be configured in a form selected, inter alia, from a capacitive sensor, a resistive sensor, a chemiresistive sensor, and an impedance sensor. The term "biological sensor", as used herein, refers to a device comprising a biological component, which detects the presence of an analyte in a biological sample. The term "physical sensor", as used herein, refers to a device which senses the absolute value or a change in a physical quantity and generates a corresponding signal or data. Examples of a physical quantity include, but are not limited to, temperature, pressure, humidity, level precipitation, flow rate, pH, coefficient of friction, intensity of light, intensity of sound, intensity of radio waves, and the like. The physical sensor can be configured in a form selected, inter alia, from a field effect transistor sensor and a strain gauge.

According to some currently preferred embodiments, the sensor is configured for operation in 100% relative humidity and/or underwater conditions.

According to some embodiments, the sensor comprises a substrate. The substrate can comprise or be made of the self-healing hydrolytically stable elastomer. In certain such embodiments, the substrate is termed "self-healing substrate". The self-healing substrate can have any desirable geometry. In rectangular geometries, the length and/or width of the self-healing substrate can range between about 0.01-100 mm. The thickness of the substrate can range between about 0.001-10 mm.

According to some related embodiments, the sensor further comprises at least two electrodes (e.g., at least one positive electrode and at least one negative electrode). According to further embodiments, the sensor comprises at least three electrodes. In yet further embodiments, the sensor comprises an electrode array. The electrode array can comprise patterned electrodes, for example, interdigitated electrodes. The interdigitated electrodes can have any shape known in the art, such as, but not limited to circular or rectangular shapes.

According to some embodiments, the sensor comprises a source electrode and a drain electrode separated from one another by a source-drain gap. The sensor may further comprise a gate electrode.

The electrodes can comprise any metal having high conductivity. In some embodiments, the electrodes comprise ar micro-sized or nanosized conductive material.

The term "micro-sized", as used herein, refers to material having a mean particle size in the range of above 1 µm but below 1000 µm.

The term "nanosized", as used herein, refers to material having a mean particle size in the range of above 0.5 nm but below 1000 nm.

The term "particle size", as used herein, refers to the length of the particle of the material in the longest dimension thereof.

Said conductive material can be embedded within the substrate. In additional embodiments, the conductive material is deposited onto the substrate. Non-limiting examples of conductive material suitable for use in the sensors according to the principles of the present invention include metal, metal alloy, metal carbide, metal nitride, metal oxide, metal silicide, carbon, polymer, ceramics, and combinations thereof. According to certain embodiments, the conductive material is a nanosized material having a form selected from the group consisting of nanoparticles, nanowires, nanotubes, nanoflakes, nanofibers, nanoribbons, nano-whiskers, nanostrips, nanorods, and combinations thereof. In some exemplary embodiments, the conductive material is selected from nanowires, nanotubes and combinations thereof. In certain embodiments, said nanowires are silver nanowires. In additional embodiments, said nanotubes are carbon nanotubes.

The sensor according to the principles of the present invention can further include an indicator, such as, but not limited to, light-emitting diode (LED) and/or organic light-emitting diode (OLED).

According to some exemplary embodiments, the sensor is in a form of a field effect transistor, comprising a substrate, at least one source electrode, at least one drain electrode, at least one gate electrode, and at least one channel, wherein the substrate is made of the self-healing hydrolytically stable elastomer. In related embodiments, the electrodes comprise a micro-sized or nanosized conductive material embedded within or deposited onto the substrate. In certain embodiments, the conductive material is selected from nanowires, nanotubes, and combinations thereof. In further embodiments, said nanowires are silver nanowires. In additional embodiments, said nanotubes are carbon nanotubes. In further embodiments, the channel comprises semi-conducting nanosized material deposited onto the substrate and/or the at least one source electrode and at least one drain electrode. Non-limiting examples of semi-conducting materials suitable for use in the field-effect transistor according to the principles of the present invention include carbon, graphene, fullerene, and silicon. The channel of the FET can include at least one of carbon nanotubes, silicon nanowires, graphene nanoribbons, and fullerene nanorods. In some currently preferred embodiments, the channel comprises single-walled carbon nanotubes. According to certain embodiments, said FET is a pH sensor.

In still another aspect there is provided a method for detecting an analyte in 100% relative humidity and/or underwater conditions, the method comprising exposing the sensor according to the various aspects and embodiments presented hereinabove to a test sample comprising the analyte. The analyte can be selected from chemical molecules, such as, but not limited to volatile and semi-volatile organic compounds, and biological materials.

In yet another aspect there is provided a method for detecting an environmental condition and/or physical stimulus in 100% relative humidity and/or underwater conditions, the method comprising exposing the sensor according to the various aspects and embodiments presented hereinabove to said condition or stimulus. Said environmental condition can be selected from pH, temperature and humidity. The stimulus can be, inter alia, pressure, stress or strain.

As used herein and in the appended claims the singular forms "a" "an," and "the" include plural references unless the content clearly dictates otherwise. Thus, for example, reference to "a polymeric chain" can include a plurality of such polymeric chains and equivalents thereof known to those skilled in the art, and so forth. It should be noted that the term "and" or the term "or" is generally employed in its sense including "and/or" unless the content clearly dictates otherwise.

As used herein, the term "about", when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to perform the disclosed methods.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Example 1—Synthesis of Polybutadiene Poly(Urea-Urethane)

Scheme 1 shows a preparation procedure of the hydrolytically stable self-healing elastomer including hydroxyl-terminated polybutadiene (HTPB) that is extended by isophorone diisocyanate (IPDI) and 4-aminophenyl disulfide (4-APDS). Without wishing to being bound by theory or mechanism of action, HTPB is configured to provide low-temperature flexibility to the resultant polymer and 4-APDS is meant to contribute to the dynamic disulfide and hydrogen bonds upon the formation of urea/urethane linkages.

Hydroxyl-terminated polybutadiene (HTPB, Mn 2300) was purchased from Shanghai ZZ New Material Tech. Co., Ltd. Isophorone diisocyanate (IPDI, 98%), Dibutyltin dilaurate (DBTDL, 95%), and 4-aminophneyl disulfide (APDS, 98%), was obtained from Sigma-Aldrich. HTPB (2.3 g, 1 mmol) was dried in vacuum oven at 70° C. for 2 hr to remove any moisture and then cooled to 70° C. IPDI (445 mg, 2 mmol) and DBTDL (5 mg, ~1600 ppm) dissolved in THF (10 mL) were added dropwise into the vessel and stirred for 1.5 h under a $N_2$ atmosphere. After the synthesis of the pre-polymer, APDS (250 mg, 1 mmol) dissolved in THF (10 mL) was added to the reactor as a chain extender. After 36 hr, the reaction was stopped with the addition of excess of methanol (0.5 ml) into the mixture and mixed for additional 12 hr. After that, MeOH (50 mL) was added for precipitation of the product. Yellow precipitate-like viscous liquid appeared and the mixture was settled for 30 minutes. The upper clear solution was then decanted. 15 mL THF was added to dissolve the product. The dissolution-precipitation-decantation process was repeated for three times and the final product was subjected to vacuum to remove the solvent and other traces of reactants. Molecular weight according to GPC: Mw=45,560.

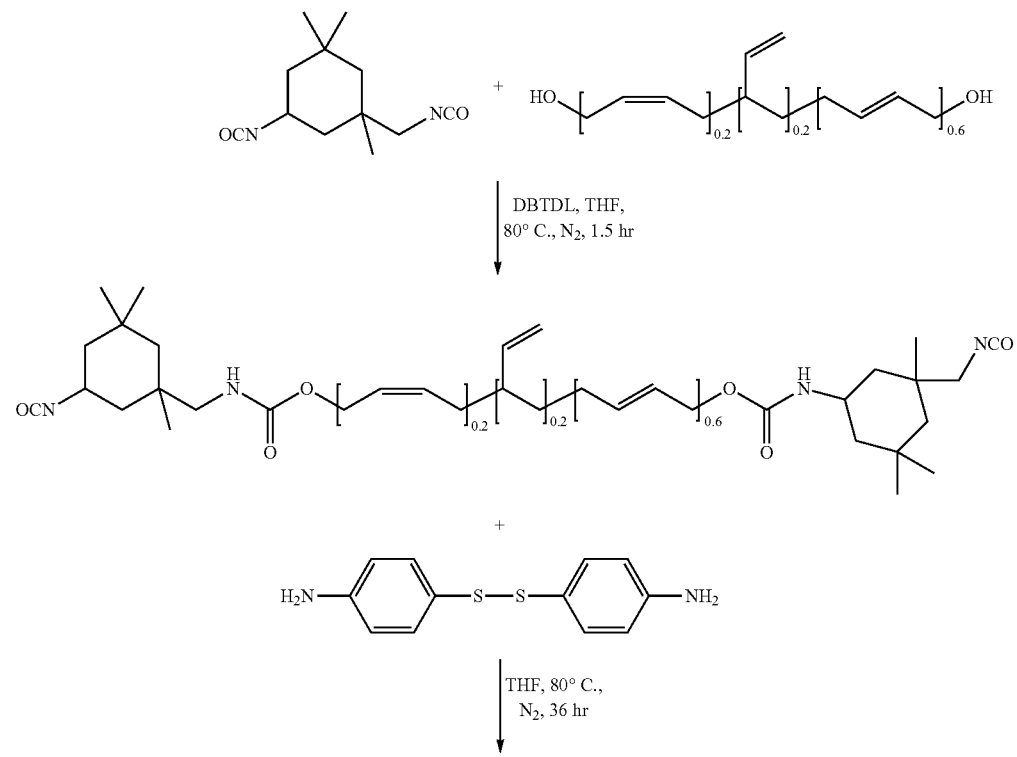

Scheme 1

-continued

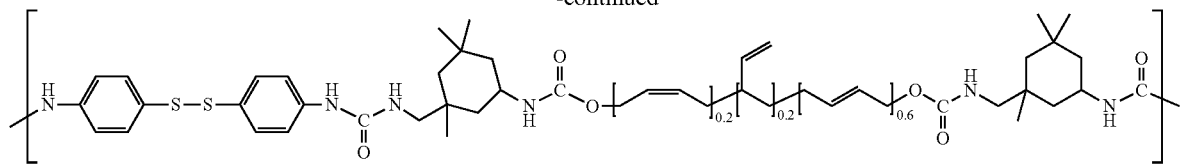

Figure 2:
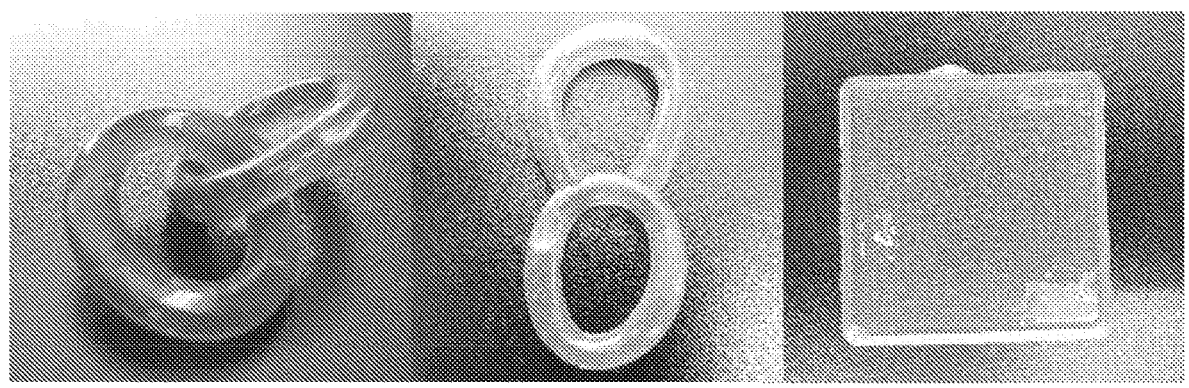
FIG. 2: Photographs of different 3D-objects prepared from PBPUU.

The elastomer was found to be solution-processable, which provides a great advantage in the field of soft-electronics manufacturing (FIG. 1). Different shapes can be easily prepared using PBPUU such as thin films and 3D objects (FIG. 2).

Figure 3A:
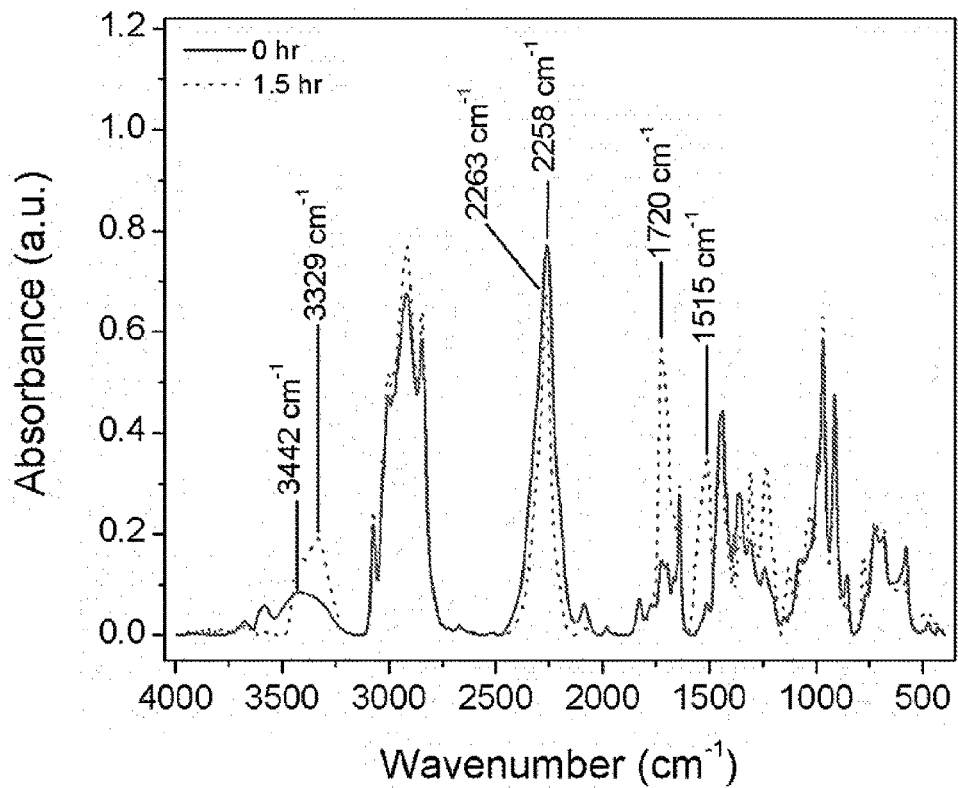
FIG. 3A: Fourier-transform infrared spectroscopy (FTIR) spectra of the reaction progress of HTPB and IPDI at 70° C. at t=0 (solid line) and t=1.5 hr (dashed line).
Figure 3B:
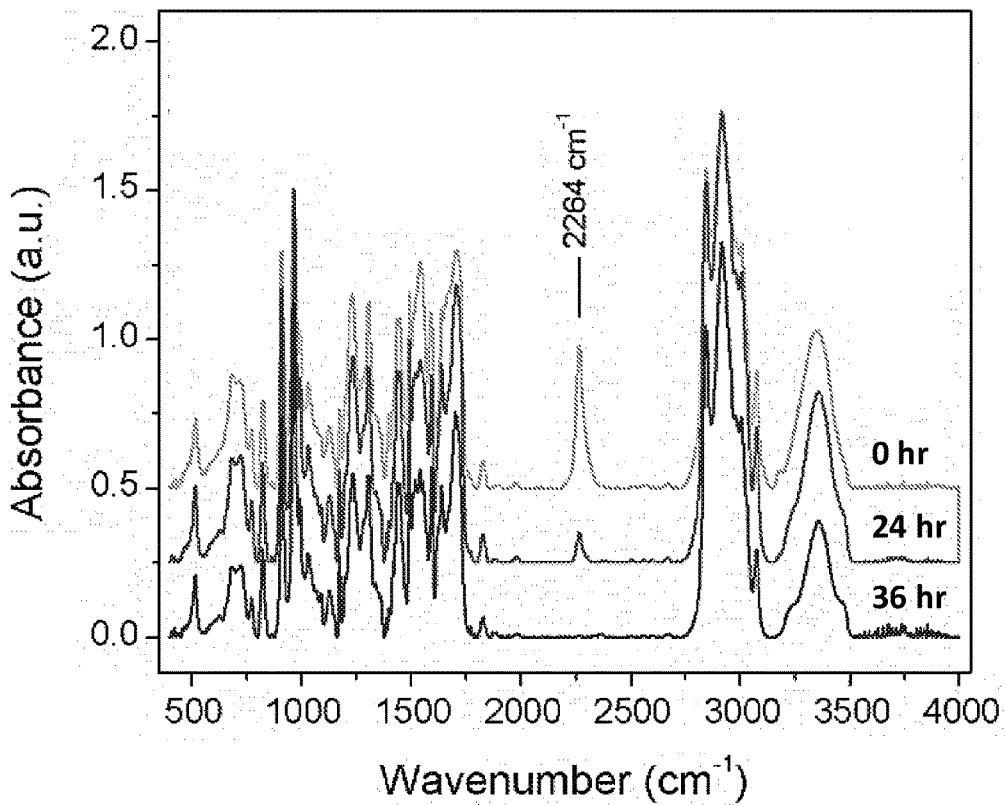
FIG. 3B: FTIR spectra of the synthesis progress of the PBPUU (second reaction in Scheme 1) at t=0, t=24 hr, and t=36 hr. The spectra have been shifted for clarity.

Example 2—Chemical Characterization of the Polybutadiene Poly(Urea-Urethane) Elastomer FTIR was used to follow polymerization of PBPUU where the appearance of new bands corresponding to the carbonyl group of urethane moiety at 1720 cm-1 and amide II at 1515 cm-1 can indicate the progress of the first reaction. Moreover, a decrease and displacement of the NCO stretching band from 2258 to 2264 cm-1 can be observed, which was used as criteria to establish that the reaction was finished (FIG. 3A). The decrease in the intensity of the NCO stretching hand at 2264 cm-1 at t=24 hours and its complete disappearance at t=36 hours gives a good indication about the second reaction progress in Scheme 1 (FIG. 3B).

Figure 4A:
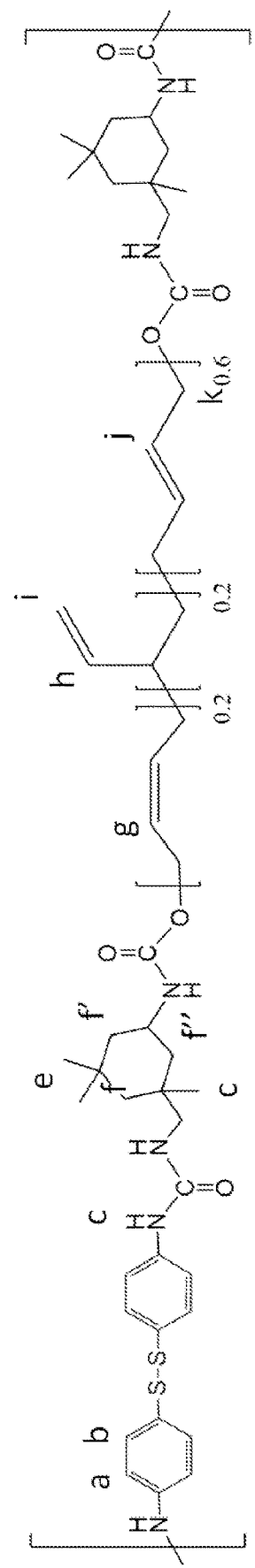
FIG. 4A: Structural formula of the obtained PBPUU polymer.
Figure 4B:
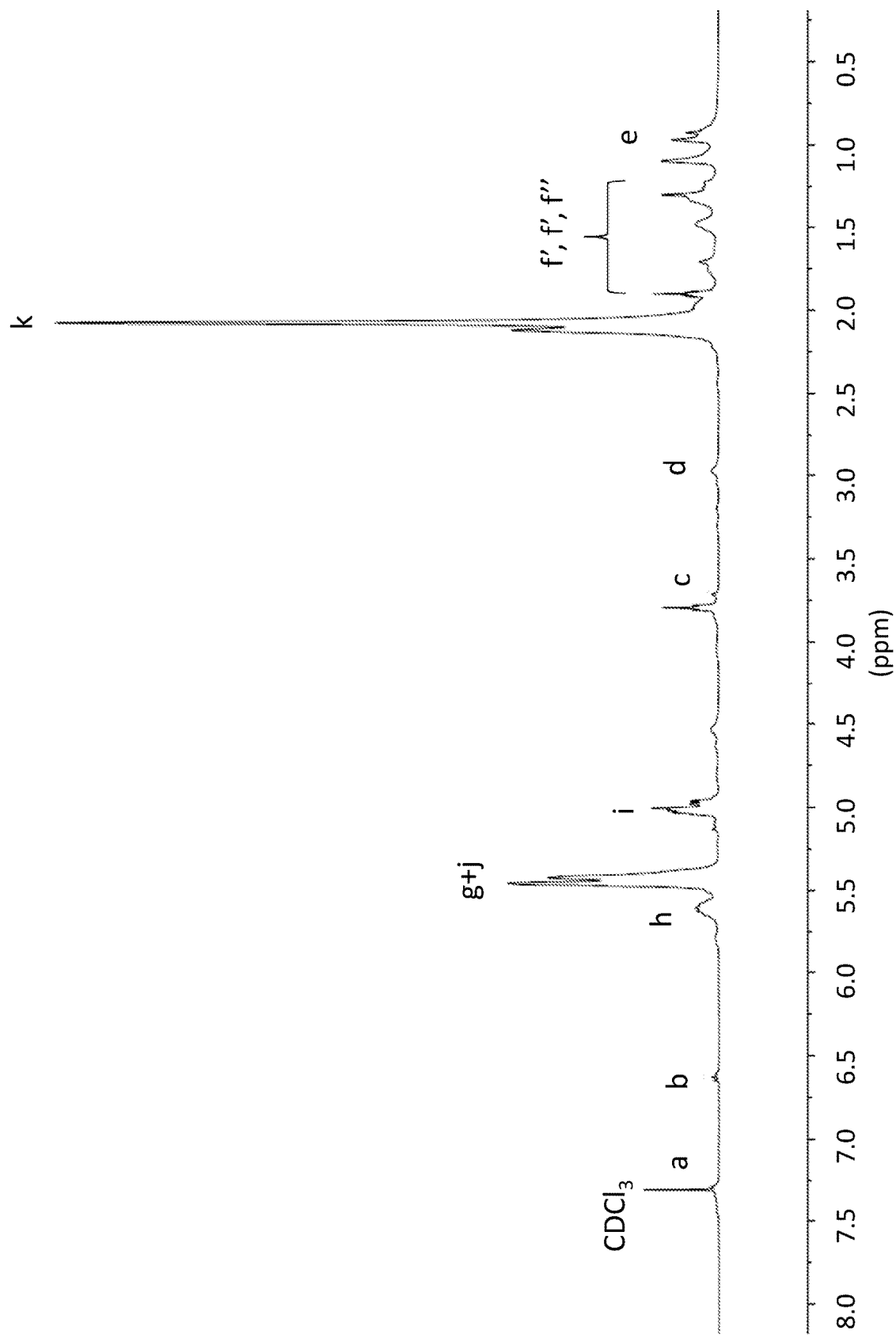
FIG. 4B: Proton nuclear magnetic resonance (H NMR) spectrum of PBPUU in CDCl3 (400 MHz). Letters a-k in FIG. 4B indicate corresponding protons in FIG. 4A.

NMR analysis of the PBPUU is presented in FIG. 4B. Integral ratios were well-matched with feed molar ratio.

Figure 5:
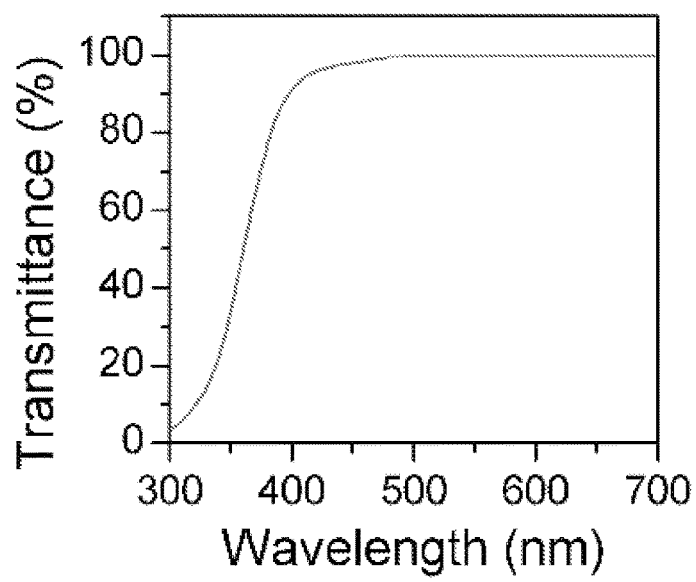
FIG. 5: Graph showing transmittance of the PBPUU film.

Example 3—Physical Characterization of the Polybutadiene Poly(Urea-Urethane) Elastomer PBPUU films having a thickness of 150 μm were fabricated for the physical characterization of the elastomer. First, the transmission spectra of the PBPUU films was examined. This examination suggested that the transparency of the film is very high in the range of visible light (FIG. 5). This property is highly required for many electronic applications and especially for the development of seamless wearable devices.

Figure 6:
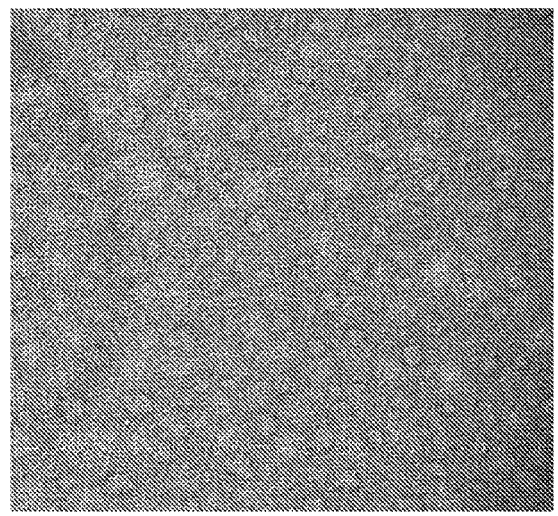
FIG. 6: Transmission electron microscopy (TEM) image of the PBPUU film (scale bar: 100 nm).

Morphology of PBPUU was examined by TEM. Osmium tetroxide was used for the selective staining the carbon double bonds. Dark regions are associated with the soft polybutadiene rich phase which is stained with the heavy metal. A very clear separation can be seen in FIG. 6 due to the existence of rigid parts (associated with APDS, urethane and urea linkages, which can be seen as bright domains) and soft parts (associated with polybutadiene regions). Without wishing to being bound by theory or mechanism of action, the formation of hydrogen bonds between the rigid parts leads to the phase separation. The obtained elastomer structure is very important for enhancing the mechanical properties of the materials where the soft parts provide the elasticity and softness of the materials and the rigid one provides physical crosslinking inside the polymeric network.

Figure 7:
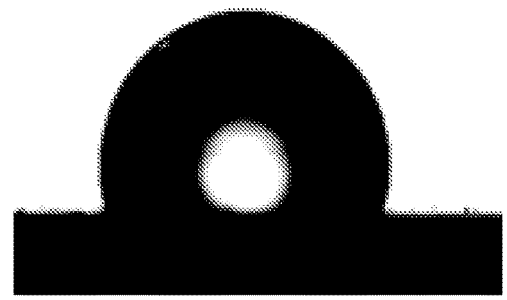
FIG. 7: Contact angle of water on PBPUU.

The contact angle of water on PBPUU was measured to evaluate the wettability and the hydrophobicity of the surface of PBPUU (FIG. 7). A relatively high angle was obtained (103°) and compared to other well-studied polymers, polydimethylsiloxane (PDMS) and polypropylene glycol-based poly(urea-urethane) (PPGPUU), which were 96° and 93°, respectively).

Example 4—Electrical, Mechanical and Self-Healing Characterization of the Polybutadiene Poly(Urea-Urethane) Elastomer PBPUU-based conductive electrodes were fabricated for the electrical characterization of the elastomer. CNTs for electrodes (>75%) were purchased from TUBALL and dispersed in water. Silver nanowires (AgNWs) were synthesized according to a previously reported method, which is incorporated by reference in its entirety (A. Sekiguchi, F. Tanaka, T. Saito, Y. Kuwahara, S. Sakurai, D. N. Futaba, T. Yamada, K. Hata, Robust and soft elastomeric electronics tolerant to our daily lives. Nano lett. 15, 5716-5723 (2015). CNTs/AgNWs electrodes were sprayed through a shadow-mask on a slightly modified silicon wafer, prepared by treatment with oxygen plasma and then immersion in a solution of hexyltrichlorosilane in toluene for 1 min. Solution of PBPUU was poured on top of the electrodes and left for drying and then peeled off to obtain the self-healing conductive electrodes.

Two-point resistance measurements were done on the CNT/AgNWs electrodes with a Keithley (model 2701 DMM). Stretching for electrical performance involved a manual apparatus. Mechanical stress-strain experiments were performed using Instron to measure tear strength and tensile properties of the polymers. The stretching rate was 100 mm min$^{-1}$ unless stated otherwise.

Self-healing processes were monitored using an optical microscope (BX51M, Olympus) with integrated camera (LC20, Olympus). SEM was also used to detect the self-healing of the conductive electrode. Structural self-healing was evaluated by the mechanical properties obtained from the stress-strain curves.

PBPUU proved to have a very efficient self-healing ability due to the combination of disulfide metathesis and dynamic cross-linking by hydrogen bond. FIGS. 8A-8C show the self-healing of surface scratches immediately after the scratch is formed (FIG. 8A), 2 hours following the scratch (FIG. 8B) and 24 hours following the scratch (FIG. 8C). It can be seen that the surface has almost completely regenerated in 24 hr under ambient conditions. The ability of the polymer to heal following a full cut was also demonstrated, including retaining its initial shape, as well as stretchability (FIGS. 9A-9D). Additional surface damage including scratches and total cuts was performed and the polymer heling in air and underwater conditions was compared (FIGS. 10A-10C and FIGS. 11A-11C, respectively). Healing of the polymer in air and under water was found to be essentially similar.

Figure 12A:
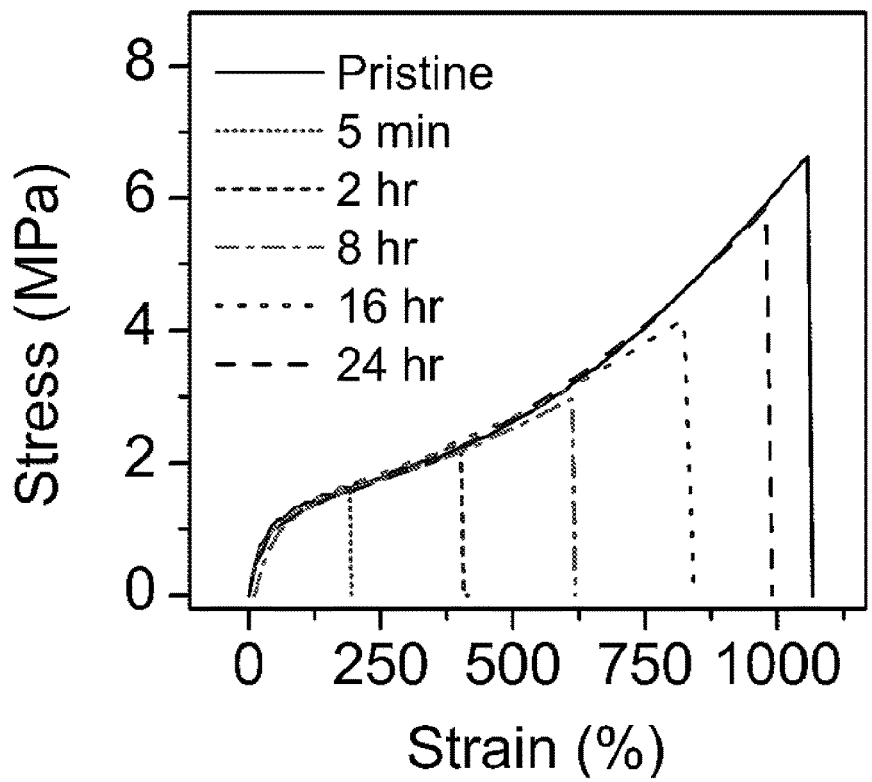
FIG. 12A: Graph showing stress-strain measurements of the PBPUU polymer under different healing durations of a complete cut.
Figure 12B:
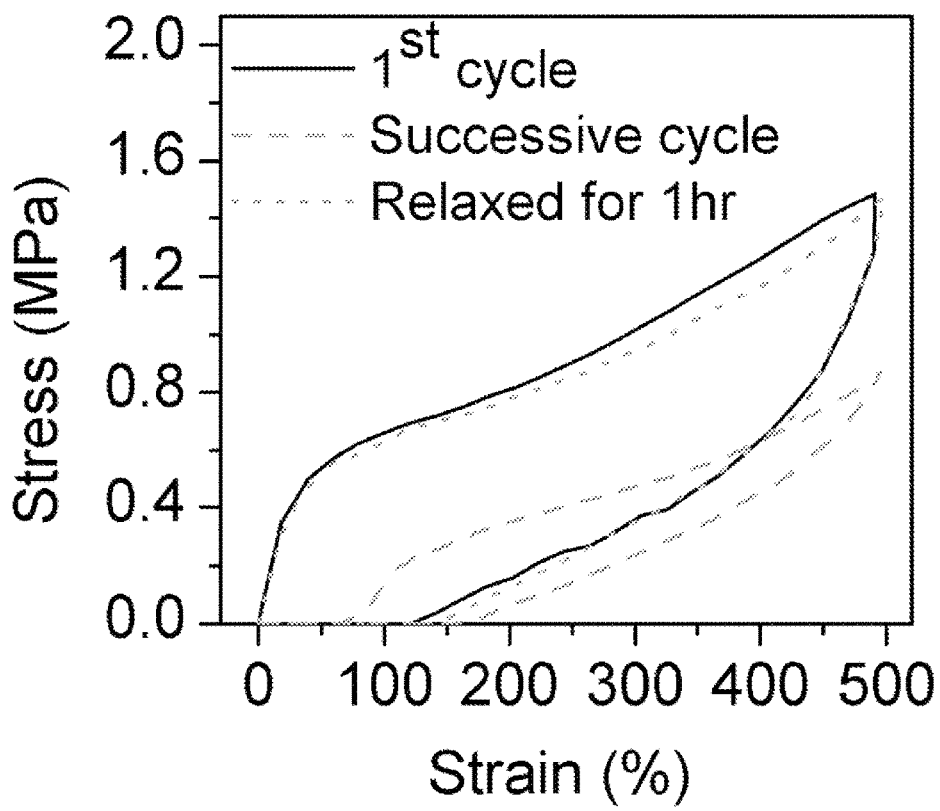
FIG. 12B: Graph showing cyclic stress-strain curve of different samples of PBPUU: 1—pristine (as prepared), 2—stretched immediately after the first release process, and 3—relaxed for 1 hr after the first strain cycle and stretched again.

Mechanical properties of the PBPUU were also investigated. As shown in FIG. 12A, pristine PBPUU is highly stretchable, up to ~1000%, and has a very high ultimate tensile strength of ~3.3 MPa (with ~6.1 MPa being the maximum obtained value) which is comparable to the best value introduced in fast autonomic self-healing devices (S. M. Kim, H. Jeon, S. H. Shin, S. A. Park, J. Jegal, S. Y. Hwang, D. X. Oh, J. Park, Superior toughness and fast self-healing at room temperature engineered by transparent elastomers. *Adv. Mater.* 30, 1705145 (2018)) The stress-strain behavior was also tested after cutting the PBPUU sample in half and leaving it for self-repair. FIG. 12A shows the complete self-healing process that took 24 hr and provided almost more than 85% efficiency in terms of ultimate tensile strength and above 90% in terms of strain at failure. Cyclic stress-strain curve tests were also carried out to study the relaxation and hysteresis after stretching cycles. FIG. 12B shows the cyclic test for different samples of PBPUU: 1—pristine (as prepared), 2—stretched immediately after the first release process, and 3—relaxed for 1 hr after the first strain cycle and stretched again. PBPUU shows good relaxation behavior with negligible change in the stress-strain behavior.

Figure 12C:
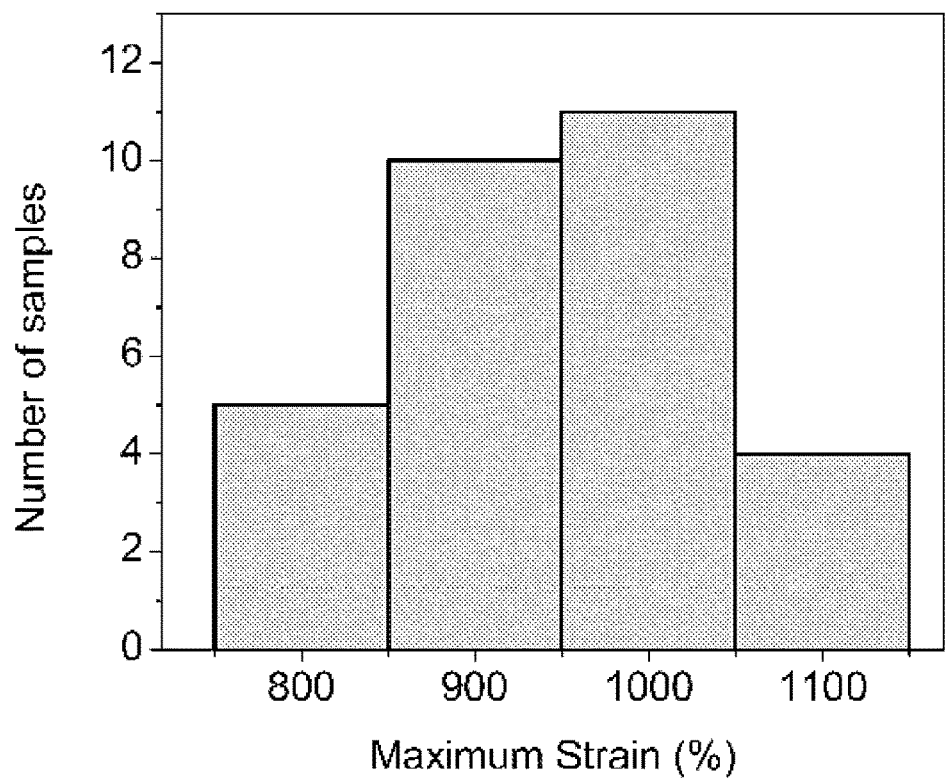
FIGS. 12C-12D: Histograms showing the maximum strain (FIG. 12C) and maximum stress (FIG. 12D) values distribution obtained from 30 PBPUU samples that were prepared at different times during the study.
Figure 12D:
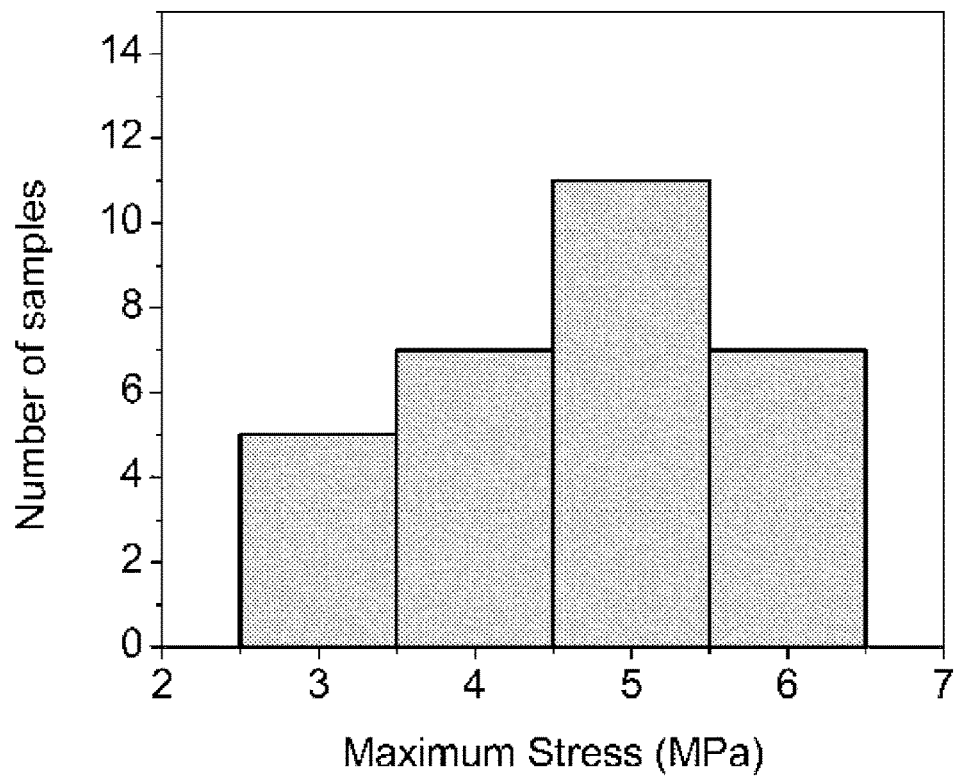

FIGS. 12C-12D summarize maximal stress and strain values obtained from thirty different PBPUU samples, showing that the above-mentioned values (i.e., about 1000% maximum strain and about 6 MPa maximum stress) are representative of a large number of samples.

Figure 13A:
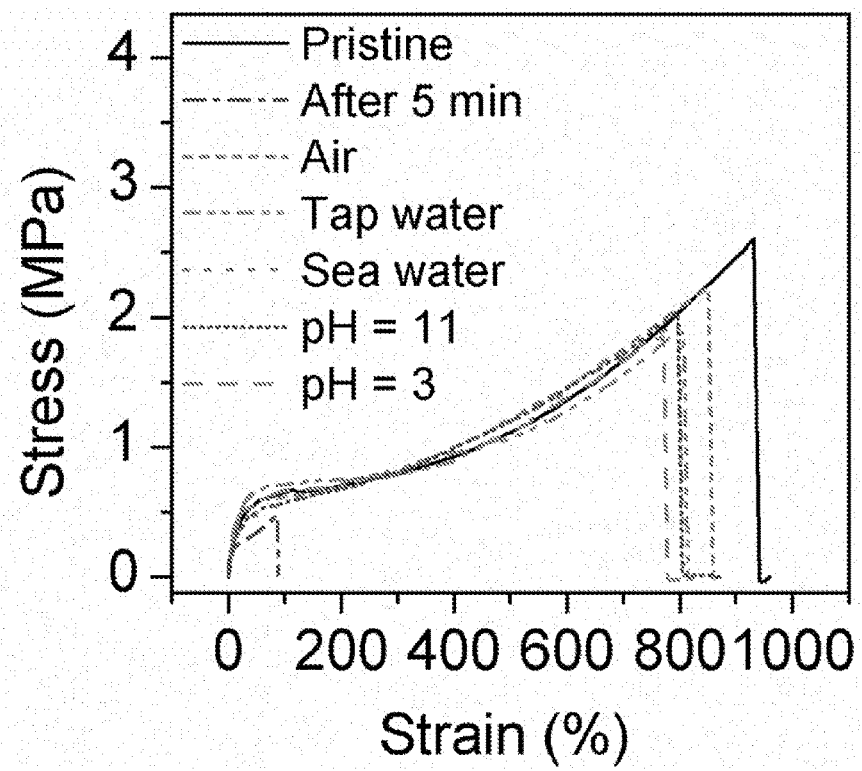
Figure 13B:
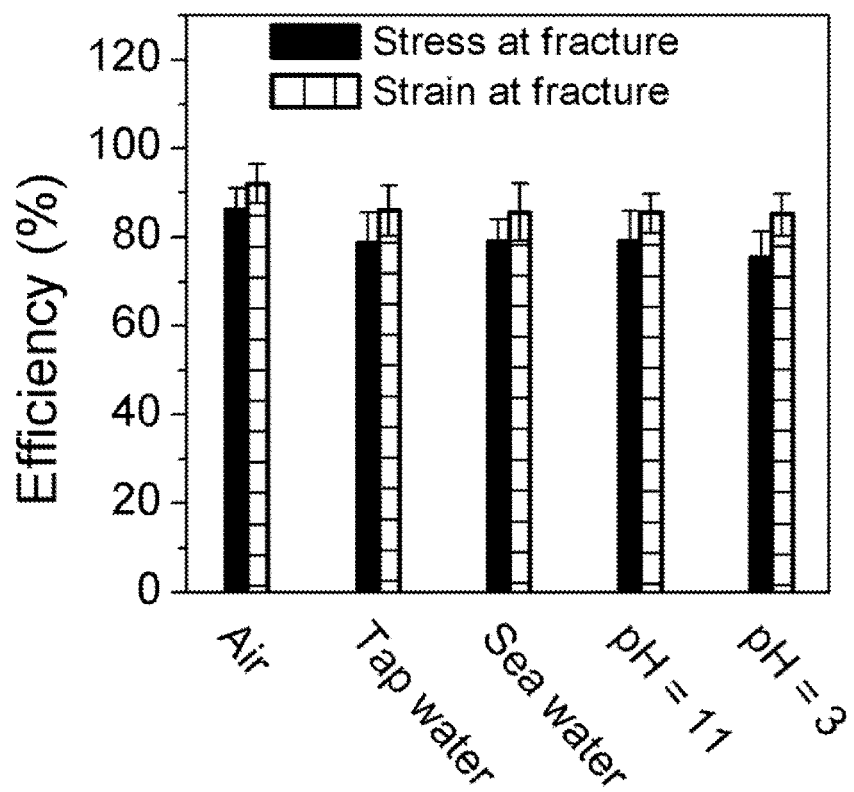

The self-healing ability of PBPUU under different aqueous conditions was tested including tap water, sea water, acidic solution (pH=3) and basic solution (pH=11, FIGS. 13A-13B). The results were compared to the self-healing ability at ambient conditions (25° C. and ~70% humidity). Surprisingly, the self-healing efficiency under all aqueous conditions were comparable to healing in air. In other words, very small difference between the healing efficiencies could be seen after 24 hr; all efficiency values were between 80% and 90%. These results are quite unique and very important for application under real harsh aqueous conditions. More importantly, the recovery of surface scratches underwater was more efficient and faster compared to that under air conditions (FIGS. 10A-10D and 11A-11D).

Example 5—Hydrolytic Stability of the Polybutadiene Poly(Urea-Urethane) Elastomer For under-water stability experiments, PBPUU strips were immersed in water, then cut in half, and left to heal under the same conditions. Electrical self-healing characterization of electrodes was done by 2-point resistance using a Keithley data logger device (model 2701 DMM), controlled by a custom Labview program; this allowed us to acquire sequential resistance readings from the CNT/AgNWs conductive films. Cutting was done with a ~20 m blade or >1 m razor-sharp blade. Tap water (pH 7.8) was used without any previous treatment. Sea water were collected from the Mediterranean Sea (pH of ~7.95). Acidic aqueous solutions were prepared using different concentrations of HCl while basic solutions were prepared using NaOH.

Figure 13C:
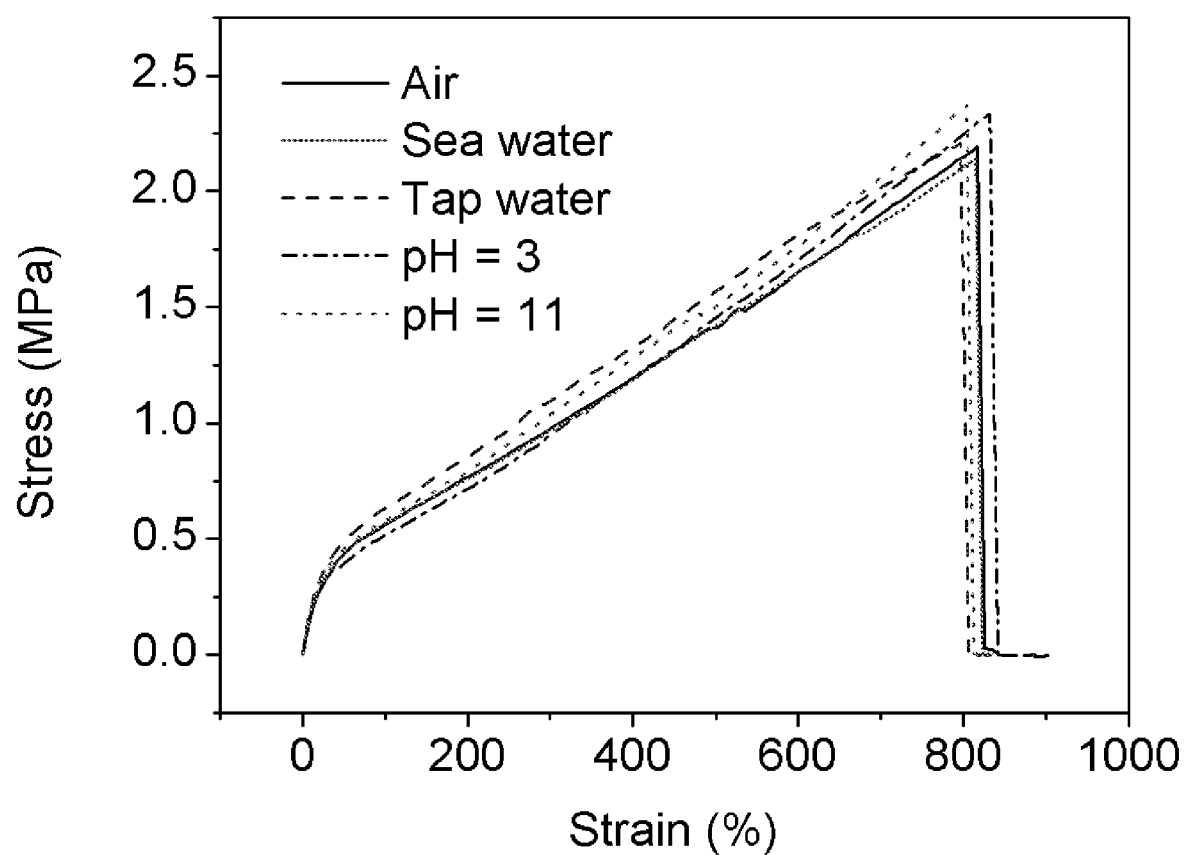
Figure 14A:
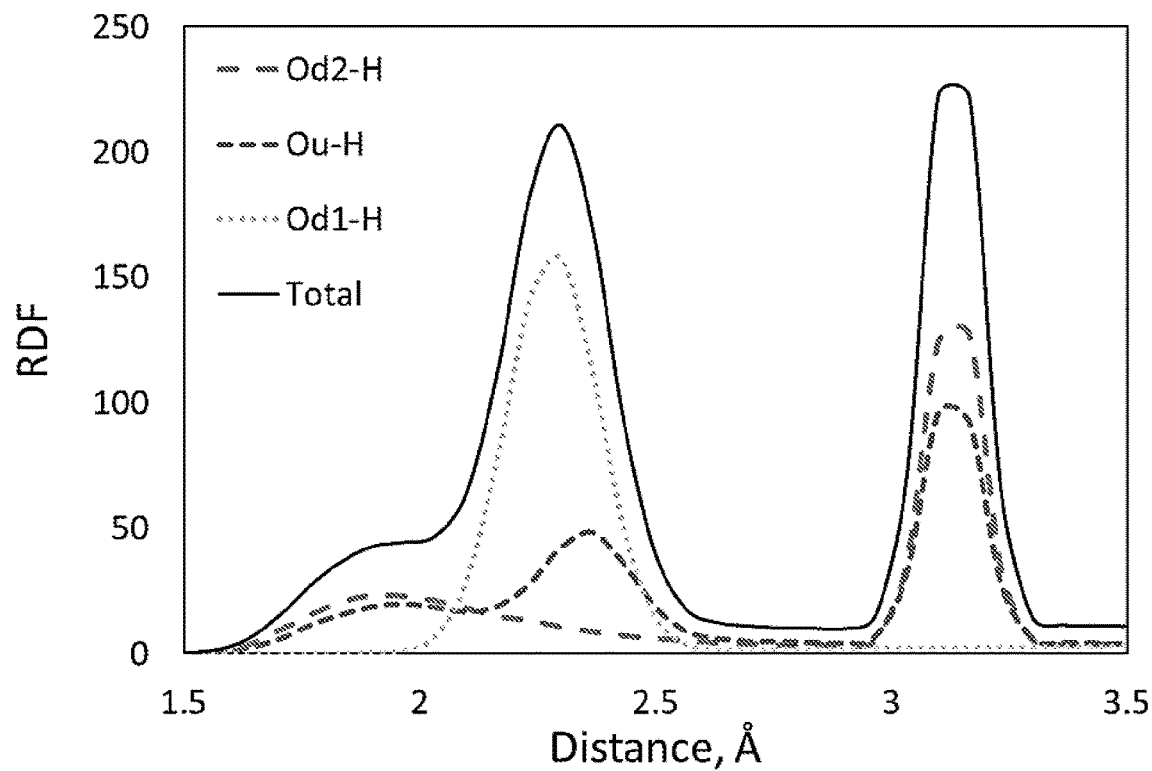
FIGS. 14A-14D: Graphs showing molecular dynamics simulation results showing radial distribution function (RDF) of hydrogen bonds formed within PBPUU without water (FIGS. 15A-15B) and in the presence of water (FIGS. 15C-15D). $O_{d2}$ represents urethane oxygen (double-bonded to C), $O_u$ represents urea oxygen, $O_{d1}$ represents urethane oxygen (single-bonded to C), $N_d$ represents urethane nitrogen, $N_u$ represents urea nitrogen, and $N_n$ represents amine ends nitrogen.
Figure 14B:
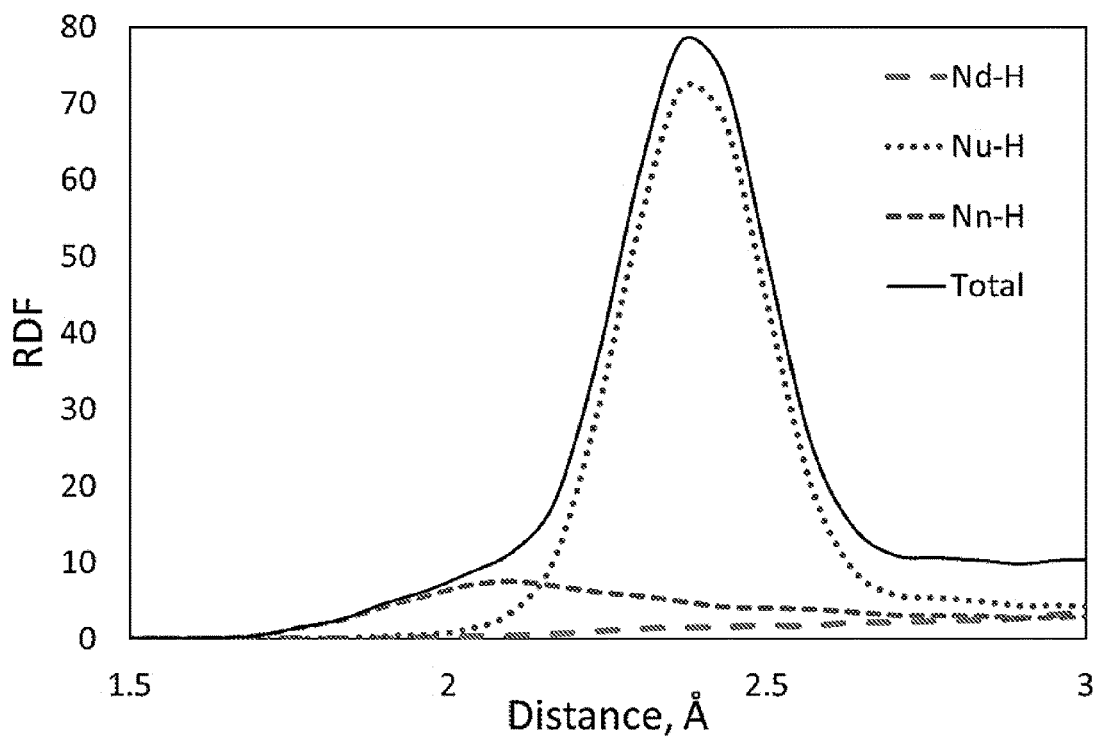
Figure 14C:
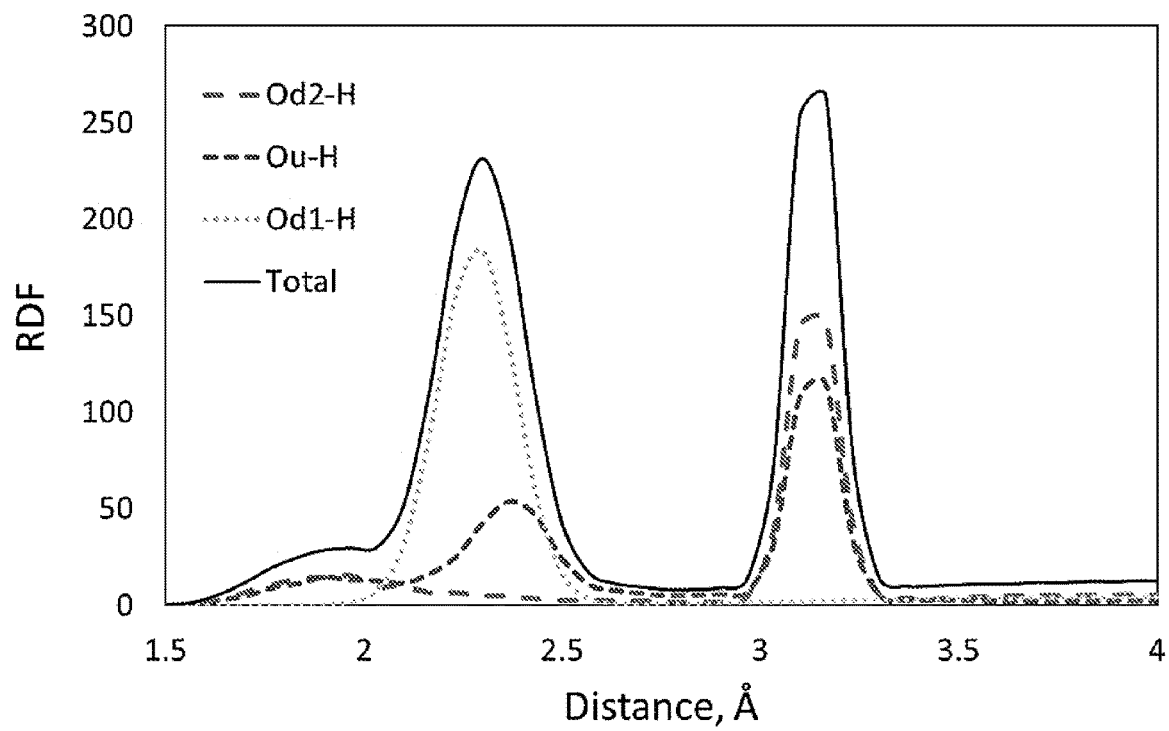
Figure 14D:
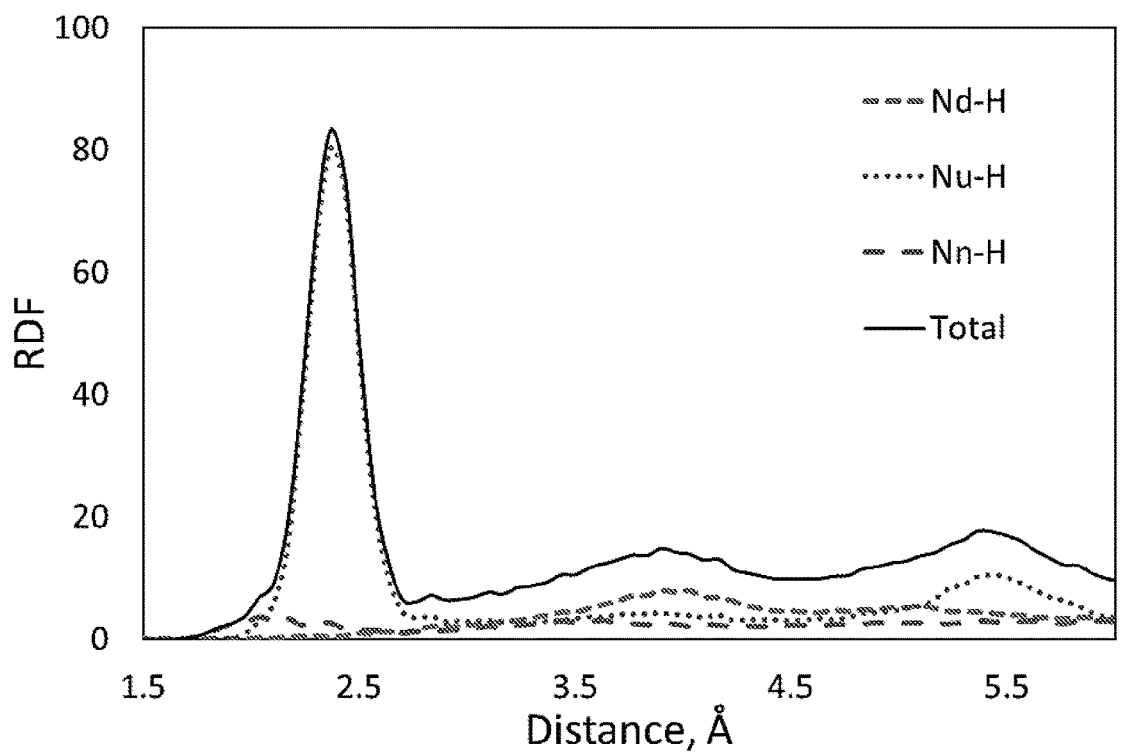
Figure 15A:
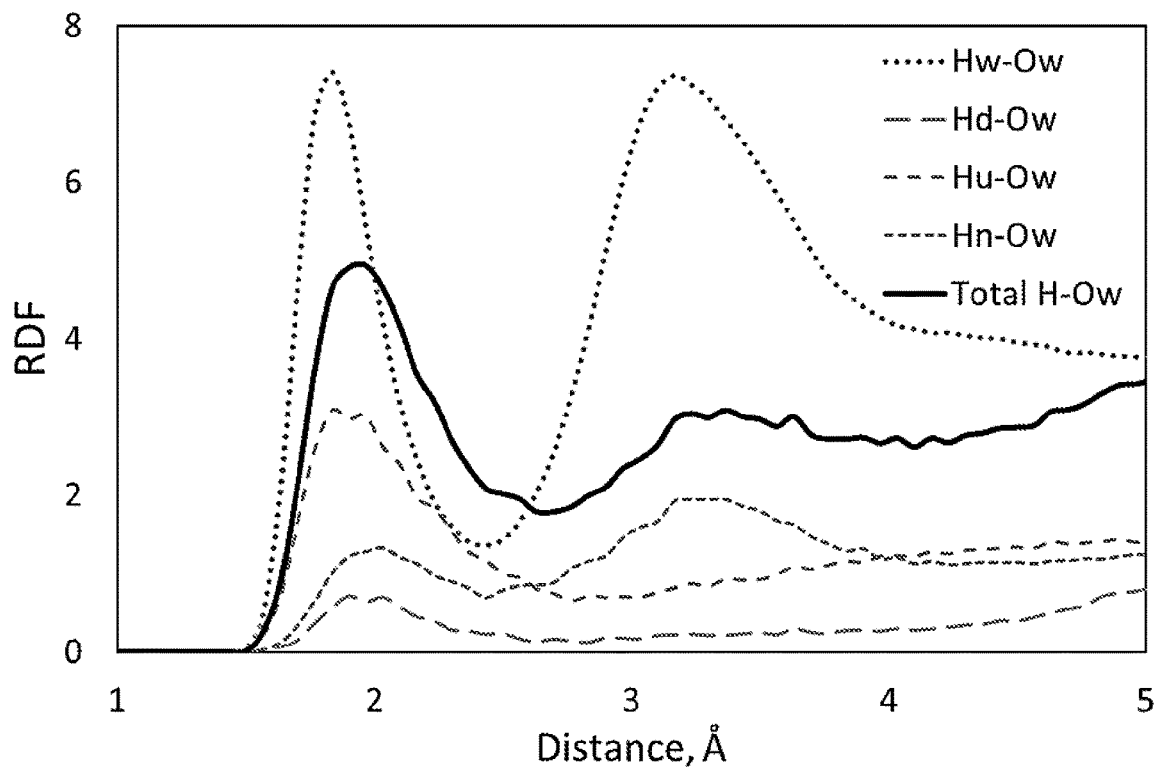
FIGS. 15A-15F: Graphs showing molecular dynamics simulation results showing radial distribution function (RDF) of hydrogen bonds formed between PBPUU and water (FIGS. 15A-15C) and between polypropylene glycol-based poly(urea-urethane) (PPGPUU) and water (FIGS. 15D-15F). $O_w$ and $H_w$ represent water oxygen and hydrogen, respectively; $O_d$, $N_d$, and $H_d$ represent urethane oxygens, nitrogen, and hydrogen, respectively; $O_c$ represents ether oxygen in PPGPUU; $O_u$, $N_u$, and $H_u$ represent urea oxygen, nitrogen, and hydrogen, respectively; $N_n$, and $H_n$ represent amine ends nitrogen and hydrogen, respectively.
Figure 15B:
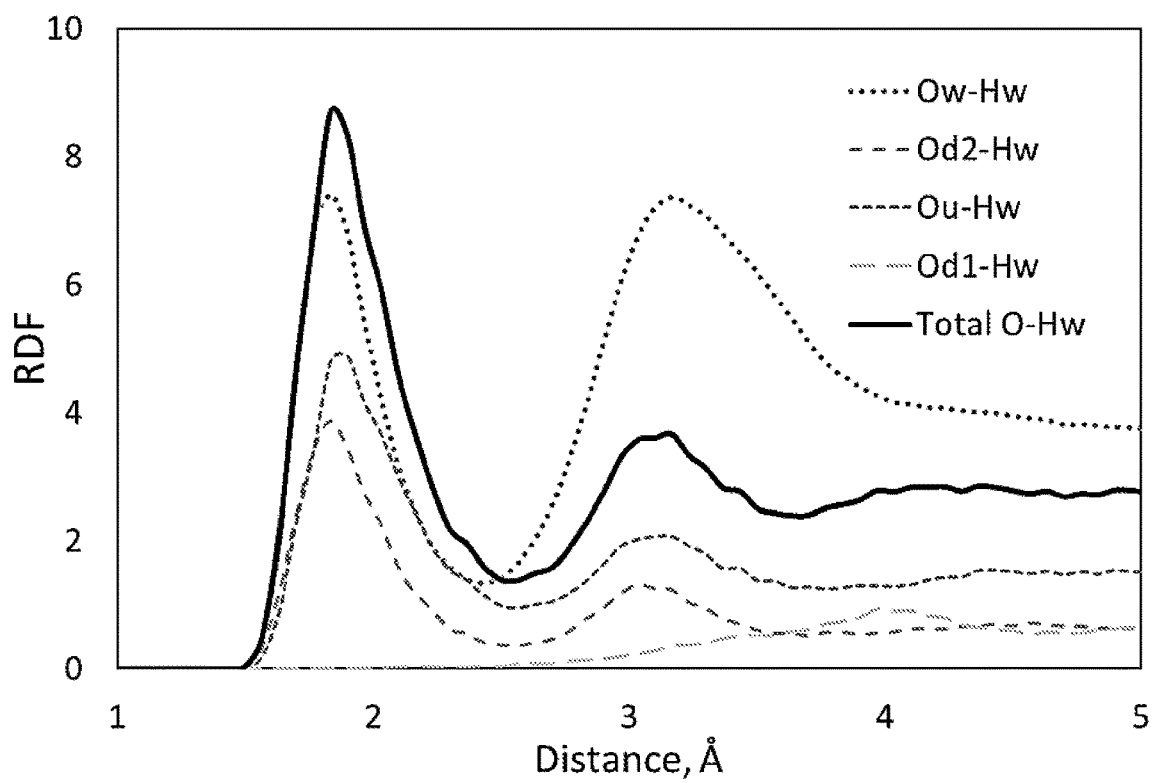
Figure 15C:
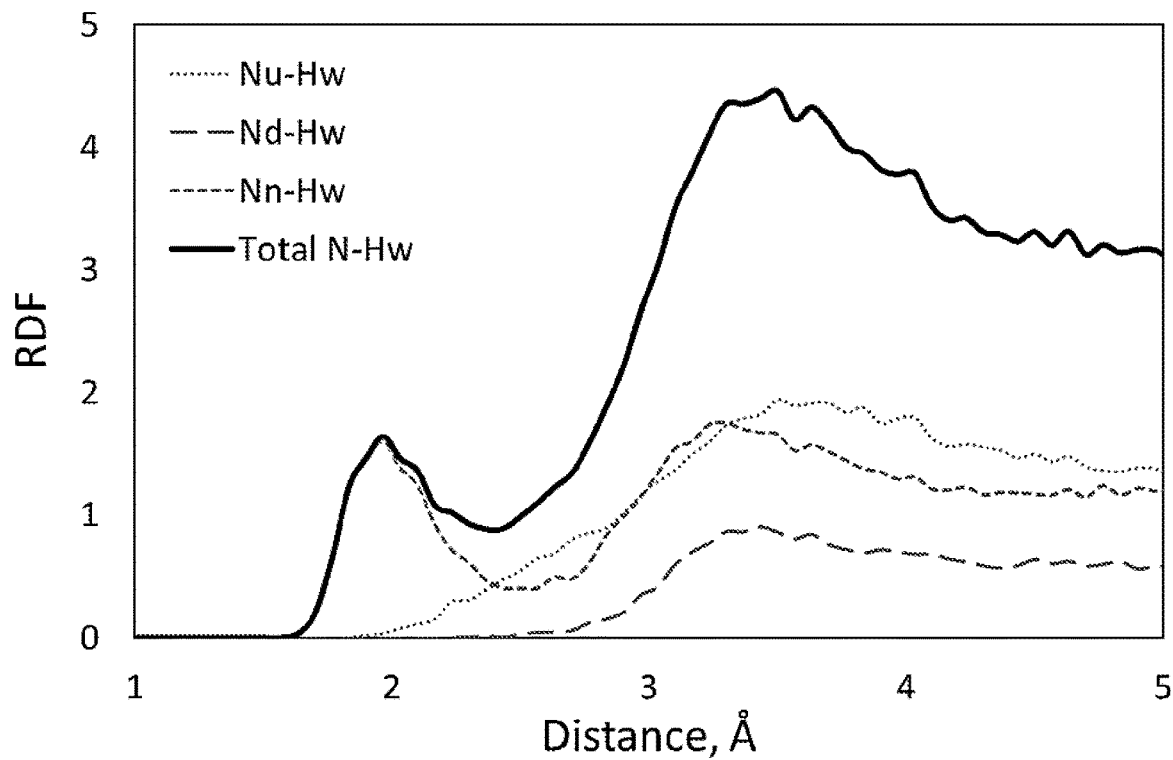
Figure 15D:
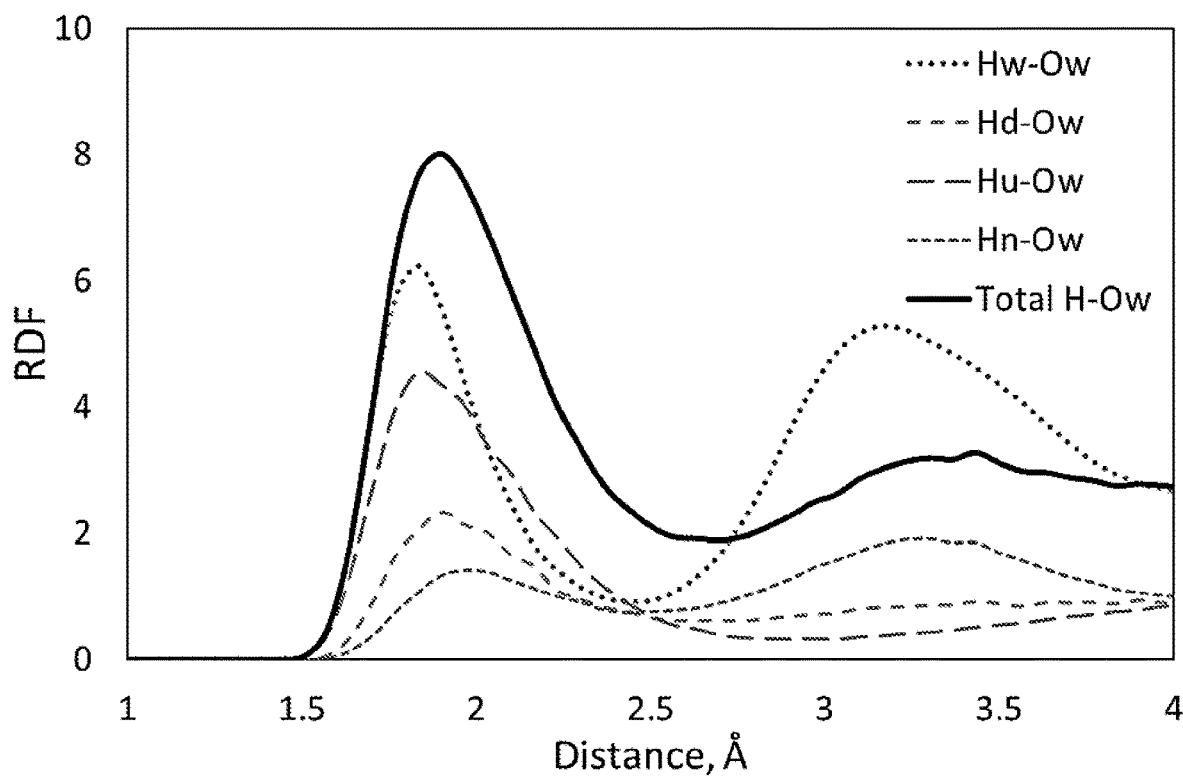
Figure 15E:
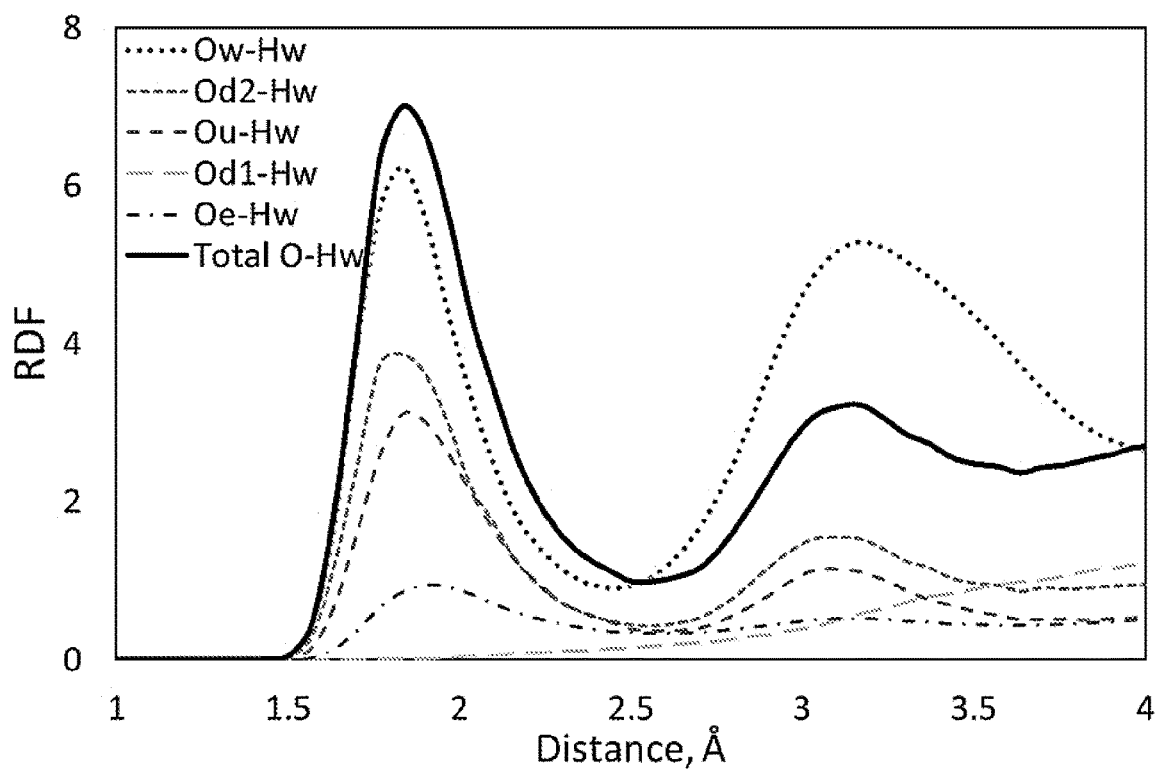
Figure 15F:
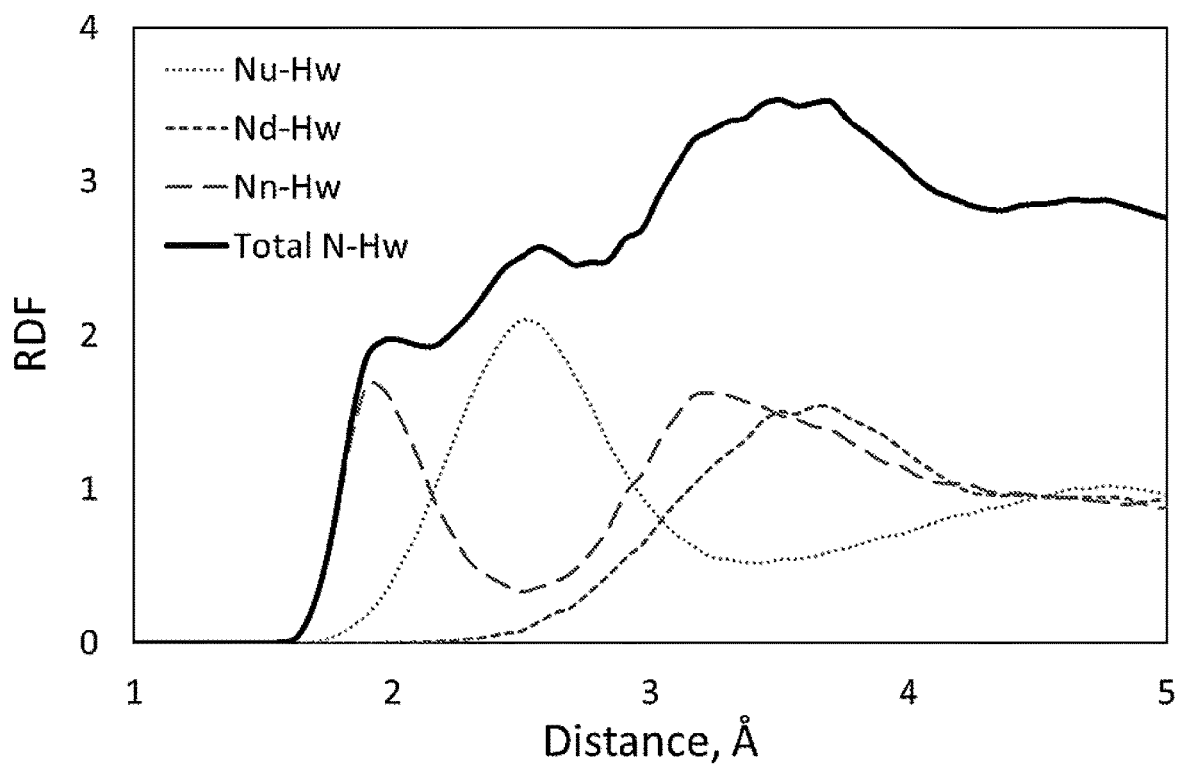

FIG. 13C presents the stress-strain behavior of PBPUU samples after storing them for 1 month in different environments, including air, sea water, tap water, pH=3 aqueous solution, and pH=11 aqueous solution. No noticeable change in the mechanical stability was observed.

Example 6—Behavior of the Polybutadiene Poly(Urea-Urethane) Elastomer in Water Environment To investigate the effect of structural design on the behavior of the elastomer in water environments, molecular dynamics simulations were carried out to determine the favorable arrangement of a system that is composed of polymeric chains and water molecules. Molecular dynamics simulations of PPGPUU and PBPUU were carried out using LAMMPS software with the OPLS united atom force field, and tip3p force field for water, with potential cut-off of 10 Å. The anhydrous or hydrated polymer system of interest was initially equilibrated under the isothermal-isobaric ensemble (NPT) for 1 ns (using ifs timesteps) at standard conditions. Average properties were evaluated under the canonical ensemble (NVT) over an additional Ins following equilibration. To obtain better statistics, 10 independent runs were used, obtained by heating to 500K over a period of 1 ns and cooling back to 298° K over a period of ins, followed by NPT equilibration and NVT production cycles.

Polypropylene glycol-based poly(urea-urethane) (PPGPUU) was used for comparison, as it has similar structure compared to PBPUU, including the same chain exchanger (APDS) but a different main repeating unit, being propylene glycol. Each polymer used for simulation consisted of a single monomer unit with a random sequence (n~40) of the relevant repeating units (butadiene and propylene glycol). Each simulation consisted of 9 such monomers at either anhydrous conditions or in the presence of water at 30:1 ratio of water to the simulated polymer. The addition of water appears to enhance hydrogen bonding within the polymeric chains (FIGS. 14A-14D). Without wishing to being bound by theory or mechanism of action, this effect might be explained by the hydrophobicity of the main repeating unit of PBPUU which tends to aggregate together improving the intermolecular hydrogen bonds like oil-in-water systems where it is energy favorable for oil droplets to aggregate together. This can be related to the underwater self-healing ability where stronger interaction between chains are needed to prevent water molecules from disrupting the self-healing process. The results further show that PPGPUU interacts much more favorably with water than PBPUU (FIGS. 15A-15F). The separation of soft and hard regions in PBPUU was confirmed by molecular dynamics simulation, being consistent with the TEM image in FIG. 6 which shows the phase separation obtained in PBPUU. Water molecules only interact with the rigid region while they barely diffuse into soft regions in PBPUU. Together with the fact the rigid regions do not form a continuous pathway into the polymeric film, this suggest that water molecules mainly stay on the surface of PBPUU but not inside. Without further wishing to being bound by theory, this model would explain the improved scratch recovery in underwater conditions. Water molecules interact with the hard regions of PBPUU leading to an increased softness on the damaged area and then allowing faster rearrangement of the surface and more efficient recovery as well. In contrary, for the case of PPGPUU at the same level of hydration, water molecules span the softer regions of the polymer and are not only limited to the urethane/urea regions. This leads to the formation of continuous water-filled pathways into the bulk of PPGPUU and in turn to high swelling ratios.

Figure 16A:
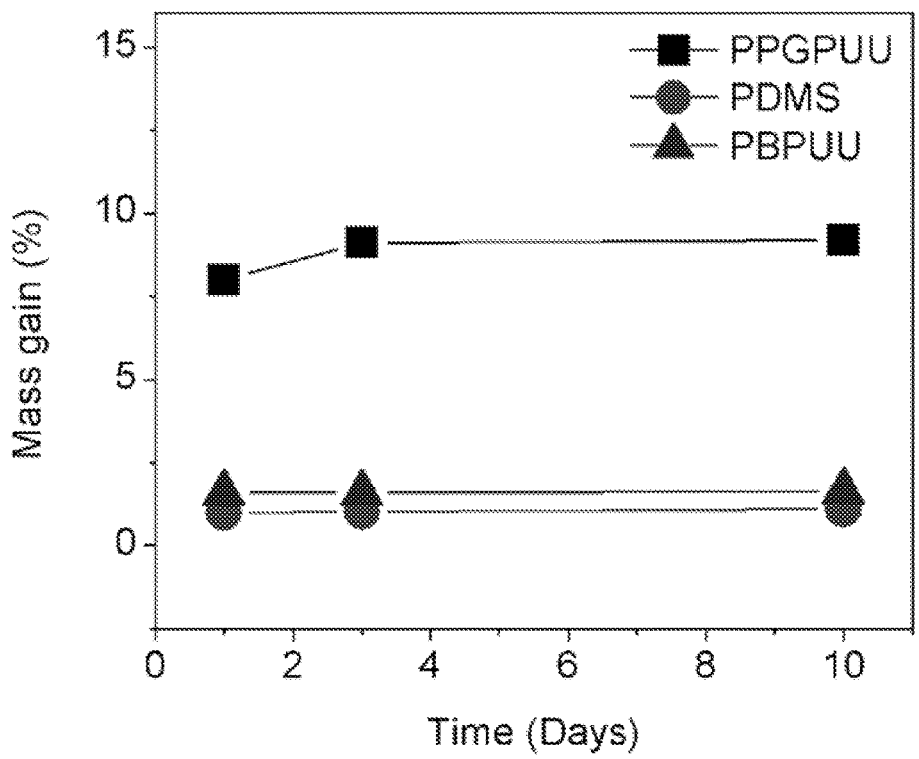
FIG. 16A: Graph showing swelling of PBPUU, PDMS, and PPGPUU by water under 25° C.
Figure 16B:
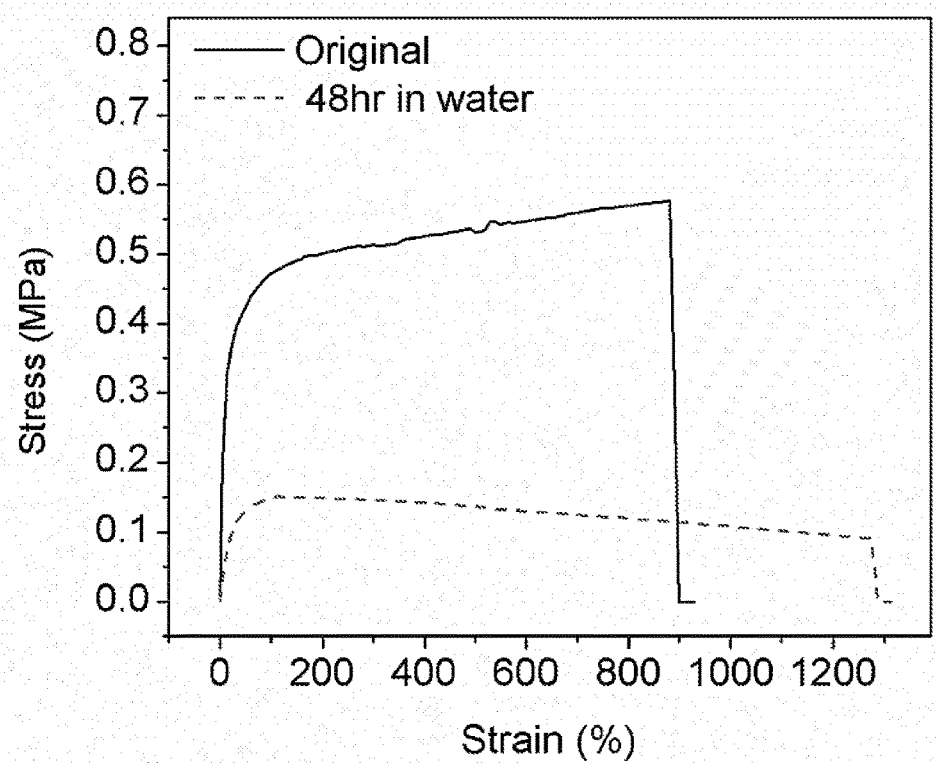
FIG. 16B: Graph showing stress-strain curves obtained from original PPGPUU and after immersion in tap water for 48 hr.

Water swelling and transition tests of the PBPUU polymer were performed and compared to these of PDMS and PPGPUU. PPGPUU showed a significantly higher water absorption (~9% mass gain), compared to PBPUU (<1.8% mass gain, FIG. 16A), which significantly degraded its mechanical strength after 48 hr of immersion (FIG. 16B). The films were held on a filter paper to prevent any damage while handling the experiment. The measurements were carried out at 60° C. temperature and 20% humidity. PBPUU demonstrated the slowest transmission rate compared to PPGPUU and PDMS.

Figure 16C:
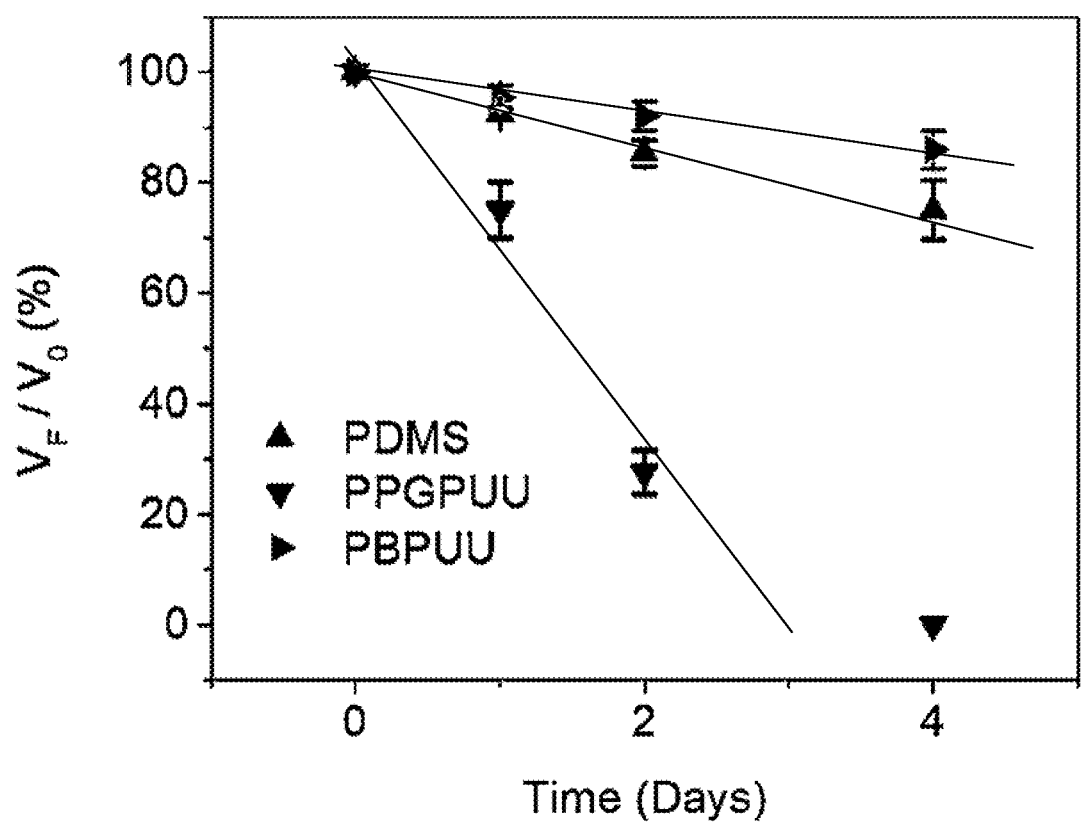
FIG. 16C: Graph showing results of water vapor transmission tests of 20-μm-thick films of PBPUU, PDMS, and PPGPUU by covering water-containing bottle openings.

In addition, PBPUU has a very low permeation compared to PPGPUU making it a great candidate for use as a humidity barrier (FIG. 16C).

Example 7—Application of the Polybutadiene Poly(Urea-Urethane) Elastomer into Water-Exposed Electronics—Tactile Sensor The integration of multiple useful properties such as self-healing, toughness, durability and water insensitivity makes PBPUU a superior candidate for multiple water-prone application or underwater electronics. To demonstrate this capability, PBPUU was applied for the preparation of stretchable e-skin with multiple tactile sensors (FIGS. 17A-17C and 18). The self-healing stretchable conductive pathways were prepared by embedding silver nanowires (Ag-NWs) or carbon nanotubes (CNTs) into the surface of PBPUU (FIGS. 19A, 19B, 20A, and 20B).

Figure 21A:
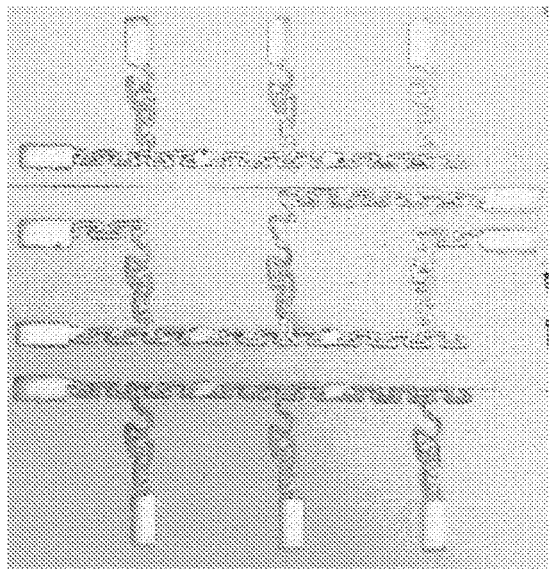
Figure 21B:
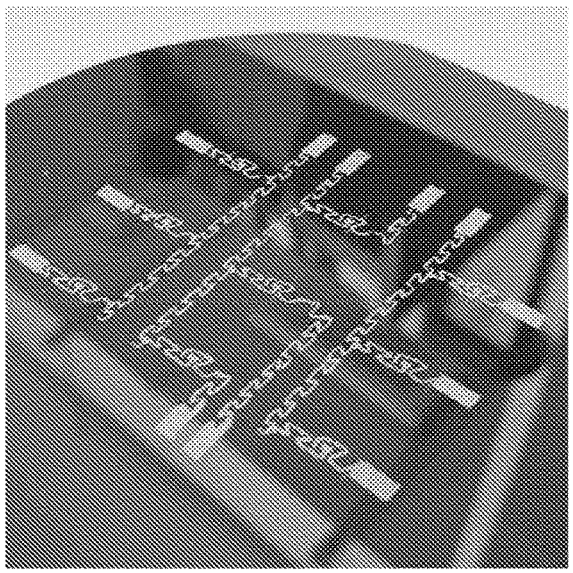
Figure 21C:
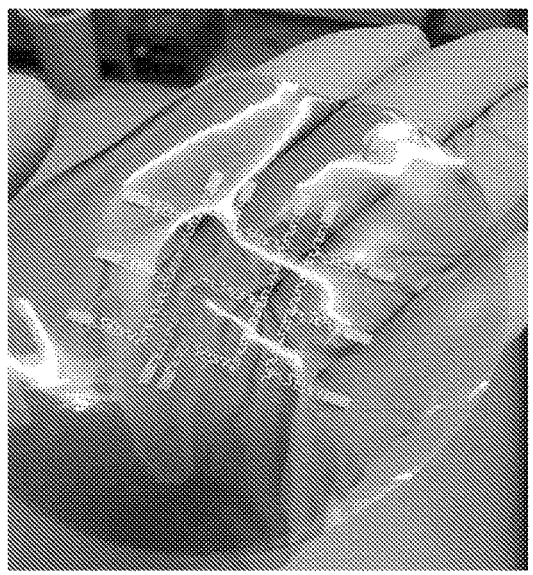
Figure 22:
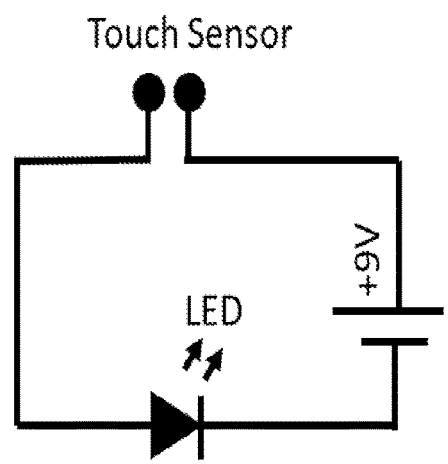
FIG. 22: Schematic representation of a simple electric circuit used to connect the tactile sensor with an LED array to visualize the response to touch.

Fabrication of the self-healing tactile e-skin: CNTs/Ag-NWs were sprayed through a shadow-mask on a slightly modified silicon wafer, prepared by treatment with oxygen plasma and then immersion in a solution of hexyltrichlorosilane in toluene for 1 min. Solutions of PBPUU were poured on top of the electrodes left for drying and then peeled off to obtain the self-healing conductive electrodes (FIGS. 21A-21C). The tactile sensor is composed of two electrodes with a gap in between. The attachment of skin/conductive objects allow the pass of current between the electrodes. The tactile sensors array was connected to 3 x3 light emitting diode (LED) array and driven by an external 9V battery. The activation of each tactile sensor leads to the lightening of the corresponding LED.

The performance of this e-skin was demonstrated using an LED array (FIGS. 22, and 23A-23F), and its self-healing ability was examined by making a surface cut that inflicted all the electrodes. The functionality of the device was tested after 24 hr, and it was completely normal as similar LED intensities (upon touch) were noticed (FIGS. 23D-23F). Then investigation of the performance of PBPUU-based devices under exposure to water was performed. First, thin PBPUU substrate (100 um) holding two adjacent electrodes (AgNW) was prepared. The two electrodes were used to represent any adjacent conductive pathways in soft electronics. Once there is a short-circuit between two electrodes, a systematic failure is usually expected. First, durability under sea water was tested, assuming that the absorption of liquid will result in leakage currents between the two electrodes because of the existence of ions which can freely move inside the material. The two electrodes, encapsulated with PBPUU were immersed in sea water for one week, and then the resistance between the two electrodes was measured showing values of above 1 GΩ. For a comparison, the same structure with PPGPUU and PDMS under the same conditions was evaluated. PDMS was also stable with a resistance of above 1 GQ whereas PPGPUU absorbed a lot of water resulting in a short-circuit with a resistance of about 50 MQ between the electrodes.

Figure 24A:
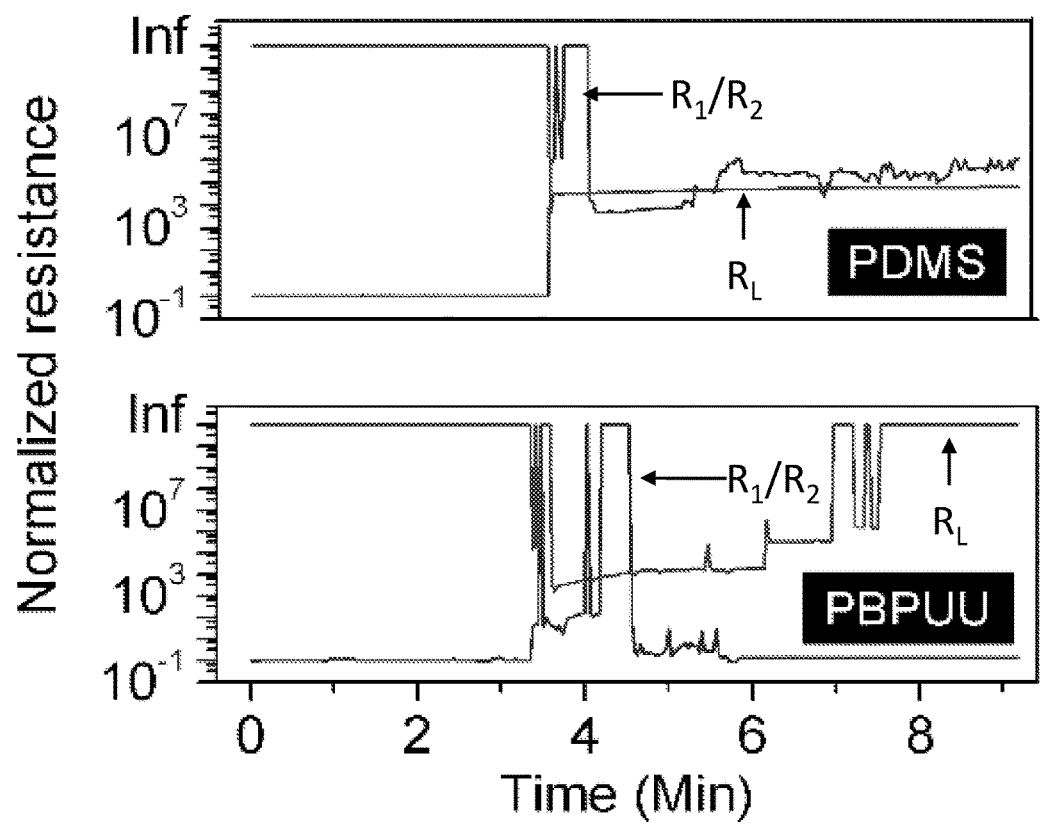
FIG. 24A: Graphs showing monitoring of resistance of two electrodes ($R_1$ and $R_2$) and the leakage current ($R_L$) between the electrodes in underwater conditions following structural damage. Top graph shows PBPUU-based electrodes and the bottom graph shows PDMS-based electrodes.
Figure 24B:
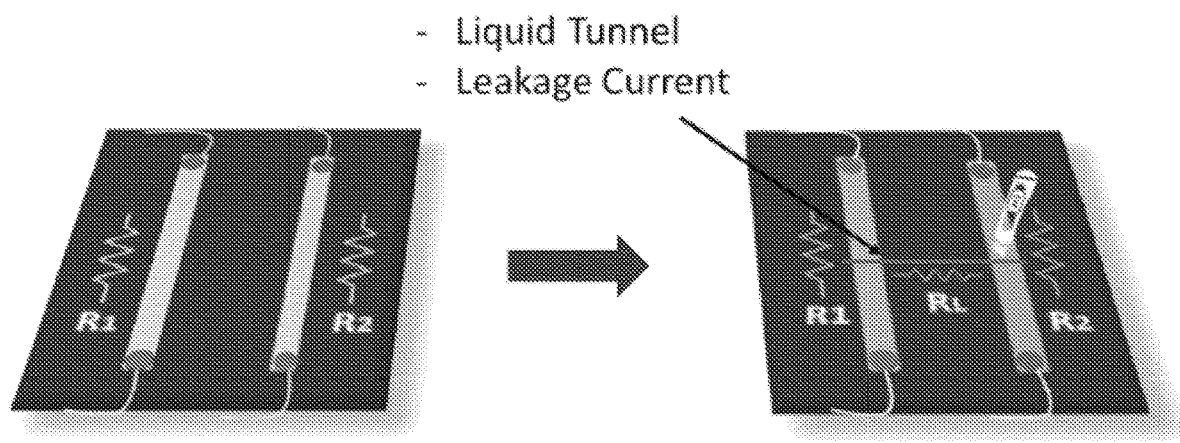
FIG. 24B: Schematic representation of the structural damage and the resultant conductive paths, which resistance is represented in FIG. 24A, wherein the black line shows the structural damage made by a blade leading to the appearance of leakage currents.

Effect of the surface cuts on the conductivity of PBPUU-based electrodes in marine environment has also been tested and compared to PDMS (FIGS. 24A and 24B). A structural cut perpendicular to two adjacent electrodes was made after about 3.3 min into the resistance measurement, showing abrupt increase in leakage currents and decrease in the conductance of the two electrodes. The resistance of the conductive electrodes has increased by more than 8 orders of magnitudes and high leakage currents ($R_L$) with a resistance of about 10Ω between the electrodes, were measured in PBPUU, as well as PDMS. With PBPUU, the conductivity of the electrodes started to increase slowly approaching the original value after 2 min. Moreover, the leakage current has been eliminated to a non-detectable value within about 5 min. However, PDMS, which is routinely used in various electronic systems, failed under exposure to liquids in case of any surface damage, as no decrease in the leakage current value nor in the resistance of the conductive electrodes was obtained. PPGPUU was not tested because it introduces high leakages even without any structural damages.

For another demonstration of the self-healing ability of the PBPUU polymer in aqueous conditions, two adjacent electrodes attached to a robotic fish were used to deliver current for driving a LED. Upon external surface damage, the LEDs were turned on as a result of leakages between the two adjacent electrodes. However, after the recovery of PBPUU the corresponding LED was turned off. In contrast, PDMS encapsulated electrodes failed in their recovery leading to a LED, which was constantly switched on.

Example 8—Application of the Polybutadiene Poly(Urea-Urethane) Elastomer into Water-Exposed Electronics—Electrochemical Transistor Application of PBPUU for ultra-low voltage electrochemical transistor for underwater sensing applications was also demonstrated.

Figure 25A:
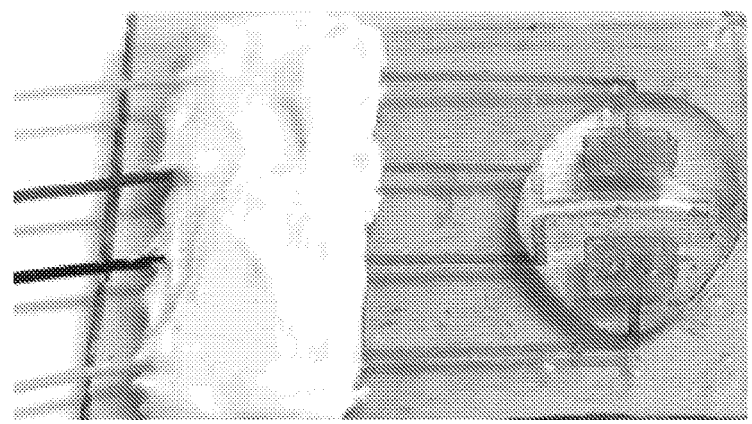
FIG. 25A: Photograph of the electrochemical transistor used for pH sensing, the results of which are presented in FIGS. 25B and 25C.

Preparation of the self-healing electrochemical transistor: For electrode (source drain and gate) preparation, AgNWs/CNT dispersion was sprayed through a shadow-mask on a slightly modified silicon wafer, prepared by treatment with oxygen plasma and then immersion in a solution of hexyltrichlorosilane in toluene for 1 min. PBPUU solution (100 mg/ml) in chloroform was drop-casted on the electrodes and left to dry and then peeled off. Semi-conductive CNT ink was prepared by mixing 99% semi-conducting-SWCNT solution, DI-water, propylene glycol and FluroN at the ratio of 1:6:1.25:0.75 (by volume), followed by ultrasonication. Subsequently, semi-conductive CNT ink (10 μL) was drop-casted on the CNT source/drain composite electrodes after treatment with oxygen plasma and heated to 90° C. for 30 min. The device was rinsed in DI water for 1 hr to remove the surfactants, and then left in a vacuum oven at 90° C. for several hours. An insulation layer of PBPUU was coated on top of the device leaving the semi-conducting channel and the adjacent gate electrodes exposed. For the preparation of solid thin Ag/Cl reference electrode, $FeCl_3$ in water was dropped on the gate electrode for 30 seconds and then was covered with NaCl/PVB layer. The obtained transistor is shown in FIG. 25A.

Figure 25B:
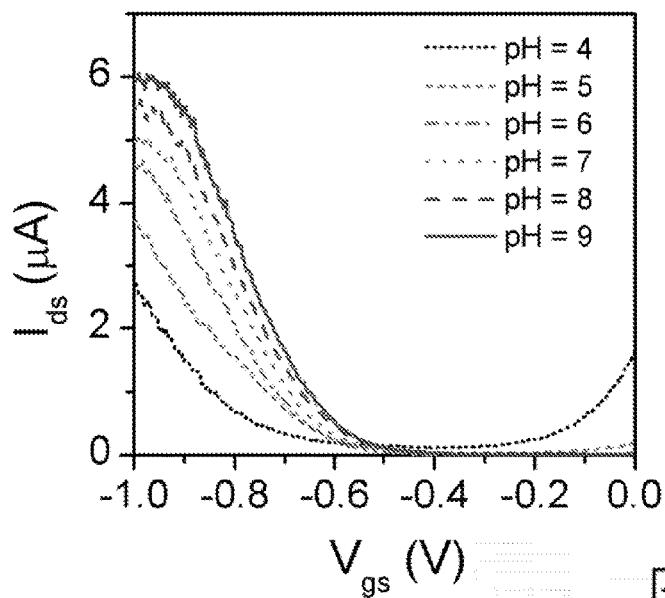
FIG. 25B: Graph showing transistor transfer curves showing the responses to different pH values between 4 and 9; $V_{ds}=-0.8$ V.
Figure 25C:
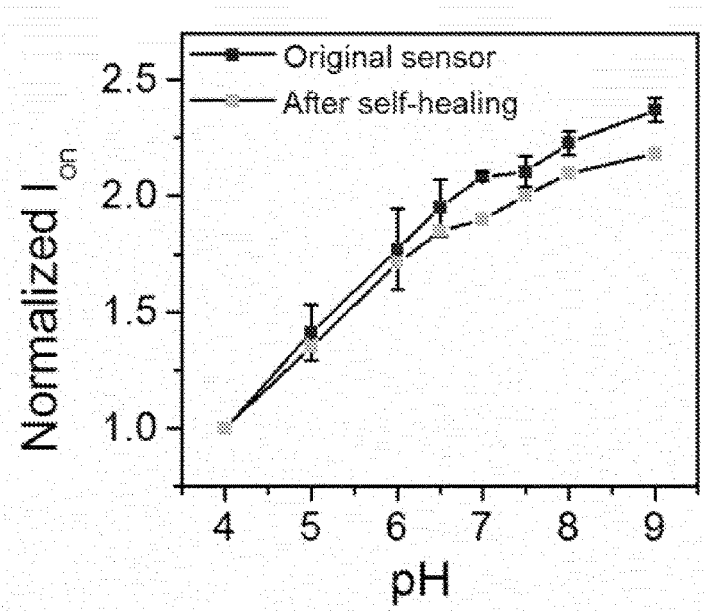
FIG. 25C: Graph showing normalized Ion current values obtained under varying pH values before and after self-healing (normalized with the current values obtained at pH=3).

Semi-conducting carbon nanotubes were used as the sensing layer. Such platform is of high importance as it can be used for preparing versatile sensing applications including physical and electrochemical sensors. The fabricated transistor had the ability to detect differences in pH levels (FIG. 25B). The device showed higher on-currents under basic conditions compared to acidic solutions. The sensitivity of the device was very high compared to other devices introduced in literature (P. Gou, N. D. Kraut, I. M. Feigel, H. Bai, G. J. Morgan, Y. Chen, Y. Tang, K. Bocan, J. Stachel, L. Berger, Carbon nanotube chemiresistor for wireless pH sensing. *Sci. Rep.* 4, 4468 (2014)). Without wishing to being bound by theory, it is contemplated that this ability is related to the change of electrical properties of carbon nanotubes due to pH change. In addition, the self-healing ability of the electrochemical transistor was also demonstrated (FIG. 25C). No noticeable difference in sensitivity can be seen as a result of damaging the electrodes of the transistor.

Example 9—Underwater Self-Healing Strain Sensor

Figure 26A:
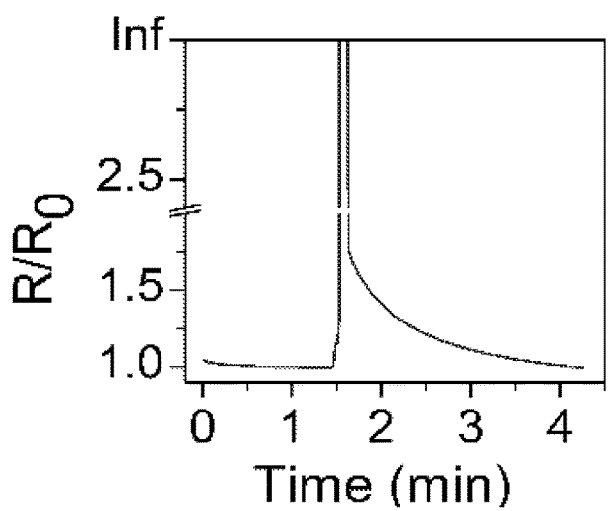
FIG. 26A: Self-healing of a surface cut of the PBPUU-based strain sensor expressed in electrical resistance.
Figure 26B:
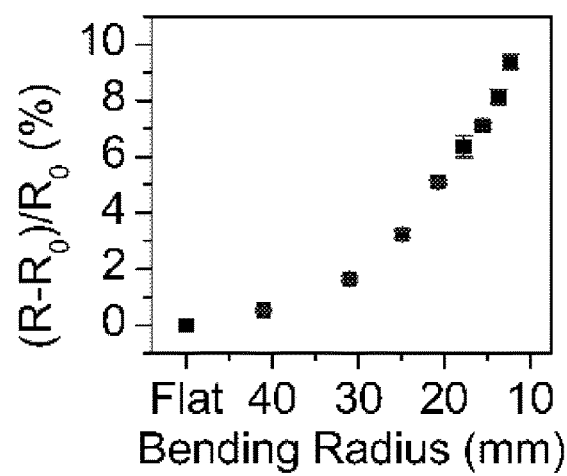
FIG. 26B: Resistance change of the PBPUU-based strain sensor as a function of bending radius before and after self-healing (data points corresponding to resistance before bending and after bending coincide).
Figure 26C:
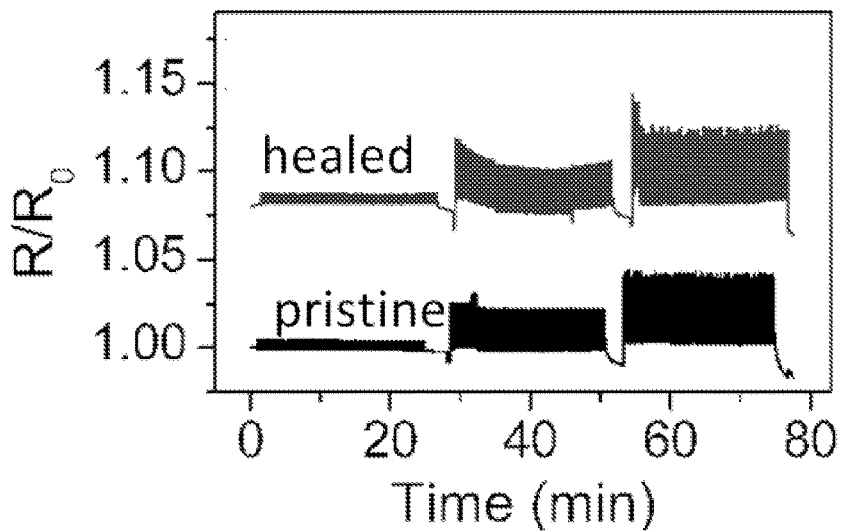
FIG. 26C: Cycling test of the PBPUU-based strain sensor before and after healing under 3 bending radii: 35, 25, 20.7 mm (the upper curve was shifted for clarity).
Figure 26D:
FIGS. 26D-26E: Photographs showing an experimental setup of forefinger bending underwater and different bending positions, wherein the PBPUU-based strain sensor is attached to the forefinger.
Figure 26E:
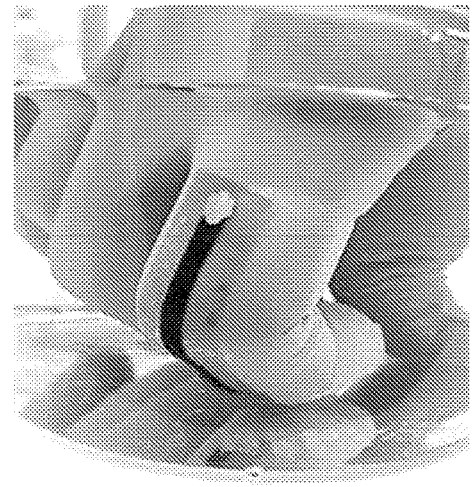
Figure 26F:
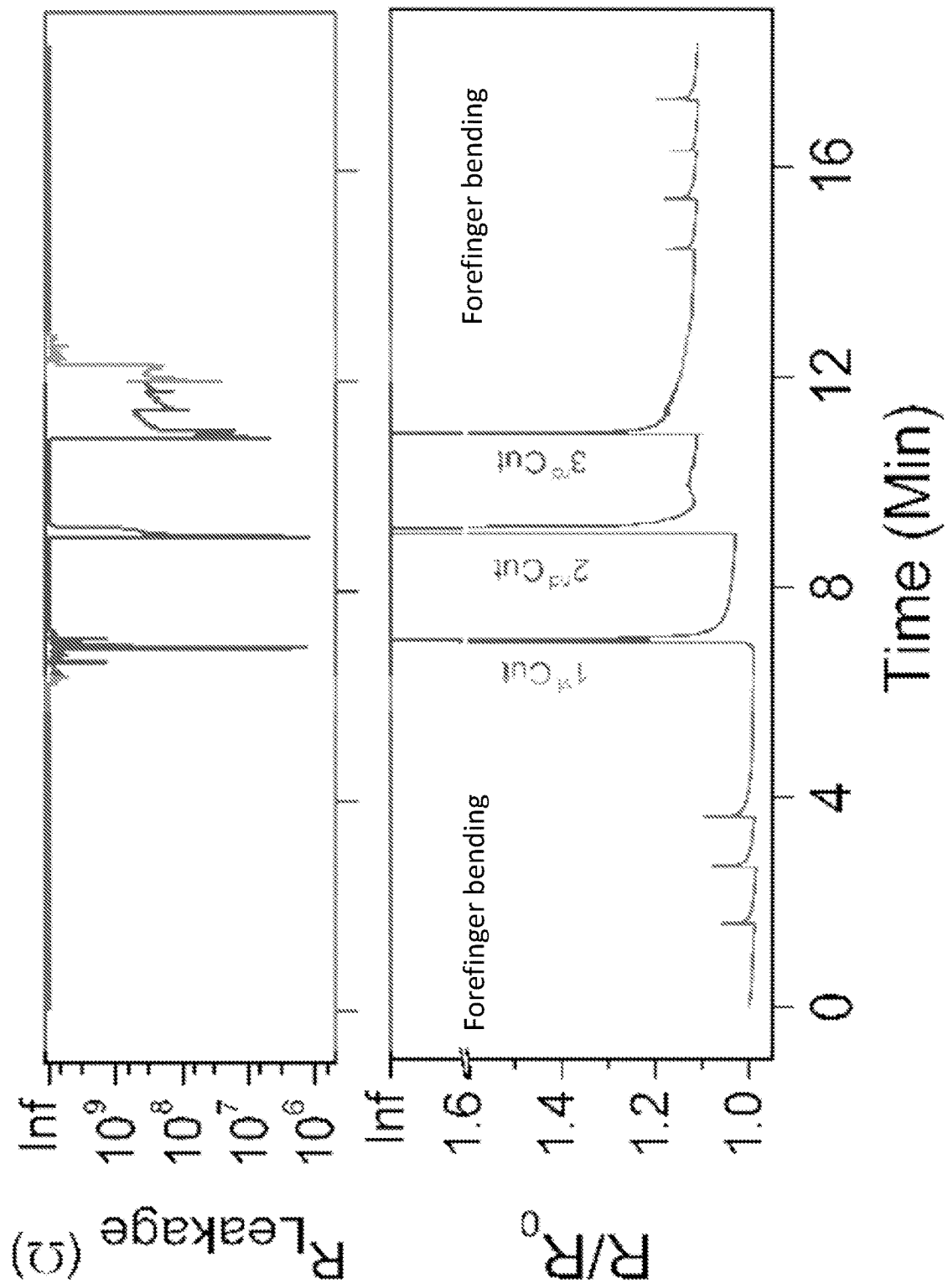
FIG. 26F: Performance of the PBPUU-based strain sensor under forefinger bending in underwater conditions, wherein the graph shows three different regimes: 1—response to bending cycles, 2—electrical recovery and leakage elimination after three consecutive cuts, and 3—additional bending cycles showing the response after healing.

PBPUU was utilized for the development of an underwater self-healing strain sensor. Carbon black was used as a conductive filler to make strain-sensitive resistive pathways. The self-healing of the strain sensor is demonstrated in FIG. 26A showing a highly efficient electrical recovery after making a surface cut. Both the original and healed sensors are stable under cycling experiments. The conductive film shows a typical self-healing behavior. The response of the sensor to different bending radii is summarized in FIG. 26B. FIG. 26C shows cycling tests of the self-healing sensor before and after healing under 3 bending radii: 35, 25, 20.7 mm. For demonstrating the underwater capabilities of the sensor, the sensing performance of the strain sensor under forefinger bending in underwater conditions was studied. FIGS. 26D and 26E show two photographs of the underwater strain sensor under two different forefinger positions. FIG. 26F shows three different regimes: i. response to bending cycles, ii. electrical recovery and leakage elimination after three consecutive cuts, and iii. additional bending cycles showing the response after healing. It is important to note that the after healing the leakage current and electrical resistance are stable even under high bending radii.

Example 10—Thermal Stability of the Polybutadiene Poly(Urea-Urethane) Elastomer

Figure 27A:
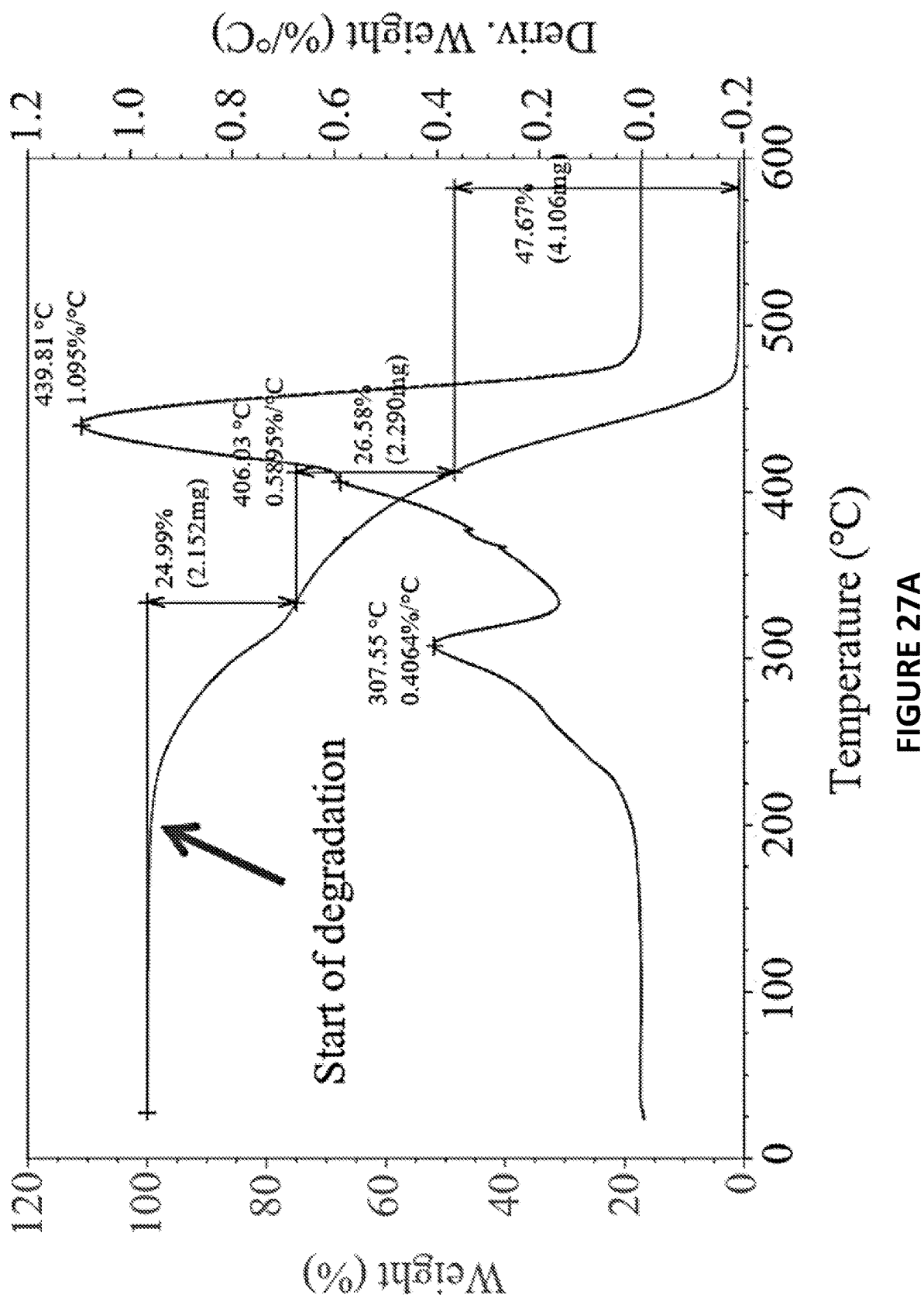
FIG. 27A: Thermogravimetric (TGA) analysis of PBPUU.
Figure 27B:
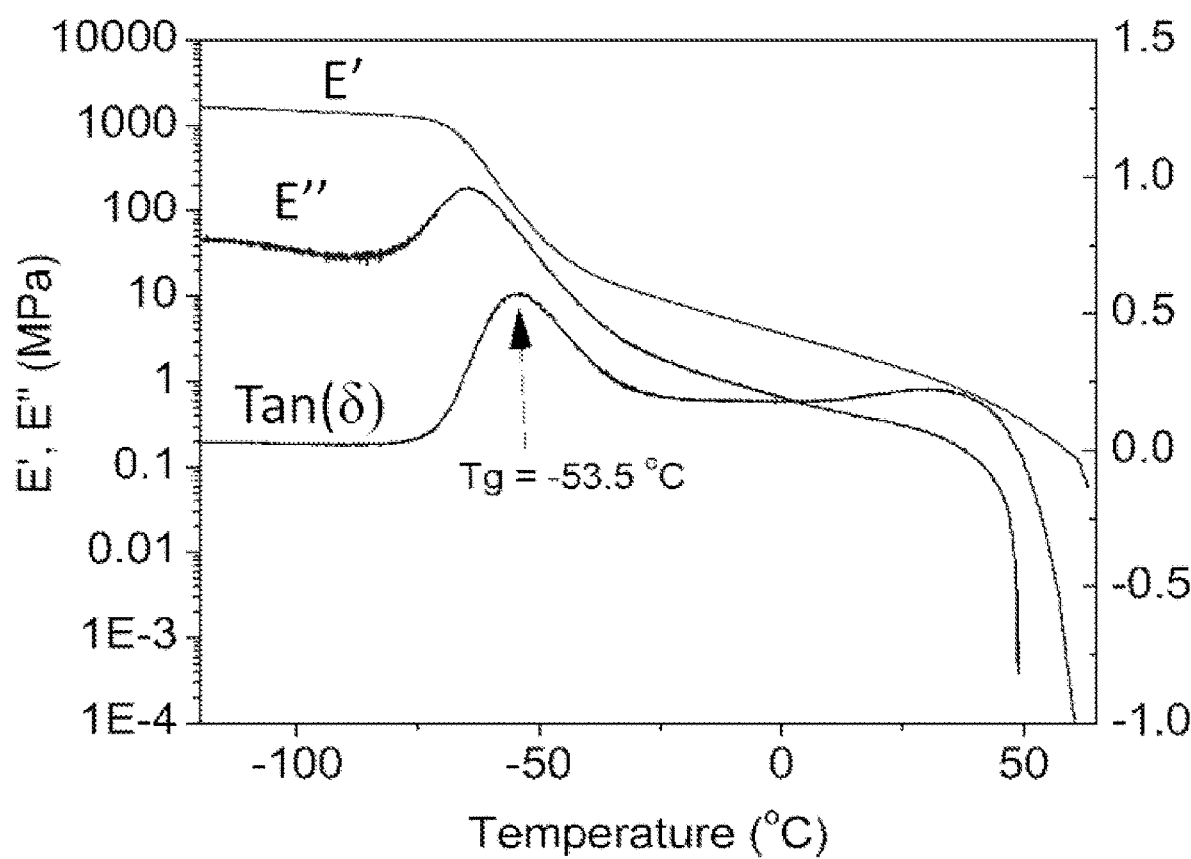
FIG. 27B: Dynamic mechanical analysis of PBPUU film showing loss modulus (E") and storage modulus (E') versus temperature.

PBPUU was found to be highly stable in a wide temperature range. FIG. 27A shows that the elastomer is stable up to temperatures as high as 200° C. Glass transition temperature (Tg) of PBPUU was found to be −53.5° C. (FIG. 27B), which is very useful for retaining a good self-healing ability even in very cold environments.

It is appreciated by persons skilled in the art that the present invention is not limited by what has been particularly shown and described hereinabove. Rather the scope of the present invention includes both combinations and subcombinations of various features described hereinabove as well as variations and modifications. Therefore, the invention is not to be constructed as restricted to the particularly described embodiments, and the scope and concept of the invention will be more readily understood by references to the claims, which follow.

The invention claimed is:

1. A self-healing elastomer comprising polymeric chains comprising units of formula (A1)

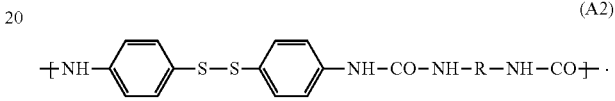

(A1)

wherein
R is a polybutadiene-containing aliphatic polyurethane;
$R_1$ and $R_1'$ are independently selected from the group consisting of: —H, $(C_1-C_2)$alkyl, $(C_5-C_{14})$aryl, —$OR_4$, —$(CO)R_5$, —$O(CO)R_6$, —$(SO)R_7$, CO—$R_8$, —$COOR_9$, —$NO_2$, and halogen;
$R_2$, $R_2'$, $R_3$ and $R_3'$ are independently selected from the group consisting of: —H, $(C_1-C_{20})$alkyl and $(C_5-C_{14})$aryl;
$R_4$ to $R_9$ are the same or different, and are independently selected from the group consisting of: —H, $(C_1-C_{20})$alkyl, and $(C_5-C_{14})$aryl;
m is 4;

wherein the polymeric chains are linear, the linear polymeric chains comprising (a) from about 5 to about 100 units of formula (A1) per chain, and (b) a molar ratio of the polybutadiene-containing aliphatic polyurethane polymer to the aromatic disulfide of formula (A1) ranges from 0.7 to 1.3, wherein the elastomer is dynamically crosslinked by aromatic disulfide metathesis, and wherein the elastomer has a water contact angle of above 100°.

2. The elastomer according to claim 1, wherein the elastomer has a molecular weight ranging from about 10 kg/mole to about 200 kg/mole and a tensile strength value above 1.5 MPa.

3. The elastomer according to claim 1, wherein the unit of formula (A1) is

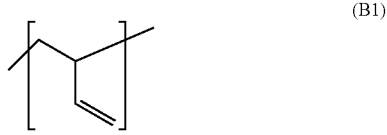

(A2)

4. The elastomer according to claim 1, wherein the polybutadiene-containing aliphatic polyurethane (R) comprises 1,3-butadiene derived-monomer units of formula (B1), formula (B2), and formula (B3),

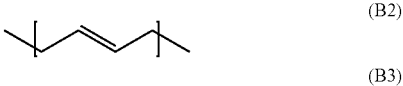

(B1)

(B2)

(B3)

wherein the proportion of the monomer unit of formula (B1) is 10 to 60 mole percent, the proportion of the monomer unit of formula (B2) is 20 to 70 mole percent, and the proportion of the monomer unit of formula (B3) is 10 to 50 mole percent in the entirety of the 1,3-butadiene-derived monomer units present in one unit of formula (A1).

5. The elastomer according to claim 4, wherein the polybutadiene-containing aliphatic polyurethane (R) comprises about 20 mole percent monomer units of formula (B1), 60 mole percent monomer units of formula (B2), and 20 mole percent monomer units of formula (B3) out of the entirety of the 1,3-butadiene-derived monomer units present in one unit of formula (A1).

6. The elastomer according to claim 1, wherein the polybutadiene-containing aliphatic polyurethane (R) comprises an aliphatic urethane unit, —O—CO—NH—$R_{10}$, wherein $R_{10}$ is a linear or cyclic $(C_4-C_{10})$ alkyl selected from the group consisting of 1,1,3,3-tetramethyl cyclohexyl, butyl, hexyl, and decyl.

7. The elastomer according to claim 1, wherein the unit of formula (A1) is

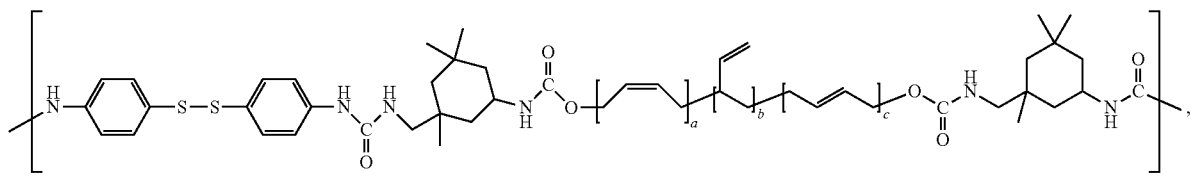

(A3)

wherein "a" of Formula (A3) ranges from about 0.1 to about 0.5, "b" of Formula (A3) ranges from about 0.1 to about 0.6, and "c" of Formula (A3) ranges from about 0.2 to about 0.7.

8. A method for preparing an elastomer according to claim 1, the method comprising reacting an isocyanate-functionalized polybutadiene polymer with an aromatic disulfide of formula (C1):

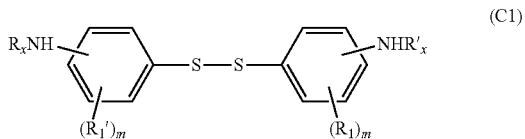

(C1)

wherein $R_1$ and $R_1'$ are independently selected from the group consisting of: —H, $(C_1$-$C_{20})$alkyl, $(C_5$-$C_{14})$aryl, —$OR_4$, —$(CO)R_5$, —$O(CO)R_6$, —$(SO)R_7$, CO—$R_8$, —$COOR_9$, —$NO_2$, and halogen;

$R_4$ to $R_9$ are the same or different, and are independently selected from the group consisting of: —H, $(C_1$-$C_{20})$ alkyl, and $(C_5$-$C_{14})$aryl;

m is 4;

$R_x$ and $R_x'$ are the same or different, and are independently selected from the group consisting of —H, $(C_1$-$C_{20})$ alkyl, and $(C_5$-$C_{14})$aryl, wherein the reaction is performed at a temperature ranging from —30 to 200° C., and wherein the molar ratio between amine and isocyanate groups ranges from 0.7 to 1.3.

9. The method according to claim 8, wherein the reaction is performed for up to about 96 hours and wherein the method comprises adding methanol to the mixture of the isocyanate-functionalized polybutadiene polymer and the aromatic disulfide of formula (C1) following 24 hours from the start of the reaction, wherein methanol is in molar excess relatively to amine and isocyanate groups.

10. The method according to claim 8, wherein the molar ratio between amine and isocyanate groups is 1.

11. The method according to claim 8, wherein the isocyanate-functionalized polybutadiene polymer comprises 1,3-butadiene derived-monomer units of formula (B1), formula (B2), and formula (B3), wherein the proportion of the monomer unit of formula (B1) is 10 to 60 mole percent, the proportion of the monomer unit of formula (B2) is 20 to 70 mole percent, and the proportion of the monomer unit of formula (B3) is 10 to 50 mole percent in the entirety of the 1,3-butadiene-derived monomer units present in the isocyanate-functionalized polybutadiene polymer.

12. The method according to claim 11, wherein the isocyanate-functionalized polybutadiene polymer comprises about 20 mole percent monomer units of formula (B1), 60 mole percent monomer units of formula (B2), and 20 mole percent monomer units of formula (B3).

13. The method according to claim 8, wherein the isocyanate-functionalized polybutadiene polymer is formed by reacting a hydroxyl-terminated polybutadiene (HTPB) with an aliphatic diisocyanate compound selected from the group consisting of isophorone diisocyanate (IPDI), 1,4-tetramethylene diisocyanate, 1,6-hexamethylene diisocyanate (HDI), and 1,10-decamethylene diisocyanate.

14. The method according to claim 13, wherein said aliphatic diisocyanate compound is IPDI.

15. An elastomer obtained by reacting a linear isocyanate-functionalized polybutadiene polymer with an aromatic disulfide of formula (C1), wherein $R_1$ and $R_1'$ are independently selected from the group consisting of: —H, $(C_1$-$C_{20})$alkyl, $(C_5$-$C_{14})$aryl, —$OR_4$, —$(CO)R_5$, —$O(CO)R_6$, —$(SO)R_7$, CO—$R_8$, —$COOR_9$, —$NO_2$, and halogen;

$R_4$ to $R_9$ are the same or different, and are independently selected from the group consisting of: —H, $(C_1$-$C_{20})$ alkyl, and $(C_5$-$C_{14})$aryl;

m is 4;

$R_x$ and $R_x'$ are the same or different, and are independently selected from the group consisting of —H, $(C_1$-$C_{20})$ alkyl, and $(C_5$-$C_{14})$aryl, wherein the reaction is performed at a temperature ranging from —30 to 200° C., and wherein the molar ratio between amine and isocyanate groups ranges from 0.7 to 1.3.

16. A sensor comprising a substrate and at least two electrodes, wherein the substrate is made of the elastomer according to claim 1, and the electrodes comprise a micro-sized or nanosized conductive material embedded within or deposited onto the substrate.

17. The sensor according to claim 16, being in a form of a field effect transistor, comprising a substrate, at least one source electrode, at least one drain electrode, at least one gate electrode, and at least one channel, wherein the channel comprises semi-conducting nanosized material deposited onto the substrate and/or onto the at least one source electrode and at least one drain electrode.

18. The sensor according to claim 17, wherein the conductive material is selected from the group consisting of metal, metal alloy, metal carbide, metal nitride, metal oxide, metal silicide, carbon, polymer, ceramics, and combinations thereof and/or wherein the conductive material has a form selected from the group consisting of nanoparticles, nanowires, nanotubes, nanoflakes, nanofibers, nanoribbons, nanowhiskers, nanostrips, nanorods, and combinations thereof and/or wherein the semi-conducting material is selected from the group consisting of carbon, silicon, and combinations thereof and/or wherein the semi-conducting material has a form selected from the group consisting of nanowires, nanotubes, nanofibers, nanoribbons, nano-whiskers, nanostrips, nanorods, and combinations thereof.

* * * * *